US012597630B2

(12) United States Patent
Xu et al.

(10) Patent No.: US 12,597,630 B2
(45) Date of Patent: Apr. 7, 2026

(54) BATTERIES WITH NON-RECTANGULAR SHAPES FOR AUGMENTED REALITY DEVICES, AND SYSTEMS AND METHODS OF USE THEREOF

(71) Applicant: Meta Platforms Technologies, LLC, Menlo Park, CA (US)

(72) Inventors: Tianren Xu, San Jose, CA (US); Bradley Spare, San Jose, CA (US); Karthik Kadirvel, Cupertino, CA (US); Jason Howard, Alpharetta, GA (US); Wei Wang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/677,757

(22) Filed: May 29, 2024

(65) Prior Publication Data

US 2025/0070220 A1     Feb. 27, 2025

Related U.S. Application Data

(60) Provisional application No. 63/553,093, filed on Feb. 13, 2024, provisional application No. 63/520,916, filed on Aug. 21, 2023.

(51) Int. Cl.
*H01M 10/04* (2006.01)
*G02B 27/01* (2006.01)
*H01M 50/119* (2021.01)

(52) U.S. Cl.
CPC .... *H01M 10/0436* (2013.01); *G02B 27/0176* (2013.01); *H01M 50/119* (2021.01); *G02B 2027/0178* (2013.01)

(58) Field of Classification Search
CPC ........... H01M 10/0436; H01M 50/119; G02B 27/0176
See application file for complete search history.

(56) References Cited

U.S. PATENT DOCUMENTS 8,430,507 B2     4/2013   Howell et al.
10,236,483 B2     3/2019   Tajima et al.
(Continued)

FOREIGN PATENT DOCUMENTS

| CN | 201725842 U | 1/2011 |
|---|---|---|
| DE | 102015204780 A1 | 9/2016 |
| EP | 2315070 A2 | 4/2011 |

OTHER PUBLICATIONS

Extended European Search Report for European Patent Application No. 24185472.8, mailed Nov. 21, 2024, 7 pages.
(Continued)

*Primary Examiner* — Sardis F Azongha
(74) *Attorney, Agent, or Firm* — McDermott Will & Schulte LLP

(57) ABSTRACT
An example augmented-reality headset comprises a frame portion, a temple arm portion coupled with the frame portion, and a metal-encased battery cell having an exterior surface that defines a non-rectangular shape. The metal-encased battery cell is configured to be housed within the temple arm portion, and the non-rectangular shape of the exterior surface follows an interior shape of an internal surface of the temple arm portion. The augmented-reality headset also comprises one or more artificial-reality processing or presentation devices, wherein at least one of the one or more artificial-reality processing or presentation devices is configured to receive power from the metal-encased battery cell.

18 Claims, 26 Drawing Sheets

(56)         References Cited

U.S. PATENT DOCUMENTS

| 11,563,233 | B1 | 1/2023 | Howard et al. | |
| 2013/0120706 | A1 | 5/2013 | Kakinuma et al. | |
| 2020/0343775 | A1* | 10/2020 | Yahagi | H02J 50/12 |
| 2020/0363652 | A1 | 11/2020 | Hino et al. | |
| 2022/0191578 | A1* | 6/2022 | Ramkumar | G02B 27/0176 |
| 2022/0352581 | A1* | 11/2022 | Eguchi | H01M 50/109 |
| 2025/0062507 | A1* | 2/2025 | Eguchi | H01M 50/553 |

OTHER PUBLICATIONS

Grepow., "Curved Rechargeable Lithium Polymer Battery—Grepow Shaped Battery," Youtube.com, Mar. 8, 2021, 3 Pages, Retrieved from the Internet URL: https://www.youtube.com/watch?v=8DuSshHsCYE.

grepow.com., "EWTS 2019 | GREPOW Provides Shaped Batteries for AR/VR and Wearables," 2019, 7 Pages, Retrieved from the Internet URL: https://www.grepow.com/company-news/ewts-2019-grepow-shaped-batteries-for-ar-vr-and-wearables.html.

grepow.com., "Pouch L Shaped Lipo Battery," 2023, 4 Pages, Retrieved from the Internet URL: https://www.grepow.com/shaped-battery/I-shaped-battery.html.

\* cited by examiner

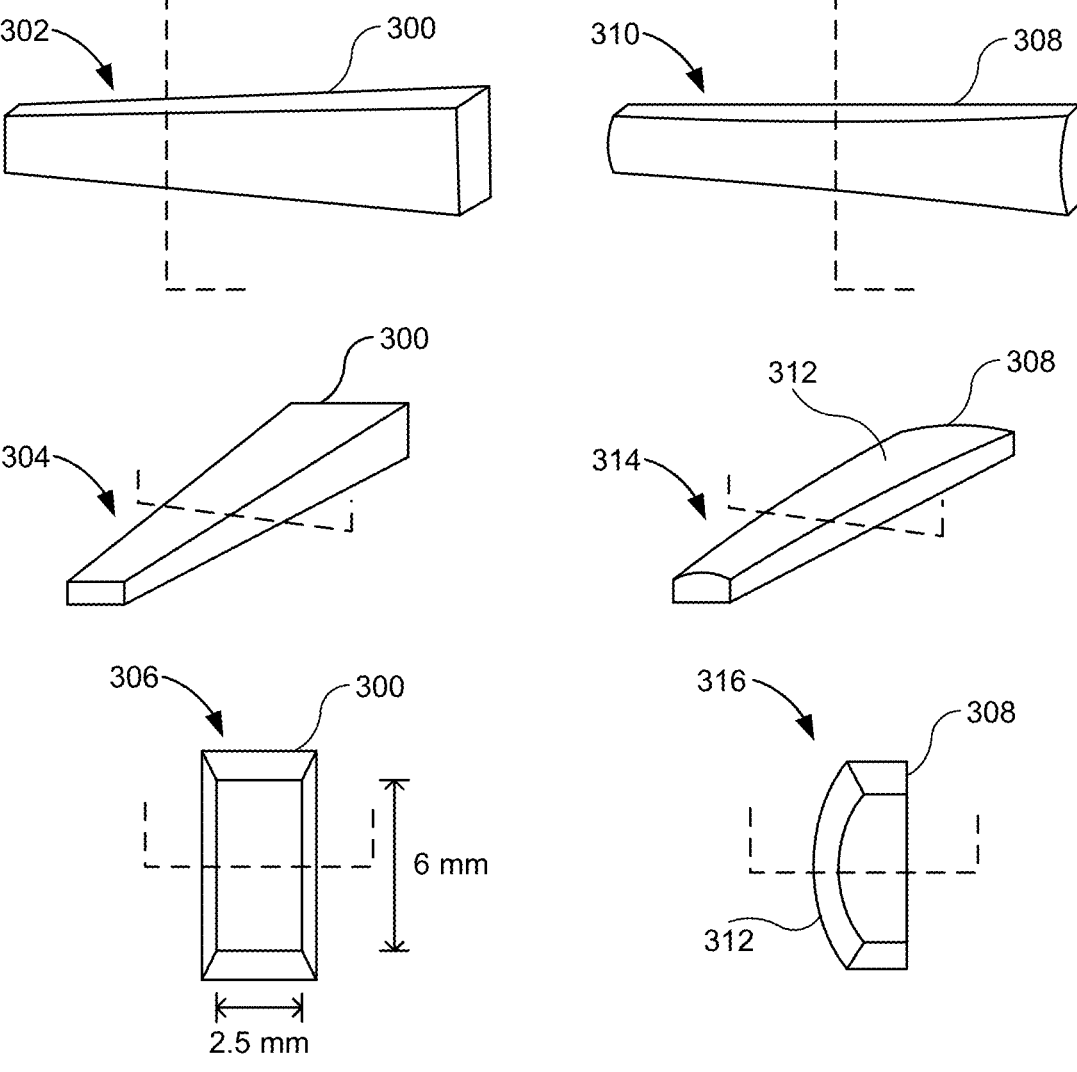
Figure 3A          Figure 3B

AR system 400c

AR system 400c

AR system 400d

402

610

500

800

430

434

422

AR system 400d

435

VR device 610

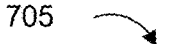
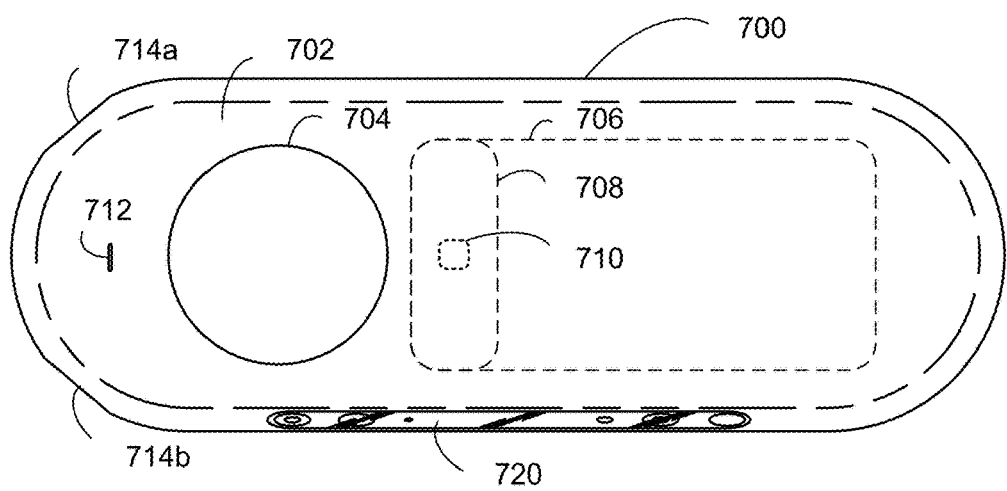
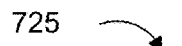
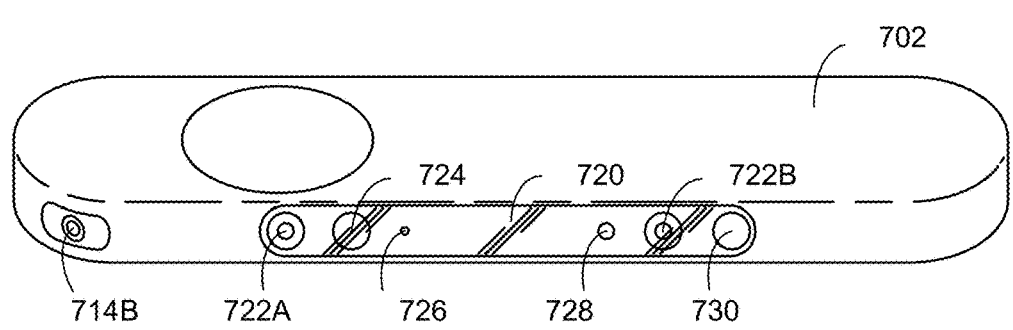
Figure 7A

Computer System 740

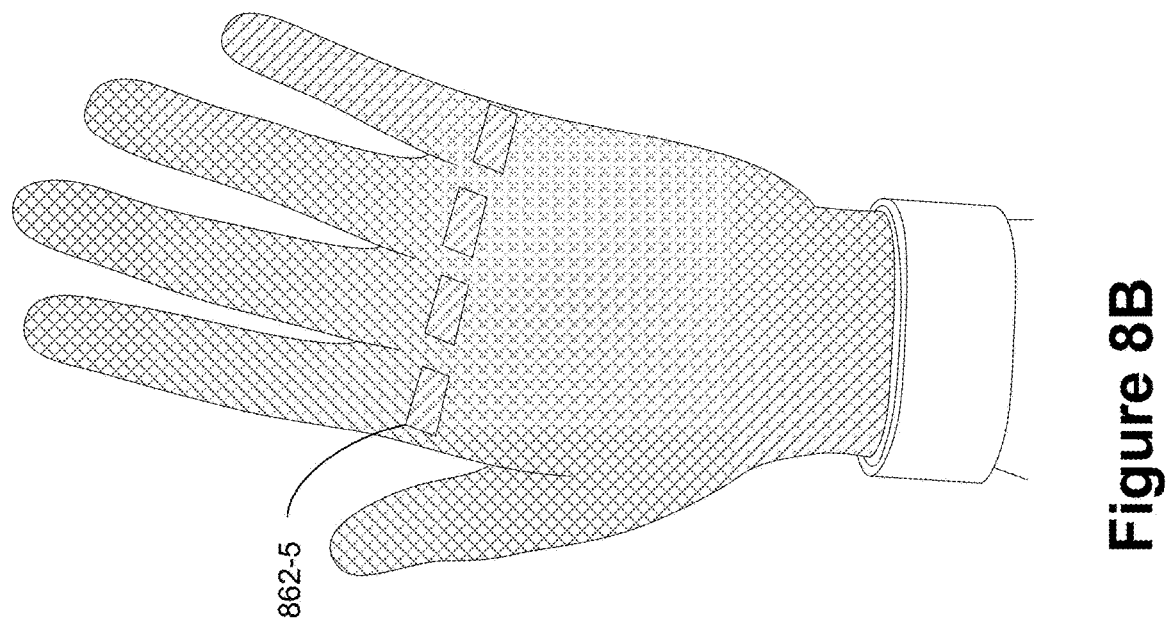
Figure 8B
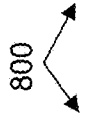
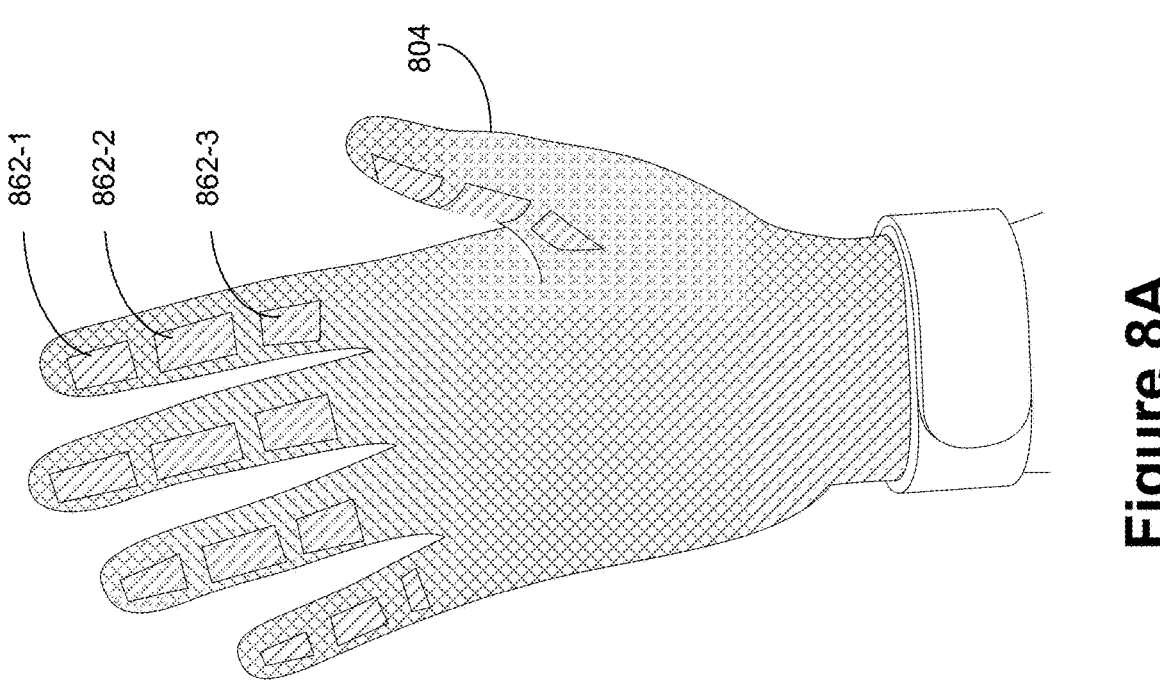
Figure 8A

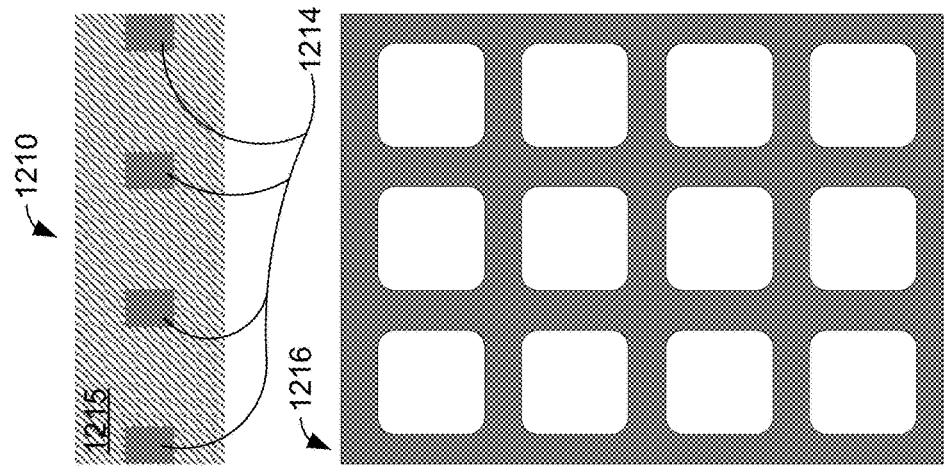
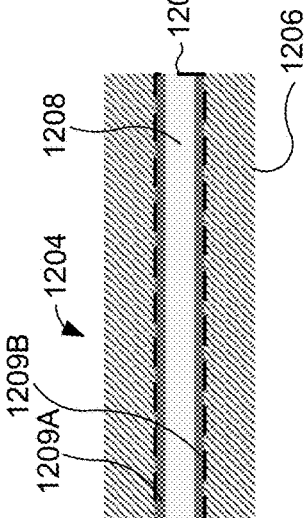
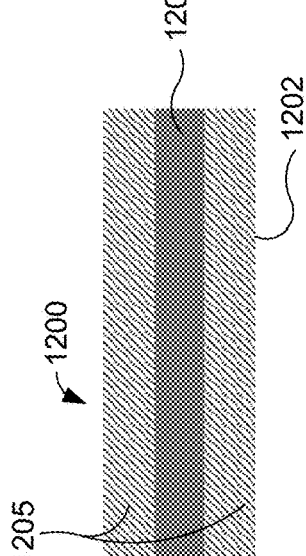
Figure 12

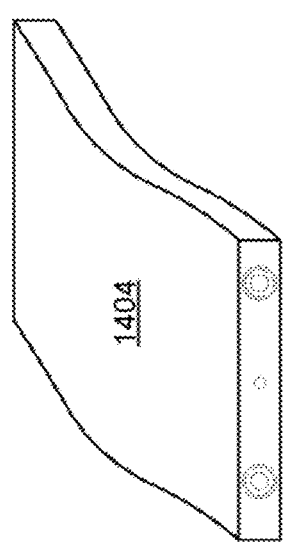
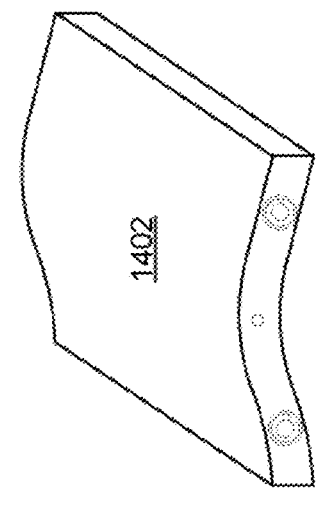
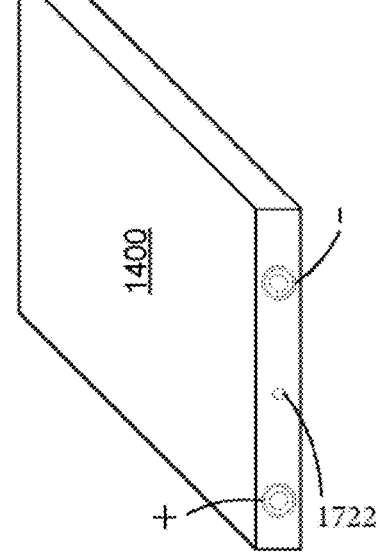
Figure 14

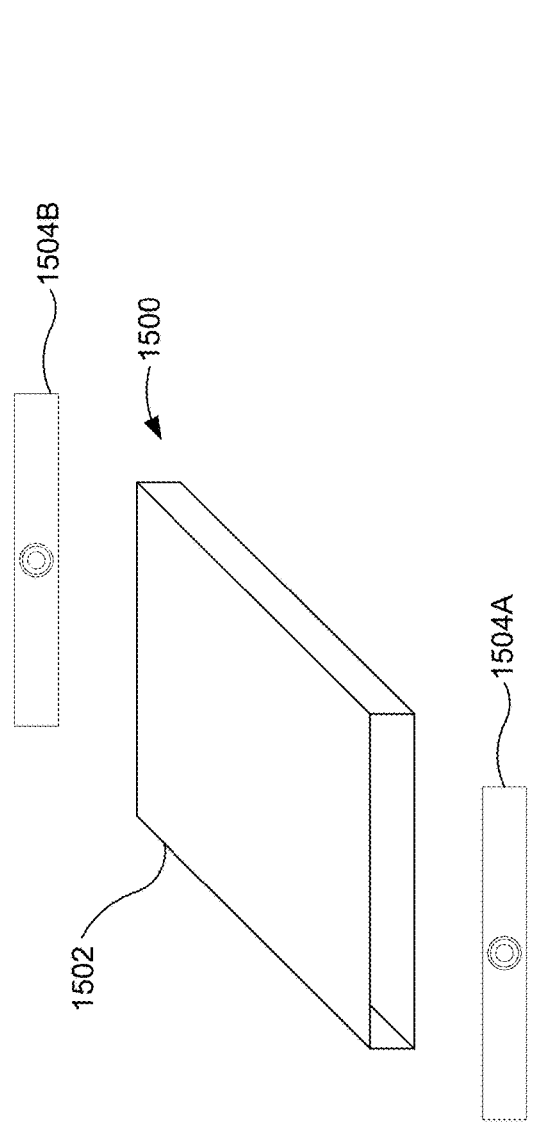
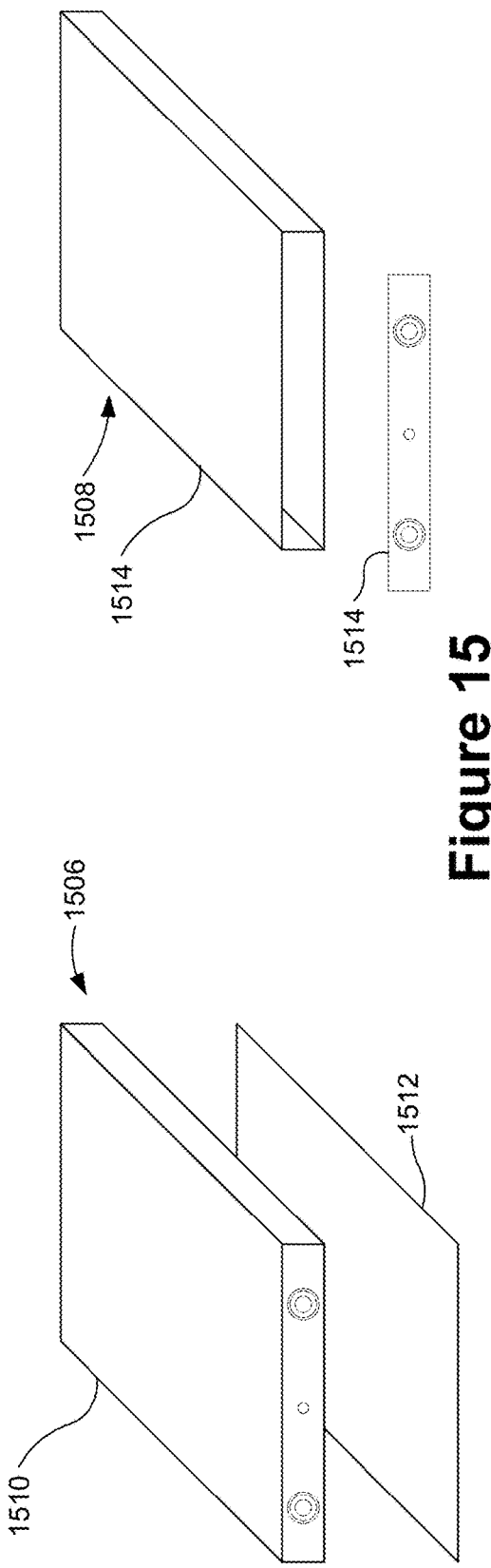
Figure 15

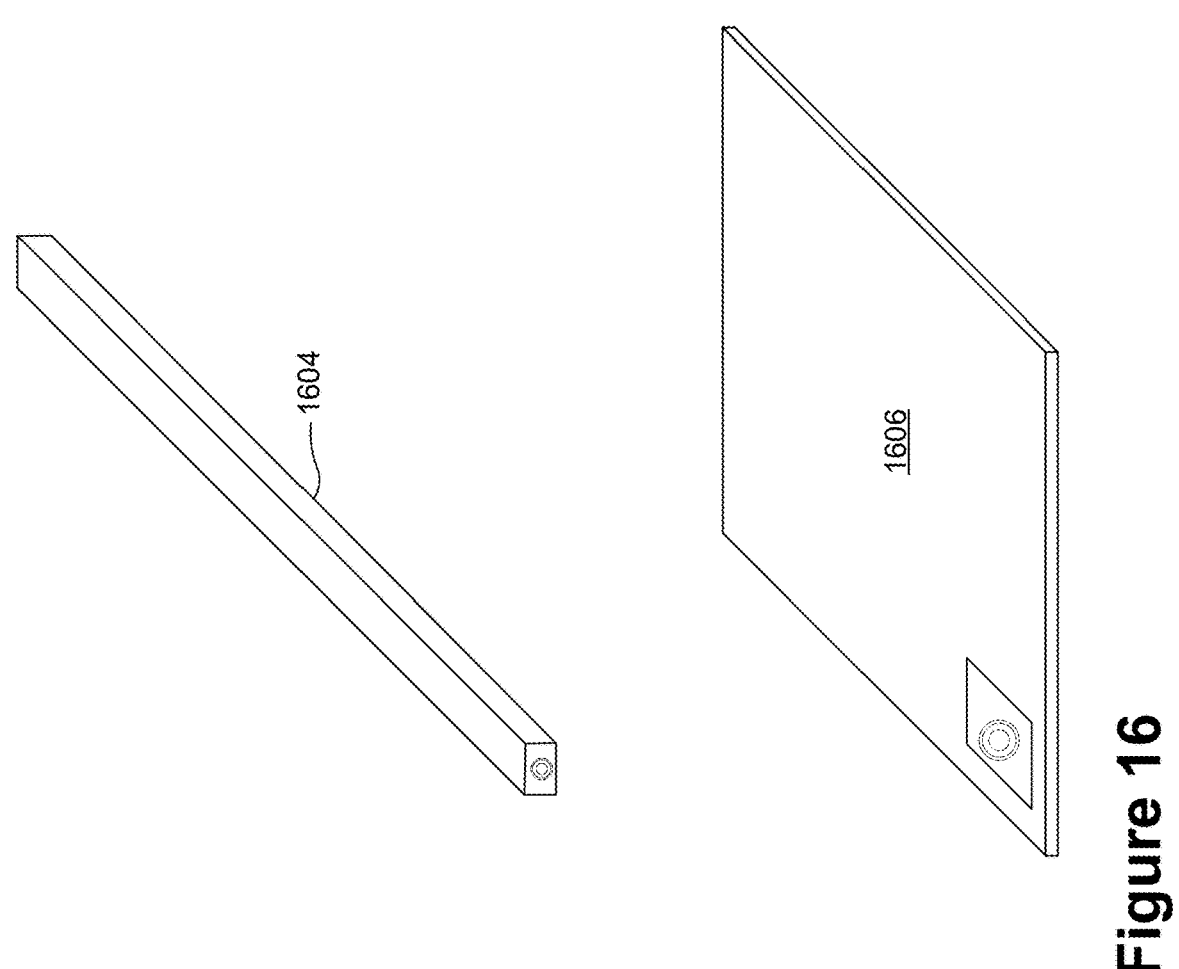
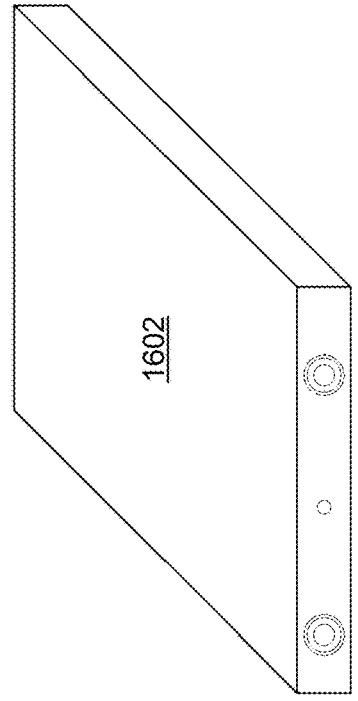
Figure 16

BATTERIES WITH NON-RECTANGULAR SHAPES FOR AUGMENTED REALITY DEVICES, AND SYSTEMS AND METHODS OF USE THEREOF

RELATED APPLICATIONS

This application claims priority to U.S. Provisional Application Ser. No. 63/520,916, filed Aug. 21, 2023, and U.S. Provisional Application Ser. No. 63/553,093, filed Feb. 13, 2024, which are hereby incorporated herein by reference in their entirety.

TECHNICAL FIELD

This relates generally to batteries (e.g., metal-encased batteries) configured to be placed within an artificial-reality headset (e.g., an augmented reality headset), and the metal-encased batteries can be further configured to have non-rectangular shapes to conform to interior shapes of an artificial-reality headset (e.g., cavities in temple arms or in frame portion of an augmented reality headset).

BACKGROUND

Artificial reality headset, particularly augmented reality headsets, are shaped to similarly to traditional glasses, which makes them extremely space limited for internal components. This space limitation has made it difficult for augmented-reality headsets to have the space required to fit a battery cell that powers the augmented reality headset for meaningful amount of time. Traditional augmented reality headsets have attempted to solve this problem by making the augmented-reality headset much bulkier than traditional glasses to accommodate batteries. These traditional batteries tend to be off the shelf components and tend to also have rectangular profiles, which dictate that shape of the augmented reality headset (e.g., making arms thick and square in nature, or making the lens-holding portion very thick).

As such, there is a need to address one or more of the above-identified challenges. A brief summary of solutions to the issues noted above are described below.

SUMMARY

The non-rectangular battery cells described herein solve the issues described above, by allowing battery cells to have a shape that conforms to an interior surface of a temple arm or an interior surface of a frame of an augmented-reality headset. By being able to conform the battery to an interior shape of a frame or a temple arm, the frame and temple can be designed to have a more traditional shape that mimics the size and shape of traditional sunglasses and/or corrective eyeglasses. In addition, batteries that have non-rectangular shapes also allow for increased amounts of battery storage to be located within the augmented device, which increases the time-periods of use before needing to be charged.

In accordance with some embodiments, an augmented-reality headset, comprises a frame portion, and a temple arm portion coupled with the frame portion. In some embodiments, the augmented reality headset comprises an intermediary component of the augmented-reality headset that is used to hingeably couple the frame portion with the temple arm portion, such that the augmented-reality headset is a three-piece construction, including frame portion, temple arm portion, and the intermediary component. The augmented-reality headset also comprises a metal-encased battery cell having an exterior surface that defines a non-rectangular shape (e.g., metal encasing can include a steel, aluminum, alloy, magnesium encasing that has an exterior formed into a shape such as a trapezoidal shape and the trapezoidal shape can also have a non-uniform thickness along its longest and/or shortest dimension). In some embodiments, the metal-encased battery cell is configured to be housed within the temple arm portion, and the non-rectangular shape of the exterior surface follows an interior shape of an internal surface of the temple arm portion. The augmented-reality headset also comprises one or more artificial-reality processing or presentation devices, wherein at least one of the one or more artificial-reality processing or presentation devices is configured to receive power from the metal-encased battery cell. Examples of the augmented-reality presentation devices include a mini projector that can be used to project an image onto a waveguide structure of the augmented-reality headset, a speaker used to convey audio to a user of the augmented-reality headset, and/or other types of presentation devices configured to convey audio, visual, and/or haptic effects associated with augmented-reality experiences to a user of the augmented-reality headset.

In accordance with some embodiments, an artificial-reality headset comprises a first portion (e.g., an AR headset frame (e.g., frame 1104 shown in FIG. 11)), and a second portion (e.g., a temple arm coupled to the AR headset frame) that includes a void that is at least partially defined by a first curvature along a first axis and a second curvature along a second axis (e.g., that intersects with the first axis). The artificial-reality headset further comprises a battery located within the second portion that is configured to follow the first curvature along the first axis and follow the second curvature along the second axis, such that the battery has a shape that is curved along both the first axis and the second axis (e.g., the battery has a shape that matches a space in the second arm, such that the largest battery possible can be included in the second portion, thereby increasing operational time). For example, FIG. 10 shows a battery 104 that follows a curvature along both x-axis and y-axis). The battery is curved along both the first axis and the second axis in a resting position (i.e., the battery is not temporarily curved, it remains in this position without a bending force being applied to the battery. In some embodiments, the resting position meaning the battery retains its shape even when it is not placed within the void) (e.g., the battery has a curved state that is predefined prior to being put in the void, as shown in FIG. 9). The battery is also configured to fill the void (e.g., a portion of the second portion allocated to store the battery) of the second portion. In some embodiments, the void is further defined by electronics located in the second portion (e.g., FIG. 10 shows that battery 1004 fills first void 1006). The battery is further configured to provide power to one or more artificial-reality processing or presentation devices of the artificial-reality headset, where at least one of the one or more artificial-reality processing or presentation devices are located in the void (e.g., one or more processors, one or more projectors, one or more communication components, one or camera (e.g., image/video capturing, environment scanning), one or more microphones, etc.). For example, FIG. 10 shows that one or more artificial-reality processing or presentation devices 1016 are placed within the temple arm, and can partially define the first void 1006.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 3A illustrates a metal-encased battery 300 that has a non-rectangular shape that is configured to be placed within a temple arm of an augmented reality headset, in accordance with some embodiments.

FIG. 3B illustrates a metal-encased battery cell 308 that has a non-rectangular shape with at least one hemispherical surface that is configured to be placed within a temple arm of an augmented reality headset, in accordance with some embodiments.

FIGS. 4A-4D-2 illustrate example artificial-reality systems, in accordance with some embodiments.

FIGS. 7A-7B illustrate an example handheld intermediary processing device, in accordance with some embodiments.

FIGS. 8A-8C illustrate an example smart textile-based garment, in accordance with some embodiments.

FIG. 12 shows a battery configuration that is configured to reduce the overall weight of a battery in comparison to traditional lithium-ion batteries that rely on aluminum and copper foils in their construction, in accordance with some embodiments.

FIG. 14 illustrates lightweight hard cased batteries that do not have cell terraces and/or side folds to reduce weight and volumetric efficiency while providing balanced gravimetric energy density, in accordance with some embodiments.

FIG. 15 illustrates a few options for assembling a battery cell without a cell terrace and/or side folds, in accordance with some embodiments.

FIG. 16 illustrates alternative shapes that the battery cell can be and the placement of terminals on these alternative shaped battery cells, in accordance with some embodiments.

Figure 1:
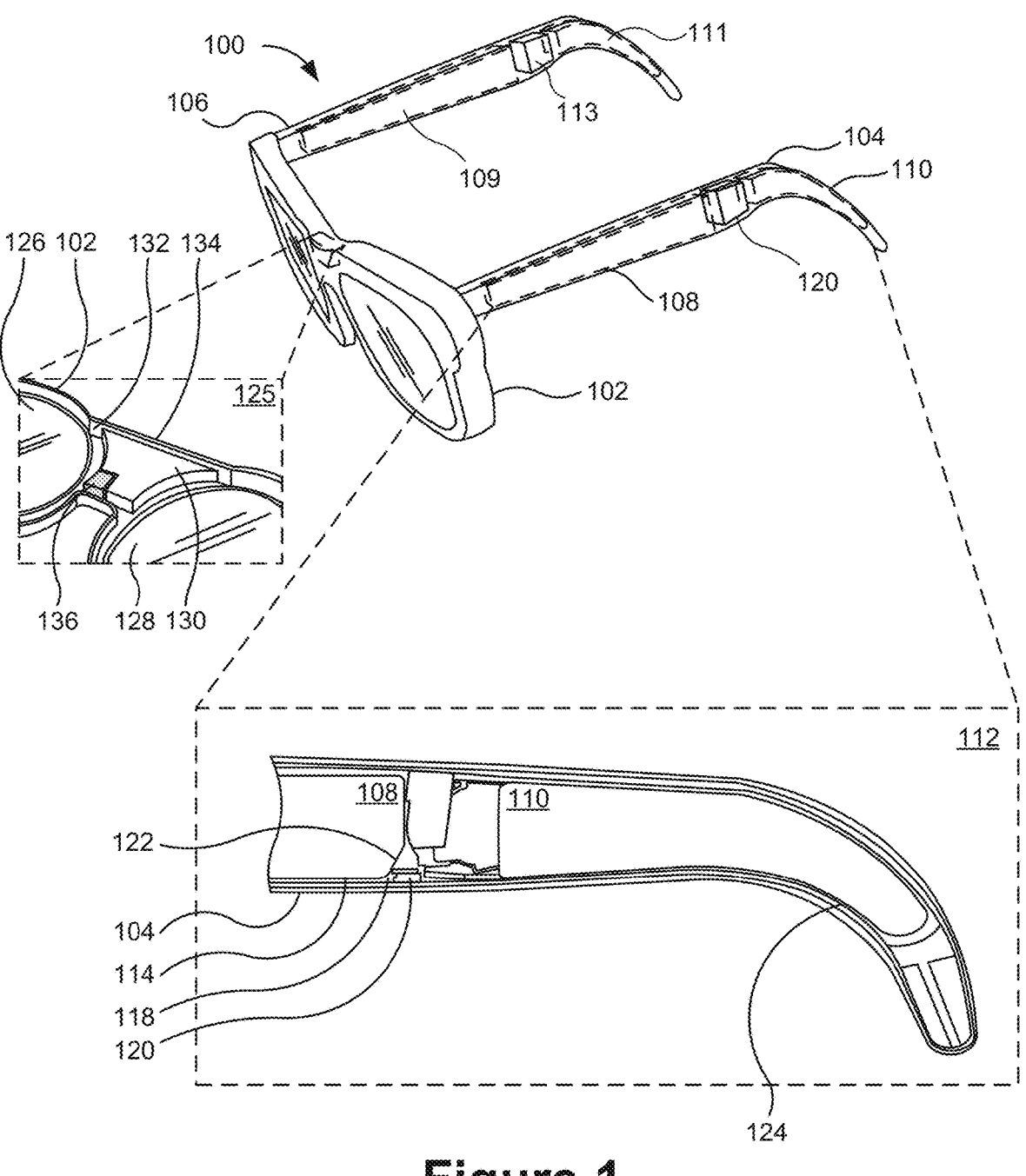
FIG. 1 illustrates metal-encased batteries that have non-rectangular shapes that are configured to be placed within an augmented-reality headset, in accordance with some embodiments.

shows an example cutaway of a temple arm that includes a curved battery cell has a shape that accommodates at least a microphone, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

The above artificial-reality experiences described above are further improved by improving the battery capacity in artificial-reality headsets. Details of these improved batteries are described herein.

FIG. 1 illustrates metal-encased batteries that have non-rectangular shapes that are configured to be placed within an augmented-reality headset, in accordance with some embodiments. FIG. 1 shows an augmented-reality headset 100 that includes a frame portion 102, a first temple arm portion 104 and a second temple arm portion 106, each of which is hingably coupled with the frame portion 102. In some embodiments, the frame portion 102 is coupled to first temple arm portion 104 and second temple arm portion 106 by an intermediary component (not pictured).

The temple arm 104 is illustrated as including a first metal-encased battery cell 108 and a second metal-encased battery cell 110 (e.g., batteries with lithium-ion based chemistry). The first temple arm portion 104 is further illustrated in cut-away view 112 that further shows that first metal-encased battery cell 108 that has an exterior surface 114 that defines a non-rectangular shape (e.g., a trapezoid), and the non-rectangular shape of the exterior surface follows an interior shape of an internal surface 118 of the temple arm portion 104. The temple arm portion 104 also includes an artificial-reality processing or presentation device 120 (e.g., an inertial measurement unit, a speaker, a microphone, a circuit board, an eye-tracking camera, external-facing camera, privacy switch for turning on or off external facing cameras, simultaneous localisation and mapping (SLAM) camera, etc.). In some embodiments, artificial-reality processing or presentation device 120 is configured to receive power from one or both of the first metal-encased battery cell 108 and second metal-encased battery cell 110. In some embodiments, the artificial-reality processing or presentation device 120 partially dictates the exterior surface 114 of the first metal-encased battery cell 108. In some embodiments, the first metal-encased battery cell 108 is chamfered and/or curved (e.g., as shown along edge 122) to accommodate the artificial-reality processing or presentation device 120 (e.g., a microphone, a speaker, etc.). In some embodiments, second metal-encased battery 110 has another non-rectangular shape, different from the non-rectangular shape described above in reference to the first metal encased battery 108, of its exterior surface that follows another interior shape (e.g., the portion of the temple arm that wraps behind an ear of a wearer) of another internal surface 124. In some embodiments, the placement of the first metal-encased battery cell and the second metal-encased battery cell 110 is configured to counter-balance artificial-reality processing or presentation device(s) located in the frame portion 102, thereby improving the wearing experience.

In some embodiments, second temple arm portion 106 includes similar or the same metal-encased battery cells and artificial-reality processing or presentation device(s) as first temple arm portion. In some embodiments, the battery cells (e.g., a third metal encased battery cell 109 and fourth metal-encased battery cell 111) have different exterior surfaces (e.g., non-rectangular, chamfered, curved, etc.) to accommodate a different interior shape of the second temple arm portion 106 and/or one or more different artificial-reality processing or presentation device(s) 113.

FIG. 1 also shows, in exploded view 125, that the frame portion 102 includes a first semi-transparent lens 126 and a second semi-transparent lens 128, in which an augmented reality can be projected onto, via artificial-reality processing or presentation device(s) 136 located within the frame portion 102. In some embodiments, the frame portion 102 can include another metal-encased battery cell 130 having another exterior surface 132 that defines a non-rectangular shape. The non-rectangular shape can be configured to fit within a nose bridge portion 134 of the frame portion, and accommodate first semi-transparent lens 126 and a second semi-transparent lens 128 and/or artificial-reality processing or presentation device(s)) 136.

Figure 2:
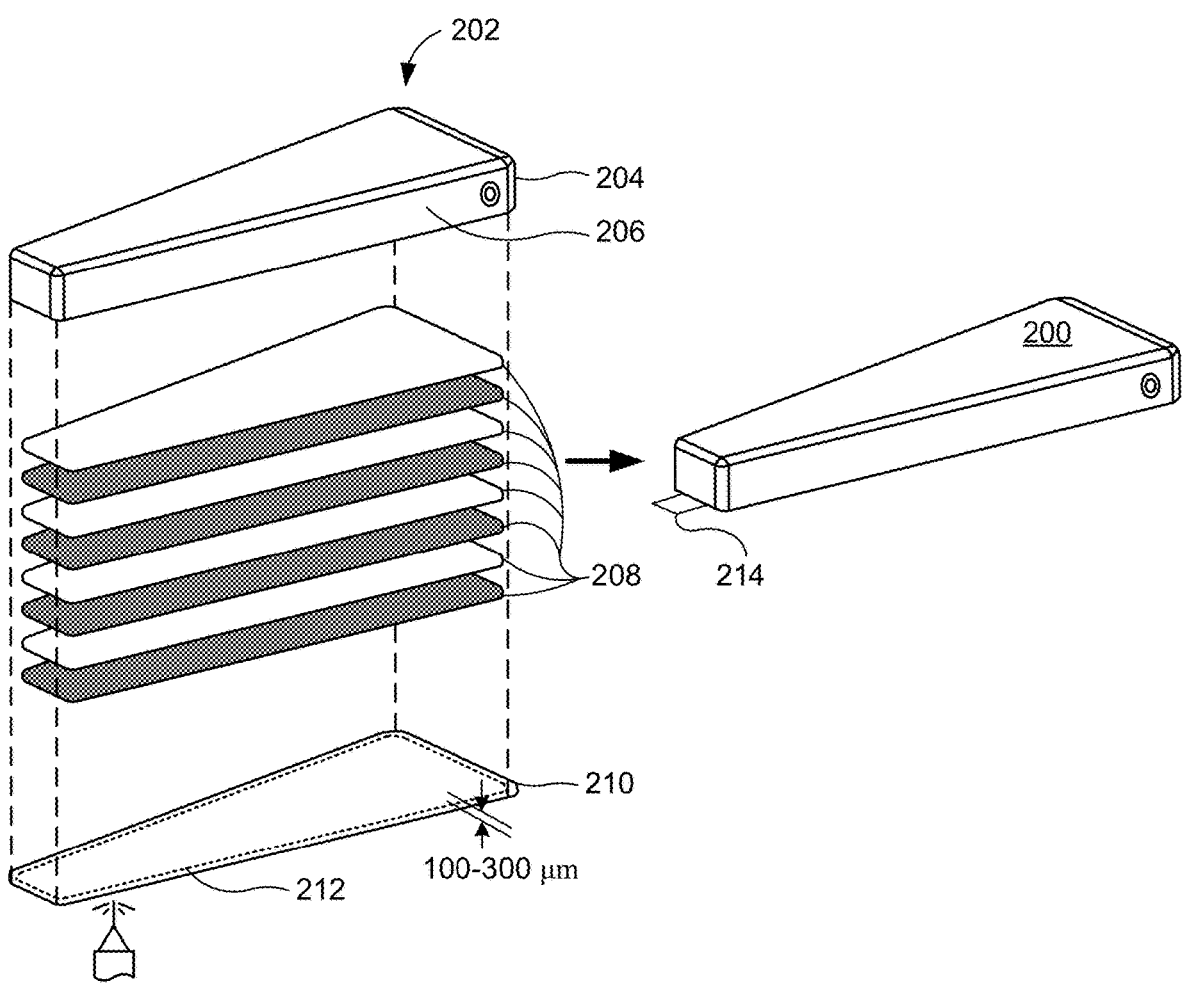
FIG. 2 illustrate the construction of a metal encased battery that has a non-rectangular shape, in accordance with some embodiments.

FIG. 2 illustrate the construction of a metal encased battery that has a non-rectangular shape, in accordance with some embodiments. FIG. 2 shows an assembled metal-encased battery 200 that has a non-rectangular shape, and also shows an exploded view 202 of the metal-encased battery 200. As shown in exploded view 202, the metal-encased battery 202 comprises at least a top portion 204 that is extruded such that it has a void 206 and all but one open face is covered (e.g., the bottom face is open). A stack of electrodes 208 that conform to the shape of the void. In some embodiments, the electrodes that make up the stack of electrodes 208 are die-cut to match the void (i.e., to maximize the size of the electrodes that can be placed within the void (e.g., allowing for a 10-30% increasing in energy density, as compared to a rolled type battery cell within the same void). FIG. 2 also shows that the open face of the top portion 204 is sealed by a bottom portion 210 (e.g., a panel), which is laser welded (indicated by laser welding seam 212) to the top portion 204. The number electrodes in the stack of electrodes is for illustrative purposes, but any number of electrodes that can fit into the void 206 can be used.

Top portion 204 and bottom portion 210 when sealed do not have a ledge, which decreases the footprint of the metal-encased battery 200, as compared to a metal-encased battery that requires a ledge for laser welding to occur at. In some embodiments, the metal-encased battery has wallthicknesses between 100-300 micrometers to allow the laser welding process to occur without needing a ledge for laser welding. In contrast, a thinner wall would not have enough material to undergo laser welding and would need a ledge, which increases the footprint of the battery cell. The increased volume from having a thicker wall outweighs having a thinner wall and a ledge, as footprint matters more in small form factor devices, such as an augmented-reality headset. Thus, having a thicker wall and no edge can increase overall cell size by up to 20% as compared to a thinner wall and a ledge, in this application. In some embodiments, the metal-encased battery includes a varied wall thickness, such that the portions needed for welding are thicker than other portion of the metal-encased battery.

FIG. 2 also shows a mounting component 214 (e.g., hooks, tabs, springs (e.g., leaf springs, screws, etc.)) that is configured to aid in mounting the metal-encased battery 200 to a temple arm.

FIG. 3A illustrates a metal-encased battery 300 that has a non-rectangular shape that is configured to be placed within a temple arm of an augmented reality headset, in accordance with some embodiments. FIG. 3A shows three different views of a non-rectangular metal encased battery cell. The first view 302 shows a profile view that illustrates the non-rectangular metal-encased battery cell 300 has a trapezoidal shape that is configured to fit within a temple arm. The second view 304 illustrates that non-rectangular metal-encased battery cell 300 also has a thickness that tapers along its major axis, which increases the volume within the temple arm the non-rectangular metal-encased battery cell 300 can occupy. In some embodiments, the taper is done by varying the die cut of the electrodes (i.e., changing the size) as they are stacked. The third view 306 (i.e., a cut away view) shows that, in some embodiments, the taper can occur along multiple axes.

FIG. 3B illustrates a metal-encased battery cell 308 that has a non-rectangular shape with at least one hemispherical surface that is configured to be placed within a temple arm of an augmented reality headset, in accordance with some embodiments. FIG. 3B shows three different views of a non-rectangular metal encased battery cell 308. The first view 310 shows a profile view that illustrates a hemispherical surface 312 of the non-rectangular metal-encased battery cell 308. The second view 314 further illustrates the hemispherical surface 312 of that non-rectangular metal-encased battery cell 308 also has a thickness that tapers along its major axis, which increases the volume within the temple arm the non-rectangular metal-encased battery cell 308 can occupy. In some embodiments, the taper is done by varying the die cut of the electrodes (i.e., changing the size) as they are stacked. The third view 316 (i.e., a cut away view) further illustrates the hemispherical surface 312.

(A1) In accordance with some embodiments, an augmented-reality headset, comprises a frame portion, and a temple arm portion coupled with the frame portion. In some embodiments, the augmented reality headset comprises an intermediary component of the augmented-reality headset that is used to hingably couple the frame portion with the temple arm portion, such that the augmented-reality headset is a three-piece construction, including frame portion, temple arm portion, and the intermediary component. The augmented-reality headset also comprises a metal-encased battery cell having an exterior surface that defines a non-rectangular shape (e.g., metal encasing can include a steel, aluminum, alloy, magnesium encasing that has an exterior formed into a shape such as a trapezoidal shape and the trapezoidal shape can also have a non-uniform thickness along its longest and/or shortest dimension). In some embodiments, the metal-encased battery cell is configured to be housed within the temple arm portion, and the non-rectangular shape of the exterior surface follows an interior shape of an internal surface of the temple arm portion. The augmented-reality headset also comprises one or more artificial-reality processing or presentation devices, wherein at least one of the one or more artificial-reality processing or presentation devices is configured to receive power from the metal-encased battery cell. Examples of the augmented-reality presentation devices include a mini projector that can be used to project an image onto a waveguide structure of the augmented-reality headset, a speaker used to convey audio to a user of the augmented-reality headset, and/or other types of presentation devices configured to convey audio, visual, and/or haptic effects associated with augmented-reality experiences to a user of the augmented-reality headset. For example, FIG. 1 illustrates an augmented-reality headset 100 that includes a frame portion 102, a first temple arm portion 104, and a first metal-encased battery cell 108 located within the first temple arm portion 104.

(A2) In some embodiments of A1, the interior shape is a first interior shape of the internal surface of the temple arm portion, and the augmented-reality headset further comprises, another metal-encased battery cell having another exterior surface that defines another non-rectangular shape (e.g., FIG. 1 shows a second metal-encased battery cell 110). In some embodiments, the other metal-encased battery cell is configured to be housed within the temple arm portion, and the other non-rectangular shape of the exterior surface follows a second interior shape of the internal surface of the temple arm portion. In some embodiments, at least one of the one or more artificial-reality processing or presentation devices is configured to receive power from the other metal-encased battery cell. In some embodiments, the metal-encased battery and the other metal-encased battery are electrically coupled to each other (e.g., in series or parallel). In some embodiments, the first and second interior shapes are distinct shapes, such that the respective exterior surfaces of the metal-encased battery cell and the other metal-encased battery cell each have respective non-rectangular shapes that are also different (i.e., a first trapezoidal shape and a different trapezoidal shape, respectively, and other examples are also contemplated such as a trapezoidal shape and a different shape have more than four sides, such as a pentagon shape). One or more of the respective non-rectangular shapes can also have at least one curved edge or curved surface.

(A3) In some embodiments of A1-A2, the augmented-reality headset further comprises another temple arm portion, distinct from the temple arm portion, coupled with the frame portion. In some embodiments, the another metal-encased battery cell having another exterior surface that defines another non-rectangular shape, where the other metal-encased battery cell is configured to be housed within the other temple arm portion, and the other non-rectangular shape of the other exterior surface follows another interior shape of another internal surface of the other temple arm portion/In some embodiments, the augmented-reality headset includes at least one of the one or more artificial-reality processing or presentation devices is configured to receive power from the other metal-encased battery cell. In some embodiments, the metal-encased battery and the other metal-encased battery are electrically coupled to each other (e.g., in series or parallel). In some embodiments, the one or more artificial-reality processing or presentation devices is configured to receive power from the other metal-encased battery cell is housed within the frame portion, such that the power from the other metal-encased battery cell is routed from the other temple arm portion and to the frame portion for powering these AR components. For example, FIG. 1 shows that a second temple 106 is configured to arm include, a third metal-encased battery cell, a fourth metal-encased battery cell, and one or more different artificial-reality processing or presentation device(s) 113.

(A4) In some embodiments of A3, at least one edge of the metal-encased battery cell has a chamfered edge, and the chamfered edge is configured to further conform to the interior shape of the internal surface of the temple arm portion (e.g., FIG. 1 shows the first metal-encased battery cell 108 is chamfered along edge 122.

(A5) In some embodiments of A1-A4, at least one edge of metal-encased battery cell has a chamfered edge, and the chamfered edge is shaped to accommodate at least one of the one or more artificial-reality processing or presentation devices within the temple arm portion (e.g., .g., FIG. 1 shows the first metal-encased battery cell 108 is chamfered along edge 122 to accommodate the artificial-reality processing or presentation device 120).

(A6) In some embodiments of A1-A5, the at least one of the one or more artificial-reality processing or presentation devices is a speaker, and the chamfered edge of the metal-encased battery cell is shaped and sized to allow for the speaker (or microphone) to at least partially overlap the chamfered edge within the temple arm portion.

(A7) In some embodiments of A1-A6, the frame portion includes at least two semi-transparent lenses configured to allow for environmental light to pass through (e.g., the at least two lenses allow for directly viewing physical world (i.e., not displaying a video feed of an environment captured through a camera, such as would be the case with a VR headset and with certain types of mixed-reality headsets that also support VR applications, so, in other words, the augmented-reality headset is one that does not support VR applications instead it supports experiences that augment a user's physical environment only.). For example, FIG. 1 also shows, in exploded view 125, that the frame portion 102 includes a first semi-transparent lens 126 and a second semi-transparent lens 128.

(A8) In some embodiments of A1-A7, the augmented-reality headset further comprises another metal-encased battery cell having another exterior surface that defines another non-rectangular shape. In some embodiments, the other metal-encased battery cell is configured to be housed within the frame portion, and the other non-rectangular shape of the other exterior surface follows another interior shape of another internal surface of the frame portion. In some embodiments, at least one of the one or more artificial-reality processing or presentation devices is configured to receive power from the other metal-encased battery cell.

(A9) In some embodiments of A1-A8, the metal-encased battery cell includes at least one mounting component configured to secure the metal-encased battery cell to the temple arm portion, and the mounting component is one or more of: hooks, tabs, (leaf) springs, and screws. In some embodiments, the metal-encased battery is further secured using removable/replaceable adhesive. In some embodiments, the metal-encased battery cell is a structural component of the temple arm portion, meaning that the metal-encased battery increases torsional rigidity of the temple arm portion. For example, FIG. 2 shows a mounting component 214 that is configured to aid in mounting the metal-encased battery 200 to a temple arm.

(A10) In some embodiments of A1-A9, the metal-encased battery cell tapers in thickness across two axes. In other words, the metal-encased battery cell has a non-uniform thickness. For example, FIG. 3A shows that metal-encased battery 300 tapers along at least two of its axes.

(A11) In some embodiments of A1-A10, the metal-encased battery cell includes a surface that is hemispherical. For example, FIG. 3B shows that metal-encased battery 308 has a hemispherical surface 312.

(A12) In some embodiments of A1-A11, the metal-encased battery cell is made of steel.

(A13) In some embodiments of A1-A12, the metal-encased battery cell has a flangeless sealing construction, thereby increasing a battery cell area of the metal-encased battery cell that can be housed within the temple arm portion as compared to a battery cell that did use a flange-based construction. For example, FIG. 2 shows assembled metal-encased battery 200 does not include a flange when top portion 204 is welded to bottom portion 210.

(A14) In some embodiments of A1-A13, the metal-encased battery cell comprises at least two metal casings that are laser welded together. For example, FIG. 2 shows a top portion 204 that is laser welded to bottom portion 210 along laser welding seam 212.

(A15) In some embodiments of A1-A14, the metal-encased battery cell has a metal-based wall thickness of between 100-300 micrometers (µm). For example, FIG. 2 shows that a wll thickness can be between 100-300 micrometers (µm) to accommodate laser welding. In some embodiments, the wall thickness can vary for each component being welded together (e.g., a top portion can be 300 µm and a bottom portion can be 100 µm).

(A16) In some embodiments of A1-A15, the metal-encased battery has a largest cross-sectional dimension of at least 6 millimeters (mm) and a smallest cross-sectional dimension of at least 2.5 mm. In some embodiments, the largest cross-sectional dimension is a width dimension, e.g., width 2.5 mm in FIG. 3A; and the smallest cross-sectional dimension is a thickness, e.g., thickness 6 mm in FIG. 3A.

(A17) In some embodiments of A1-A16, the metal-encased battery cell has a stacked electrode design, wherein layers of the stacked electrode design are die-cut. For example, FIG. 2 shows a stack of electrodes 208 that conform to the shape of the void.

(B1) In accordance with some embodiments, one or more metal-encased battery cells formed in accordance with the metal-encased battery cells configured for use with the augmented-reality headsets of any of A1-A17.

(C1) In accordance with some embodiments, a respective portion of an augmented-reality headset (e.g., a frame portion or a temple arm portion) that includes one or more metal-encased battery cells formed in accordance with the metal-encased battery cells configured for use with the augmented-reality headsets of any of A1-A17.

(D1) In accordance with some embodiments, a method of using the augmented-reality headset of any of A1-A17.

(E1) In accordance with some embodiments, a non-transitory, computer-readable storage medium including instructions for causing presentation of an augmented-reality experience using the augmented-reality headset of any of A1-A17.

Figure 9:
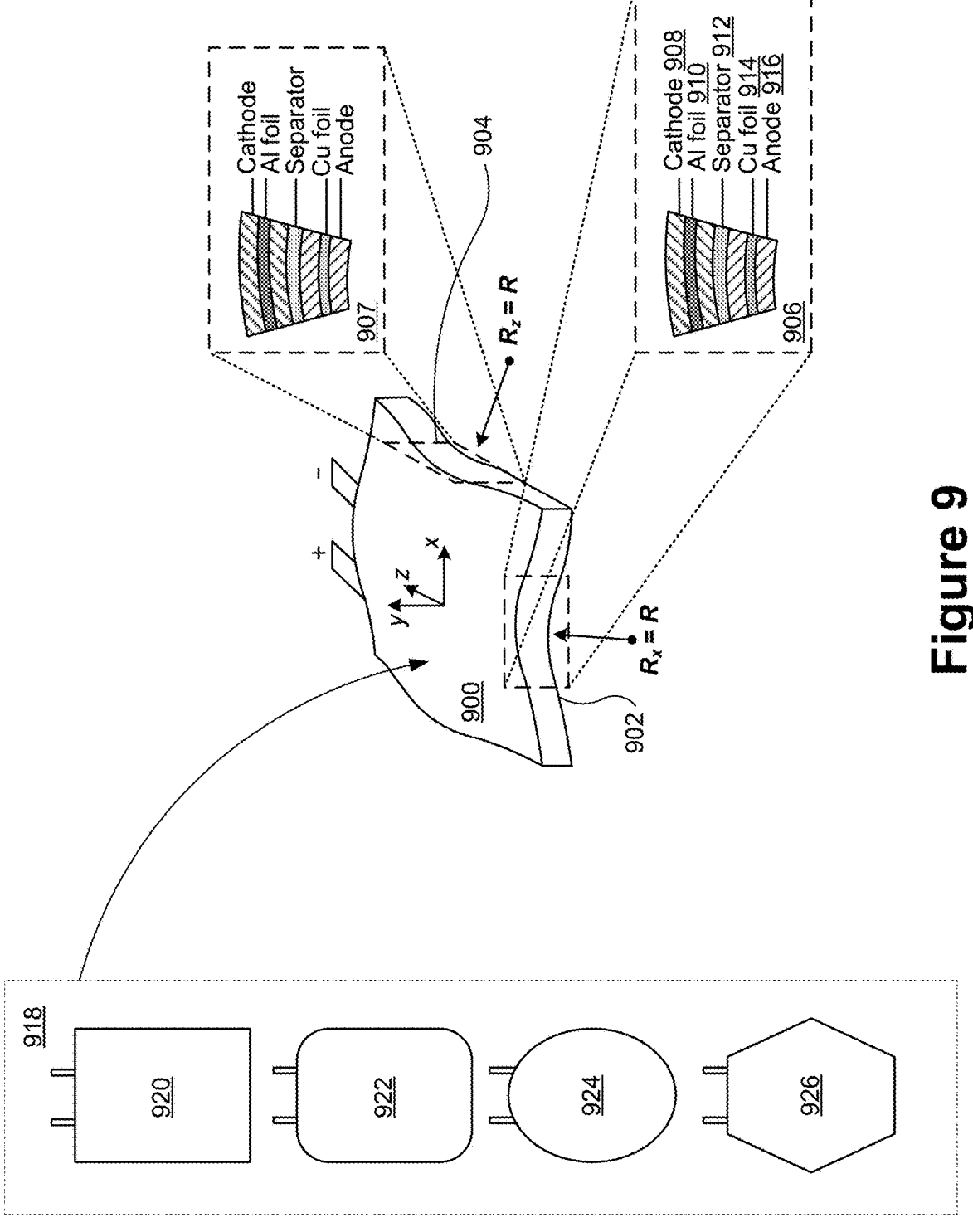
FIG. 9 illustrates a battery cell that is configured to be curved along at least two axes, in accordance with some embodiments.
Figure 10:
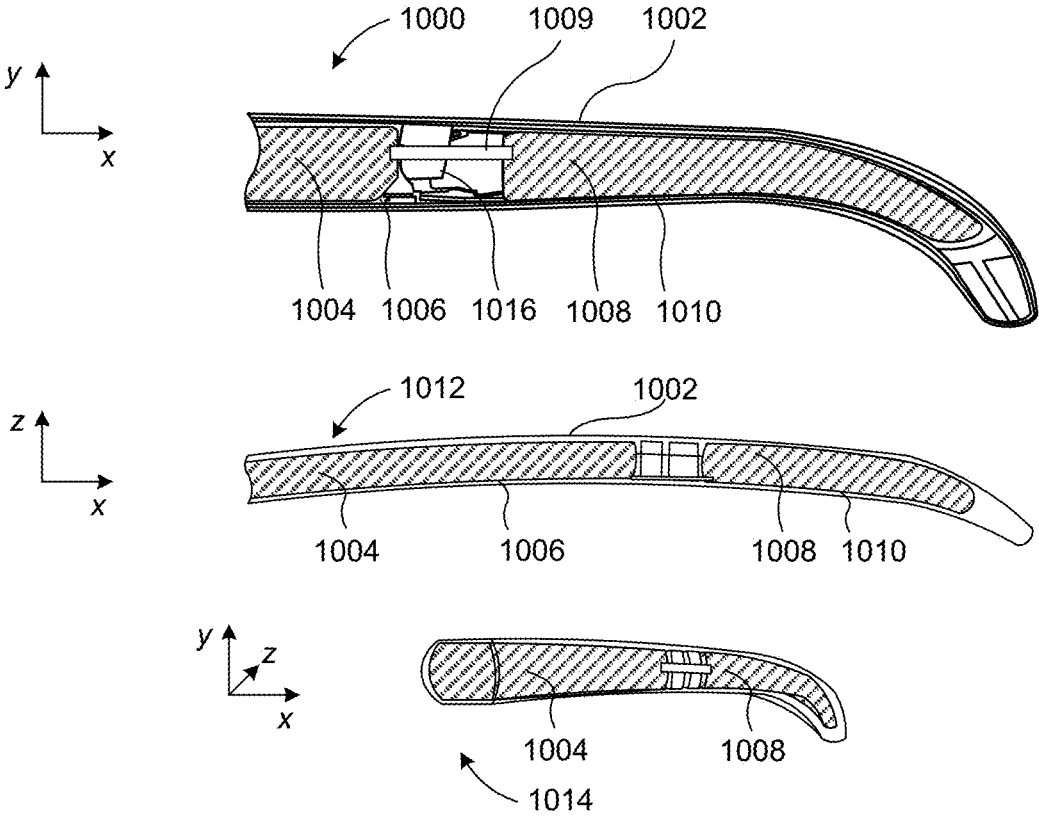
FIG. 10 illustrates three different views of a temple arm that includes a doubly-curved battery cells that have irregular shapes, in accordance with some embodiments.

(F1) In accordance with some embodiments, an artificial-reality headset comprises a first portion (e.g., an AR headset frame (e.g., frame 1104 shown in FIG. 11)), and a second portion (e.g., a temple arm coupled to the AR headset frame) that includes a void that is at least partially defined by a first curvature along a first axis and a second curvature along a second axis (e.g., that intersects with the first axis). The artificial-reality headset further comprises a battery located within the second portion that is configured to follow the first curvature along the first axis and follow the second curvature along the second axis, such that the battery has a shape that is curved along both the first axis and the second axis (e.g., the battery has a shape that matches a space in the second arm, such that the largest battery possible can be included in the second portion, thereby increasing operational time)) (e.g., FIG. 10 shows a battery 1004 that follows a curvature along both x-axis and y-axis). The battery is curved along both the first axis and the second axis in a resting position (i.e., the battery is not temporarily curved, it remains in this position without a bending force being applied to the battery). In some embodiments, the resting position meaning the battery retains its shape even when it is not placed within the void (e.g., the battery has a curved state that is predefined prior to being put in the void, as shown in FIG. 9). The battery is also configured to fill the void (e.g., a portion of the second portion allocated to store the battery) of the second portion. In some embodiments, the void is further defined by electronics located in the second portion. For example, FIG. 10 shows that battery 1004 fills first void 1006. The battery is further configured to provide power to one or more artificial-reality processing or presentation devices of the artificial-reality headset, where at least one of the one or more artificial-reality processing or presentation devices are located in the void (e.g., one or more processors, one or more projectors, one or more communication components, one or more cameras (e.g., image/video capturing, environment scanning), one or more microphones, etc.). For example, FIG. 10 shows that one or more artificial-reality processing or presentation devices 1016 are placed within the temple arm, and can partially define the first void 1006, and as a result can define the shape of a battery cell.

(F2) In some embodiments of F1, the first portion includes another void that is at least partially defined by a third curvature along a third axis and a fourth curvature along a fourth axis (e.g., that intersects with the third axis). The artificial-reality headset further comprises another battery located within the first portion that is configured to follow the third curvature along the third axis and follow the fourth curvature along the fourth axis, such that the other battery has a shape that is curved along both the third axis and the fourth axis. The other battery is curved along both the third axis and the fourth axis in a resting position, and the other battery is configured to fill the other void of the second portion. The other battery is further configured to provide power to the one or more artificial-reality processing or presentation devices of the artificial-reality headset. For example, FIG. 10 shows another battery 1008 placed within a second void 1010 of the temple arm 1002, and the other battery 1002 follows a different curvature than a curvature associated with the first void 1006.

(F3) In some embodiments of F1-F2, the battery and the other battery are electrically coupled with each other (e.g., FIG. 10 shows connector 1009 coupling battery cell 1004 to the other battery cell 1008).

Figure 11:
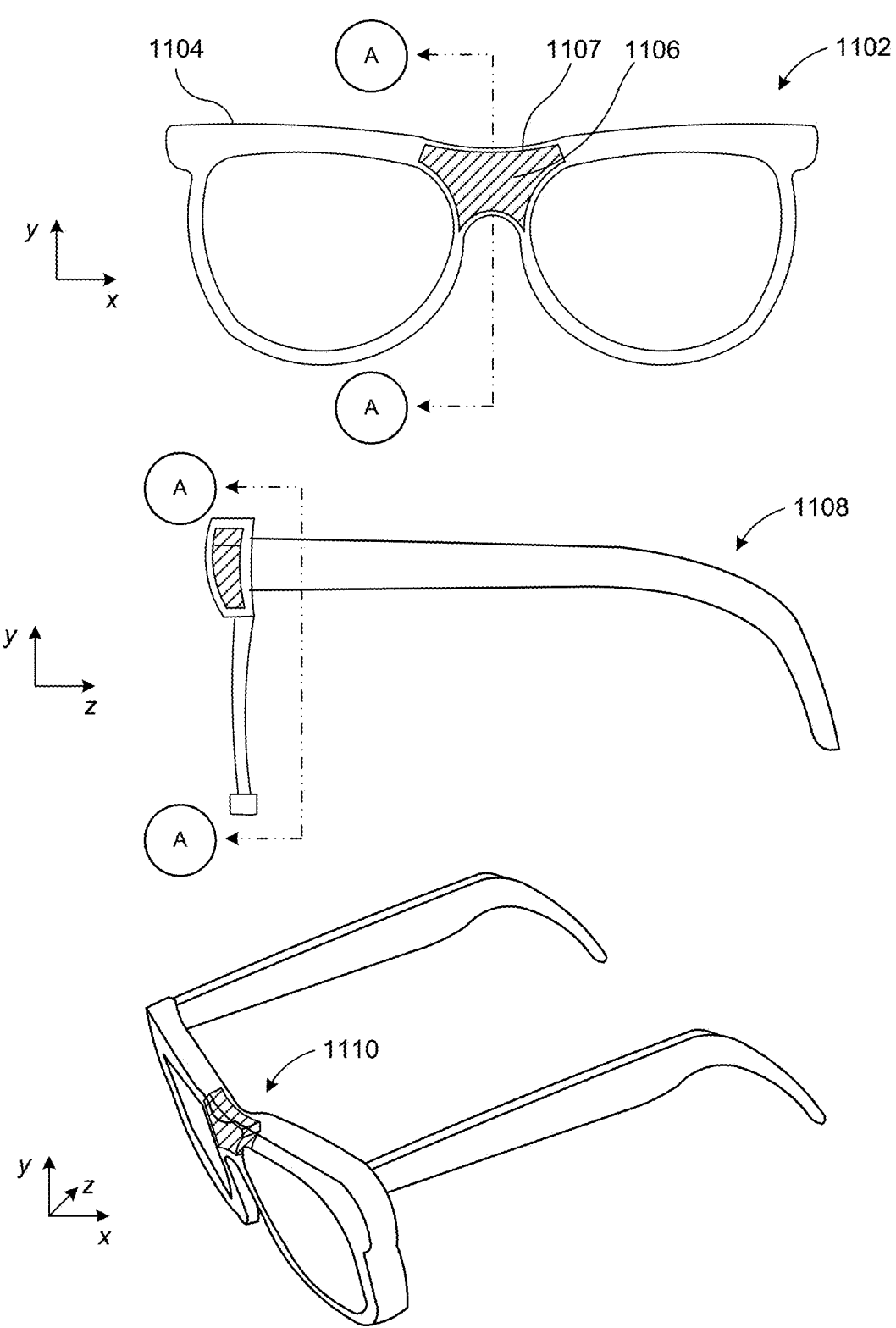
FIG. 11 shows three different views of a glasses frame that includes a battery cell that is curved along three axes to fit within a nose bridge of a glasses frame, in accordance with some embodiments.

(F4) In some embodiments of F1-F3, the second portion (e.g., glasses frame shown in FIG. 11) includes another void that is at least partially defined by the first curvature along the first axis and the second curvature along the second axis. Another battery (e.g., battery cell 1106 in FIG. 11) located within the second portion that is configured to follow the first curvature along the first axis and follow the second curvature along the second axis, such that the other battery has a shape that is curved along both the first axis and the second axis (e.g., FIG. 11 shows that battery cell 1106 is curved along multiple axes). The other battery is curved along both the first axis and the second axis in a resting position, and the other battery is configured to fill the other void of the second portion (e.g., FIG. 11 shows the battery cell 1106 placed within a nose bridge portion 110). The other battery is also configured to provide power to the one or more artificial-reality processing or presentation devices of the artificial-reality headset, wherein at least one of the one or more artificial-reality processing or presentation devices are located in the other void.

(F5) In some embodiments of F1-F4, the artificial reality headset comprises a third portion (e.g., a second temple arm that mirrors the first temple arm (e.g., the second portion)) that includes another void that is at least partially defined by a third curvature along a third axis and a fourth curvature along a fourth axis. Another battery located within the third portion that is configured to follow the third curvature along the third axis and follow the fourth curvature along the fourth axis, such that the other battery has a shape that is curved along both the third axis and the fourth axis. The other battery is curved along both the third axis and the fourth axis in a resting position, and the other battery is configured to fill the void of the third portion. The other battery is configured to provide power to the one or more artificial-reality processing or presentation devices of the artificial-reality headset. For example, FIG. 1 shows that batteries can be placed in both temple arms.

(F6) In some embodiments of F4, the second portion is a temple arm and the third portion is another temple arm.

(F7) In some embodiments of F4-F6, the battery and the other battery are electrically coupled with each other.

(F8) In some embodiments of F1-F7, the first portion is a lens frame.

(F9) In some embodiments of F1-F8, the second portion is a temple arm.

(F10) In some embodiments of F1-F9, the battery has a lithium-ion based chemistry.

(F11) In some embodiments of F1-F10, the battery is encased in a metal container (e.g., a steel, aluminum, alloy, magnesium can container). For example, FIGS. 2 and 3A-3B show that the battery can be a metal encased battery.

(F12) In some embodiments of F1-F11, an edge (e.g., a corner) of the battery is chamfered to conform to fill the void (e.g., FIG. 9 shows that the battery can be chamfered along any edge, as shown in box 918).

(F13) In some embodiments of F12, another edge of the battery is chamfered to conform to fill the void (e.g., FIGS. 1 and 10 show that the battery is chamfered to accommodate one or more artificial-reality processing or presentation devices).

(F14) In some embodiments of F1-F13, the battery is a structural component of the artificial reality headset.

(F15) In some embodiments of F1-F14, a portion of the battery has a trapezoidal shape, the trapezoidal shape is configured to further conform to the void (e.g., FIG. 11 shows battery 1106 have a trapezoidal shape configured to conform to the shape of a void in a noise bridge portion 1107).

(F16) In some embodiments of F1-F15, the battery is comprised of stacked electrodes (e.g., FIG. 2 shows a stacked battery cell 200 that is configured to be inserted into the voids shown in FIGS. 10-11).

(F17) In some embodiments of F1-F16, the first curvature corresponds with a first radius, and the second curvature corresponds to a second radius, and the first radius is different from the second radius (e.g., the description of FIG. 9 indicates that curved profile 902 and curved profile 904 can have different radius curvatures).

(G1) In accordance with some embodiments, a method of using the artificial-reality headset of any of F1-F17.

(H1) In accordance with some embodiments, a non-transitory, computer-readable storage medium including instructions for causing presentation of an artificial-reality experience using the artificial-reality headset of any of F1-F17.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

Depicted in FIGS. 4A-8C are additional example artificial-reality devices and associated accessories into which the non-rectangular metal-encased battery cells described above can be incorporated.

As described herein, a processor (e.g., a central processing unit (CPU), microcontroller unit (MCU), etc.), is an electronic component that is responsible for executing instructions and controlling the operation of an electronic device (e.g., a wrist-wearable device 500, a head-wearable device, an HIPD 700, a smart textile-based garment 800, or other computer system). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include: (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware, and/or boot loaders); (iii) flash memory, magnetic disk storage devices, optical disk storage devices, other non-volatile solid state storage devices, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, JSON data, etc.). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) bluetooth interfaces configured to allow devices to communicate with each other, including bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) WiFi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) light sensors (e.g., time-of-flight sensors, infrared light sensors, visible light sensors, etc.), and/or sensor for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; (iii) messaging applications; (iv) media-streaming applications; (v) financial applications; (vi) calendars; (vii) clocks; (viii) web-browsers; (ix) social media applications; (x) camera applications; (xi) web-based applications; (xii) health applications; (xiii) artificial reality applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

Figure 4A:
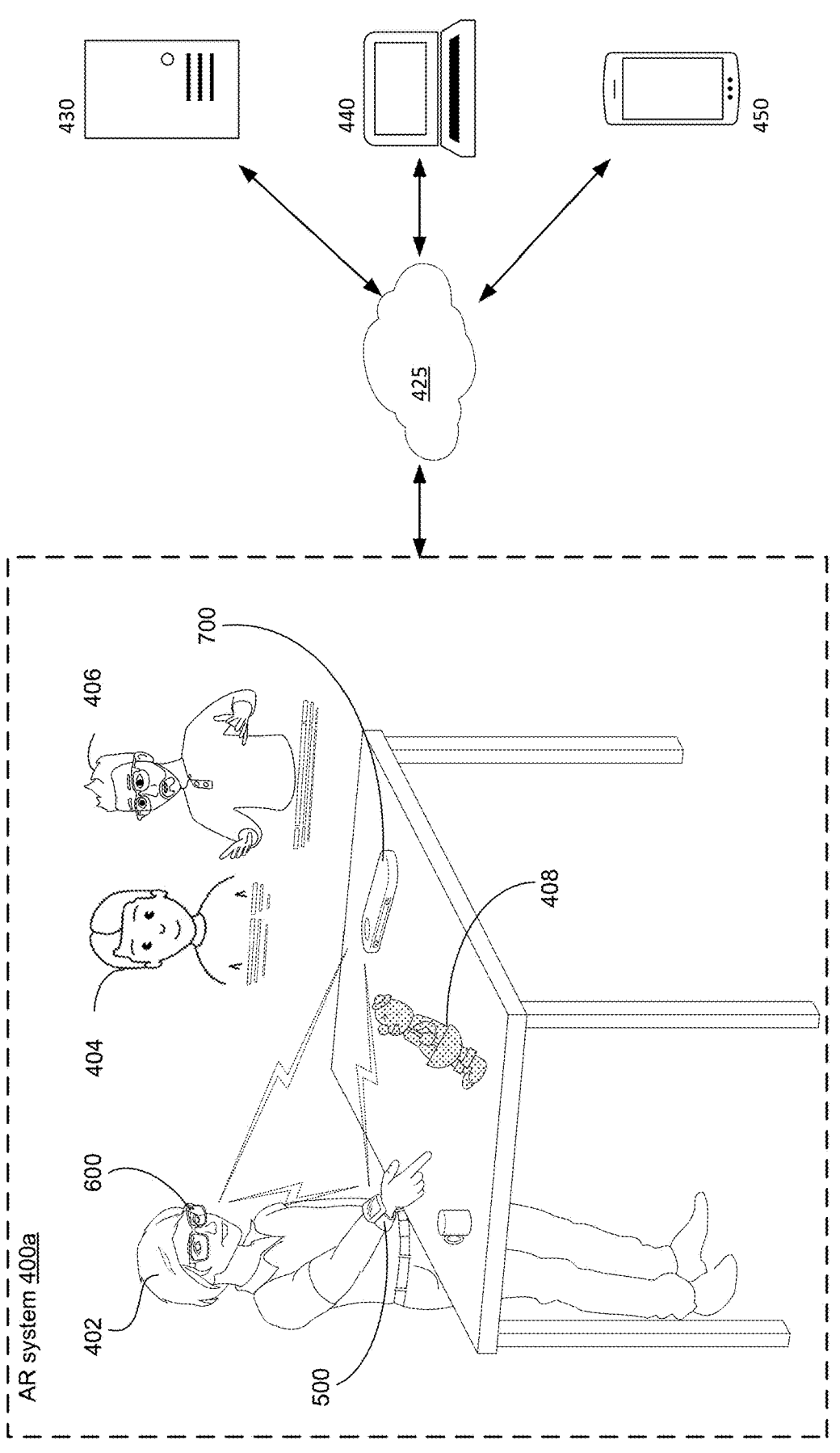
Figure 4B:
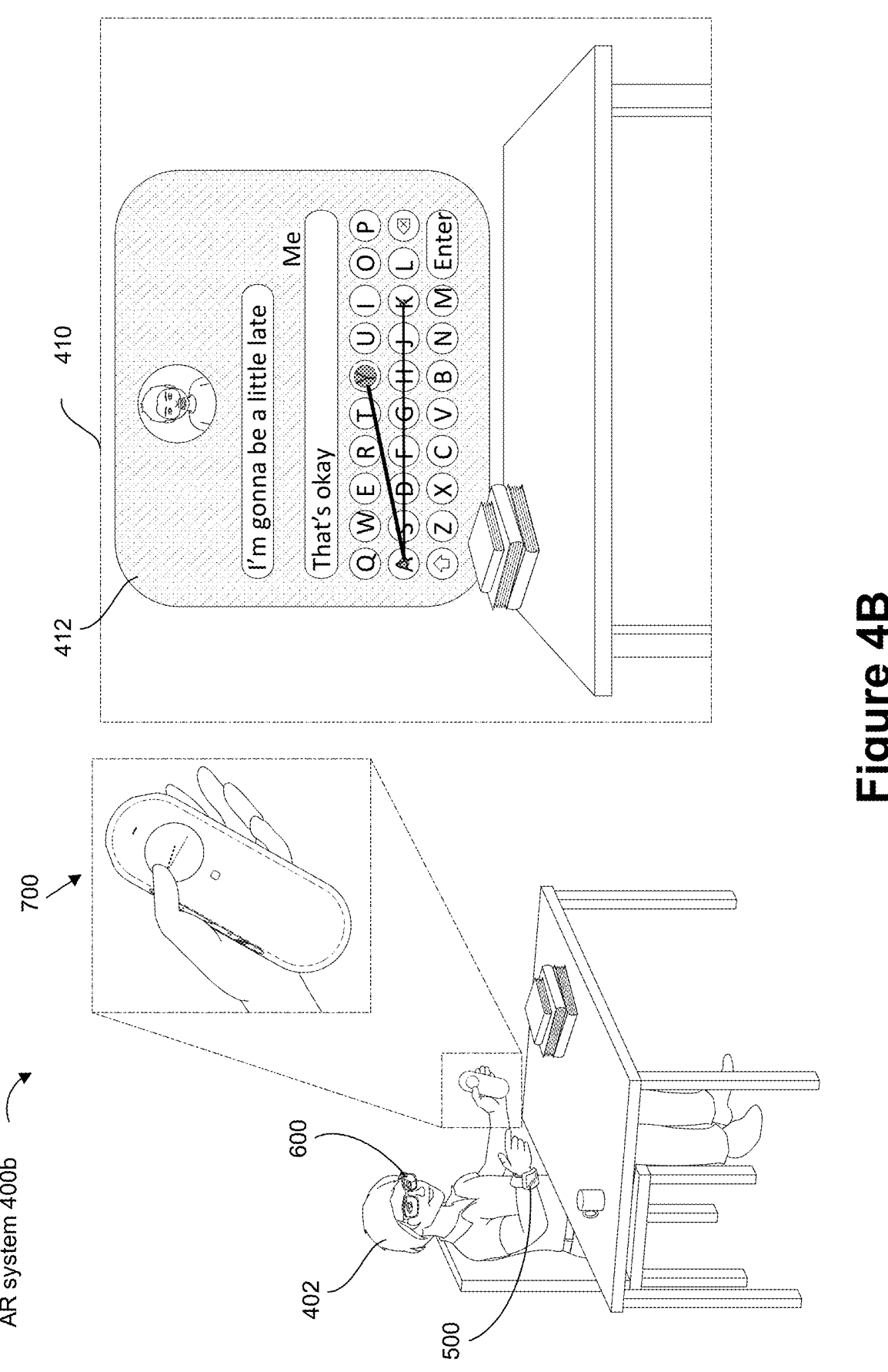
Figures 1, 4C:
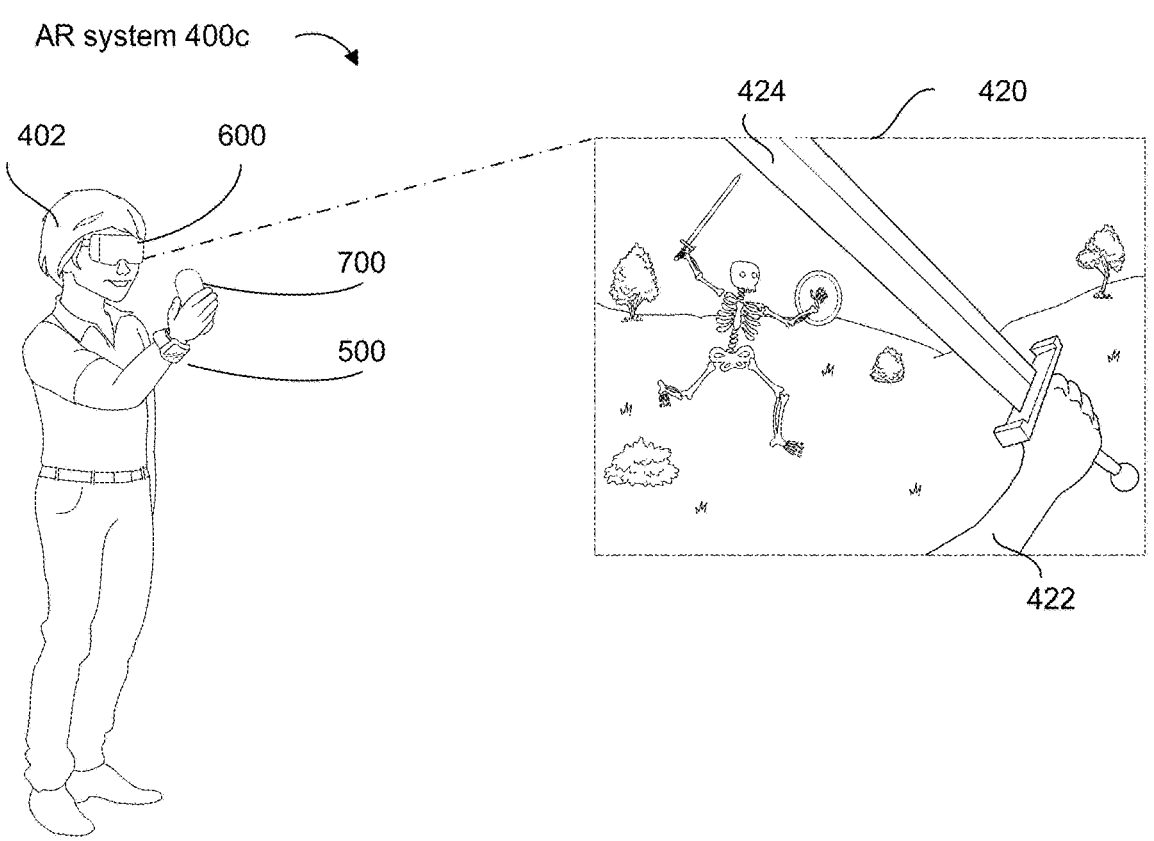
Figures 2, 4C:
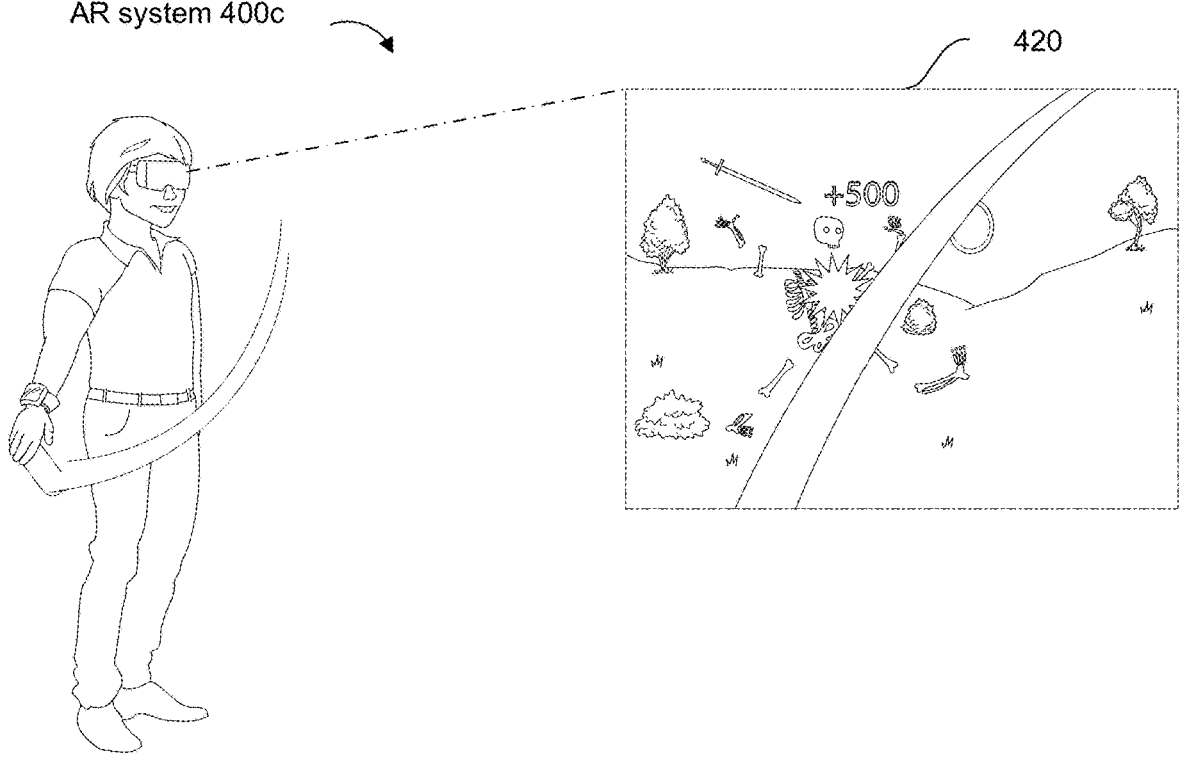
Figures 1, 4D:
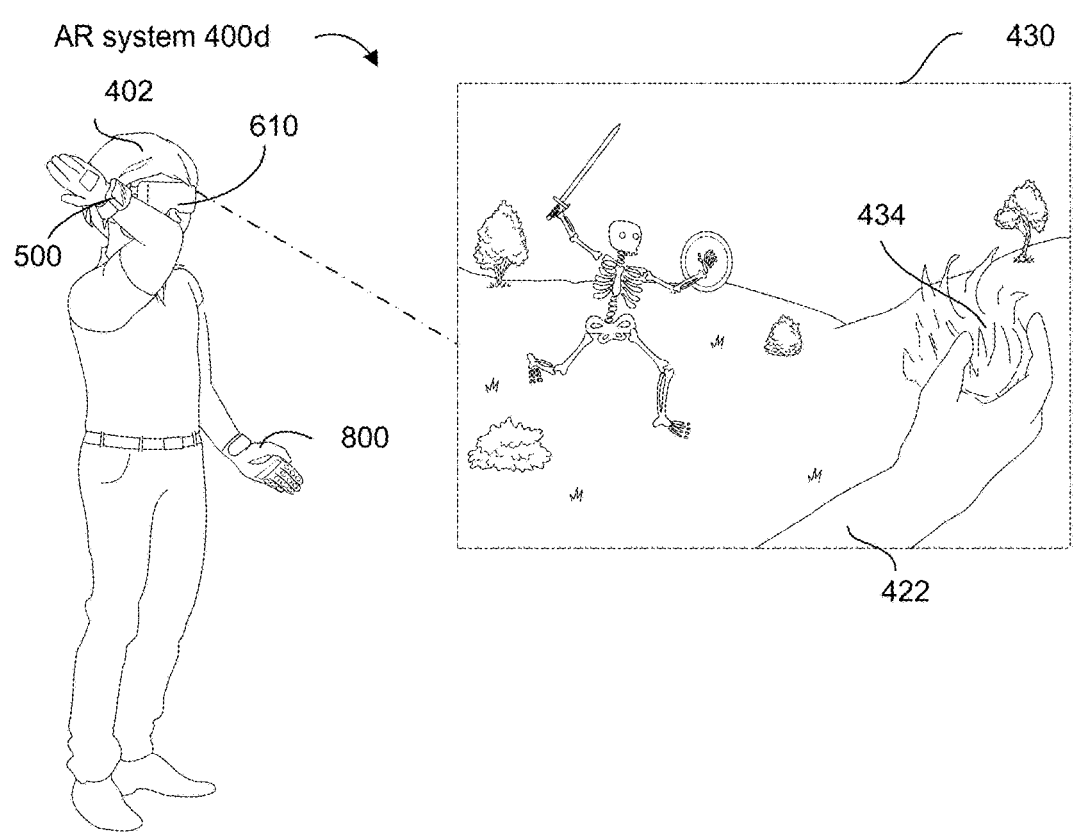
Figures 2, 4D:
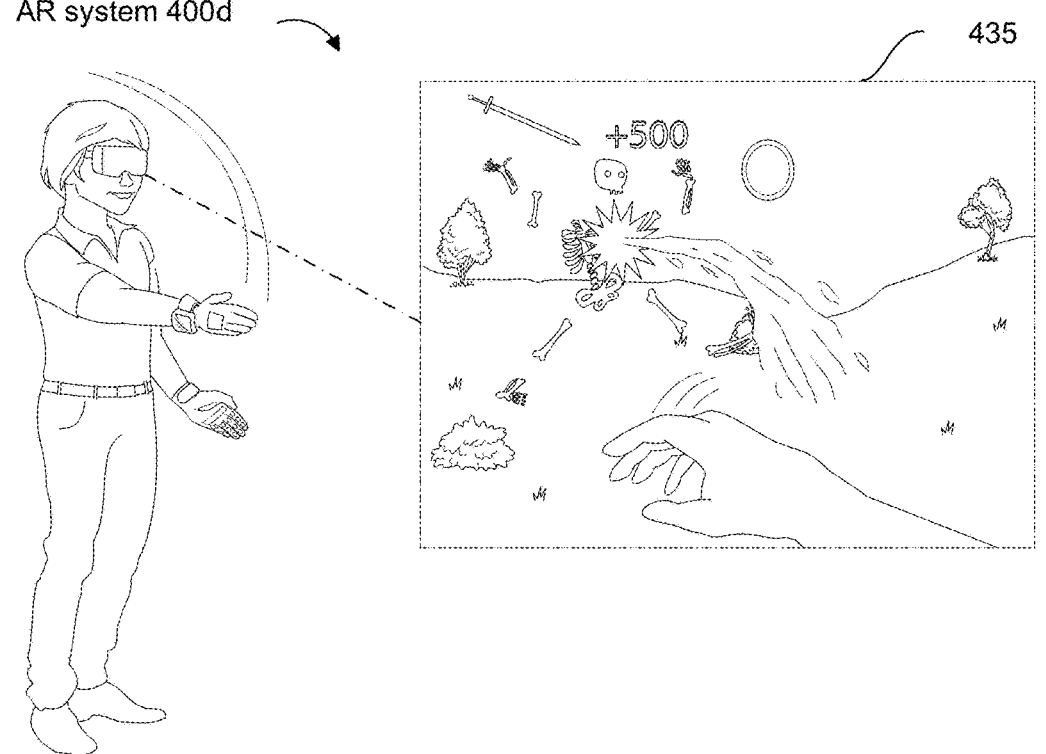

FIGS. 4A-4D-2 illustrate example artificial-reality systems, in accordance with some embodiments. FIG. 4A shows a first AR system 400a and first example user interactions using a wrist-wearable device 500, a head-wearable device (e.g., AR device 600), and/or a handheld intermediary processing device (HIPD) 700. FIG. 4B shows a second AR system 400b and second example user interactions using a wrist-wearable device 500, AR device 600, and/or an HIPD 700. FIGS. 4C-1 and 4C-2 show a third AR system 400c and third example user interactions using a wrist-wearable device 500, a head-wearable device (e.g., VR device 610), and/or an HIPD 700. FIGS. 4D-1 and 4D-2 show a fourth AR system 400d and fourth example user interactions using a wrist-wearable device 500, VR device 610, and/or a smart textile-based garment 800 (e.g., wearable gloves haptic gloves). As the skilled artisan will appreciate upon reading the descriptions provided herein, the above-example AR systems (described in detail below) can perform various functions and/or operations.

The wrist-wearable device 500 and one or more of its components are described below in reference to FIGS. 5A-5B; the head-wearable devices and their one or more components are described below in reference to FIGS. 6A-6D; and the HIPD 700 and its one or more components are described below in reference to FIGS. 7A-7B. The smart textile-based garment 800 and its one or more components are described below in reference to FIGS. 8A-8C. The wrist-wearable device 500, the head-wearable devices, and/or the HIPD 700 can communicatively couple via a network 425 (e.g., cellular, near field, Wi-Fi, personal area network, wireless LAN, etc.). Additionally, the wrist-wearable device 500, the head-wearable devices, and/or the HIPD 700 can also communicatively couple with one or more servers 430, computers 440 (e.g., laptops, computers, etc.), mobile devices 450 (e.g., smartphones, tablets, etc.), and/or other electronic devices via the network 425 (e.g., cellular, near field, Wi-Fi, personal area network, wireless LAN, etc.) Similarly, the smart textile-based garment 800, when used, can also communicatively couple with the wrist-wearable device 500, the head-wearable devices, the HIPD 700, the one or more servers 430, the computers 440, the mobile devices 450, and/or other electronic devices via the network 425.

Turning to FIG. 4A, a user 402 is shown wearing the wrist-wearable device 500 and the AR device 600, and having the HIPD 700 on their desk. The wrist-wearable device 500, the AR device 600, and the HIPD 700 facilitate user interaction with an AR environment. In particular, as shown by the first AR system 400a, the wrist-wearable device 500, the AR device 600, and/or the HIPD 700 cause presentation of one or more avatars 404, digital representations of contacts 406, and virtual objects 408. As discussed below, the user 402 can interact with the one or more avatars 404, digital representations of the contacts 406, and virtual objects 408 via the wrist-wearable device 500, the AR device 600, and/or the HIPD 700.

The user 402 can use any of the wrist-wearable device 500, the AR device 600, and/or the HIPD 700 to provide user inputs. For example, the user 402 can perform one or more hand gestures that are detected by the wrist-wearable device 500 (e.g., using one or more EMG sensors and/or IMUs, described below in reference to FIGS. 5A-5B) and/or AR device 600 (e.g. using one or more image sensor or camera, described below in reference to FIGS. 6A-6B) to provide a user input. Alternatively, or additionally, the user 402 can provide a user input via one or more touch surfaces of the wrist-wearable device 500, the AR device 600, and/or the HIPD 700, and/or voice commands captured by a microphone of the wrist-wearable device 500, the AR device 600, and/or the HIPD 700. In some embodiments, the wrist-wearable device 500, the AR device 600, and/or the HIPD 700 include a digital assistant to help the user in providing a user input (e.g., completing a sequence of operations, suggesting different operations or commands, providing reminders, confirming a command, etc.). In some embodiments, the user 402 can provide a user input via one or more facial gestures and/or facial expressions. For example, cameras of the wrist-wearable device 500, the AR device 600, and/or the HIPD 700 can track the user 402's eyes for navigating a user interface.

The wrist-wearable device 500, the AR device 600, and/or the HIPD 700 can operate alone or in conjunction to allow the user 402 to interact with the AR environment. In some embodiments, the HIPD 700 is configured to operate as a central hub or control center for the wrist-wearable device 500, the AR device 600, and/or another communicatively coupled device. For example, the user 402 can provide an input to interact with the AR environment at any of the wrist-wearable device 500, the AR device 600, and/or the HIPD 700, and the HIPD 700 can identify one or more back-end and front-end tasks to cause the performance of the requested interaction and distribute instructions to cause the performance of the one or more back-end and front-end tasks at the wrist-wearable device 500, the AR device 600, and/or the HIPD 700. In some embodiments, a back-end task is background processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 7A-7B, the HIPD 700 can perform the back-end tasks and provide the wrist-wearable device 500 and/or the AR device 600 operational data corresponding to the performed back-end tasks such that the wrist-wearable device 500 and/or the AR device 600 can perform the front-end tasks. In this way, the HIPD 700, which has more computational resources and greater thermal headroom than the wrist-wearable device 500 and/or the AR device 600, performs computationally intensive tasks and reduces the computer resource utilization and/or power usage of the wrist-wearable device 500 and/or the AR device 600.

In the example shown by the first AR system 400a, the HIPD 700 identifies one or more back-end tasks and front-end tasks associated with a user request to initiate an AR video call with one or more other users (represented by the avatar 404 and the digital representation of the contact 406) and distributes instructions to cause the performance of the one or more back-end tasks and front-end tasks. In particular, the HIPD 700 performs back-end tasks for processing and/or rendering image data (and other data) associated with the AR video call and provides operational data associated with the performed back-end tasks to the AR device 600 such that the AR device 600 perform front-end tasks for presenting the AR video call (e.g., presenting the avatar 404 and the digital representation of the contact 406).

In some embodiments, the HIPD 700 can operate as a focal or anchor point for causing the presentation of information. This allows the user 402 to be generally aware of where information is presented. For example, as shown in the first AR system 400a, the avatar 404 and the digital representation of the contact 406 are presented above the HIPD 700. In particular, the HIPD 700 and the AR device 600 operate in conjunction to determine a location for presenting the avatar 404 and the digital representation of the contact 406. In some embodiments, information can be presented a predetermined distance from the HIPD 700 (e.g., within 5 meters). For example, as shown in the first AR system 400a, virtual object 408 is presented on the desk some distance from the HIPD 700. Similar to the above example, the HIPD 700 and the AR device 600 can operate in conjunction to determine a location for presenting the virtual object 408. Alternatively, in some embodiments, presentation of information is not bound by the HIPD 700. More specifically, the avatar 404, the digital representation of the contact 406, and the virtual object 408 do not have to be presented within a predetermined distance of the HIPD 700.

User inputs provided at the wrist-wearable device 500, the AR device 600, and/or the HIPD 700 are coordinated such that the user can use any device to initiate, continue, and/or complete an operation. For example, the user 402 can provide a user input to the AR device 600 to cause the AR device 600 to present the virtual object 408 and, while the virtual object 408 is presented by the AR device 600, the user 402 can provide one or more hand gestures via the wrist-wearable device 500 to interact and/or manipulate the virtual object 408.

FIG. 4B shows the user 402 wearing the wrist-wearable device 500 and the AR device 600, and holding the HIPD 700. In the second AR system 400b, the wrist-wearable device 500, the AR device 600, and/or the HIPD 700 are used to receive and/or provide one or more messages to a contact of the user 402. In particular, the wrist-wearable device 500, the AR device 600, and/or the HIPD 700 detect and coordinate one or more user inputs to initiate a messaging application and prepare a response to a received message via the messaging application.

In some embodiments, the user 402 initiates, via a user input, an application on the wrist-wearable device 500, the AR device 600, and/or the HIPD 700 that causes the application to initiate on at least one device. For example, in the second AR system 400b the user 402 performs a hand gesture associated with a command for initiating a messaging application (represented by messaging user interface 412); the wrist-wearable device 500 detects the hand gesture; and, based on a determination that the user 402 is wearing AR device 600, causes the AR device 600 to present a messaging user interface 412 of the messaging application. The AR device 600 can present the messaging user interface 412 to the user 402 via its display (e.g., as shown by user 402's field of view 410). In some embodiments, the application is initiated and ran on the device (e.g., the wrist-wearable device 500, the AR device 600, and/or the HIPD 700) that detects the user input to initiate the application, and the device provides another device operational data to cause the presentation of the messaging application. For example, the wrist-wearable device 500 can detect the user input to initiate a messaging application; initiate and run the messaging application; and provide operational data to the AR device 600 and/or the HIPD 700 to cause presentation of the messaging application. Alternatively, the application can be initiated and ran at a device other than the device that detected the user input. For example, the wrist-wearable device 500 can detect the hand gesture associated with initiating the messaging application and cause the HIPD 700 to run the messaging application and coordinate the presentation of the messaging application.

Further, the user 402 can provide a user input provided at the wrist-wearable device 500, the AR device 600, and/or the HIPD 700 to continue and/or complete an operation initiated are at another device. For example, after initiating the messaging application via the wrist-wearable device 500 and while the AR device 600 present the messaging user interface 412, the user 402 can provide an input at the HIPD 700 to prepare a response (e.g., shown by the swipe gesture performed on the HIPD 700). The user 402's gestures performed on the HIPD 700 can be provided and/or displayed on another device. For example, the user 402's swipe gestured performed on the HIPD 700 are displayed on a virtual keyboard of the messaging user interface 412 displayed by the AR device 600.

In some embodiments, the wrist-wearable device 500, the AR device 600, the HIPD 700, and/or other communicatively couple device can present one or more notifications to the user 402. The notification can be an indication of a new message, an incoming call, an application update, a status update, etc. The user 402 can select the notification via the wrist-wearable device 500, the AR device 600, the HIPD 700, and cause presentation of an application or operation associated with the notification on at least one device. For example, the user 402 can receive a notification that a message was received at the wrist-wearable device 500, the AR device 600, the HIPD 700, and/or other communicatively couple device and provide a user input at the wrist-wearable device 500, the AR device 600, and/or the HIPD 700 to review the notification, and the device detecting the user input can cause an application associated with the notification to be initiated and/or presented at the wrist-wearable device 500, the AR device 600, and/or the HIPD 700.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 600 can present to the user 402 game application data and the HIPD 700 can use a controller to provide inputs to the game. Similarly, the user 402 can use the wrist-wearable device 500 to initiate a camera of the AR device 600, and the user can use the wrist-wearable device 500, the AR device 600, and/or the HIPD 700 to manipulate the image capture (e.g., zoom in or out, apply filters, etc.) and capture image data.

Turning to FIGS. 4C-1 and 4C-2, the user 402 is shown wearing the wrist-wearable device 500 and a VR device 610, and holding the HIPD 700. In the third AR system 400c, the wrist-wearable device 500, the VR device 610, and/or the HIPD 700 are used to interact within an AR environment, such as a VR game or other AR application. While the VR device 610 present a representation of a VR game (e.g., first AR game environment 420) to the user 402, the wrist-wearable device 500, the VR device 610, and/or the HIPD 700 detect and coordinate one or more user inputs to allow the user 402 to interact with the VR game.

In some embodiments, the user 402 can provide a user input via the wrist-wearable device 500, the VR device 610, and/or the HIPD 700 that causes an action in a corresponding AR environment. For example, the user 402 in the third AR system 400c (shown in FIG. 4C-1) raises the HIPD 700 to prepare for a swing in the first AR game environment 420. The VR device 610, responsive to the user 402 raising the HIPD 700, causes the AR representation of the user 422 to perform a similar action (e.g., raise a virtual object, such as a virtual sword 424). In some embodiments, each device uses respective sensor data and/or image data to detect the user input and provide an accurate representation of the user 402's motion. For example, image sensors 758 (e.g., SLAM cameras or other cameras discussed below in FIGS. 7A and 7B) of the HIPD 700 can be used to detect a position of the 700 relative to the user 402's body such that the virtual object can be positioned appropriately within the first AR game environment 420; sensor data from the wrist-wearable device 500 can be used to detect a velocity at which the user 402 raises the HIPD 700 such that the AR representation of the user 422 and the virtual sword 424 are synchronized with the user 402's movements; and image sensors 626 (FIGS. 6A-6C) of the VR device 610 can be used to represent the user 402's body, boundary conditions, or real-world objects within the first AR game environment 420.

In FIG. 4C-2, the user 402 performs a downward swing while holding the HIPD 700. The user 402's downward swing is detected by the wrist-wearable device 500, the VR device 610, and/or the HIPD 700 and a corresponding action is performed in the first AR game environment 420. In some embodiments, the data captured by each device is used to improve the user's experience within the AR environment. For example, sensor data of the wrist-wearable device 500 can be used to determine a speed and/or force at which the downward swing is performed and image sensors of the HIPD 700 and/or the VR device 610 can be used to determine a location of the swing and how it should be represented in the first AR game environment 420, which, in turn, can be used as inputs for the AR environment (e.g., game mechanics, which can use detected speed, force, locations, and/or aspects of the user 402's actions to classify a user's inputs (e.g., user performs a light strike, hard strike, critical strike, glancing strike, miss, etc.) or calculate an output (e.g., amount of damage)).

While the wrist-wearable device 500, the VR device 610, and/or the HIPD 700 are described as detecting user inputs, in some embodiments, user inputs are detected at a single device (with the single device being responsible for distributing signals to the other devices for performing the user input). For example, the HIPD 700 can operate an application for generating the first AR game environment 420 and provide the VR device 610 with corresponding data for causing the presentation of the first AR game environment 420, as well as detect the 402's movements (while holding the HIPD 700) to cause the performance of corresponding actions within the first AR game environment 420. Additionally or alternatively, in some embodiments, operational data (e.g., sensor data, image data, application data, device data, and/or other data) of one or more devices is provide to a single device (e.g., the HIPD 700) to process the operational data and cause respective devices to perform an action associated with processed operational data.

FIGS. 4D-1 and 4D-2, the user 402 is shown wearing the wrist-wearable device 500, the VR device 610, smart textile-based garments 800. In the fourth AR system 400d, the wrist-wearable device 500, the VR device 610, and/or the smart textile-based garments 800 are used to interact within an AR environment (e.g., any AR system described above in reference to FIGS. 4A-4C-2). While the VR device 610 present a representation of a VR game (e.g., second AR game environment 430) to the user 402, the wrist-wearable device 500, the VR device 610, and/or the smart textile-based garments 800 detect and coordinate one or more user inputs to allow the user 402 to interact with the AR environment.

In some embodiments, the user 402 can provide a user input via the wrist-wearable device 500, the VR device 610, and/or the smart textile-based garments 800 that causes an action in a corresponding AR environment. For example, the user 402 in the fourth AR system 400d (shown in FIG. 4D-1) raises a hand wearing the smart textile-based garments 800 to prepare for cast spell or throw an object within the second AR game environment 430. The VR device 610, responsive to the user 402 holding up their hand (wearing a smart textile-based garments 800), causes the AR representation of the user 422 to perform a similar action (e.g., hold a virtual object, such as a casting a fireball 434). In some embodiments, each device uses respective sensor data and/or image data to detect the user input and provide an accurate representation of the user 402's motion.

In FIG. 4D-2, the user 402 performs a throwing motion while wearing the smart textile-based garment 800. The user 402's throwing motion is detected by the wrist-wearable device 500, the VR device 610, and/or the smart textile-based garments 800 and a corresponding action is performed in the second AR game environment 430. As described above, the data captured by each device is used to improve the user's experience within the AR environment. Although not shown, the smart textile-based garments 800 can be used in conjunction with an AR device 610 and/or an HIPD 700.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Example Wrist-Wearable Devices

Figure 5A:
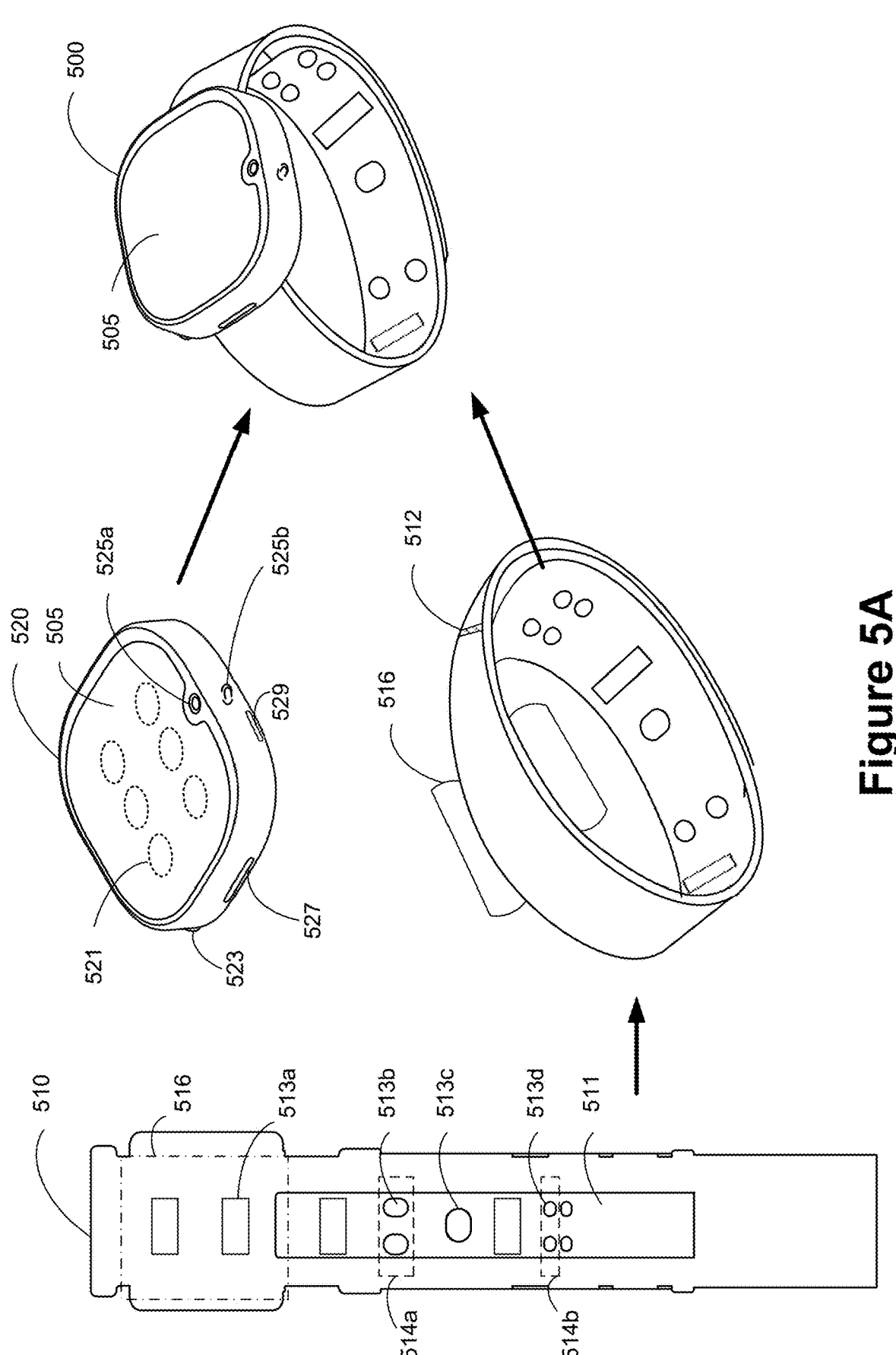
FIGS. 5A-5B illustrate an example wrist-wearable device, in accordance with some embodiments.
Figure 5B:
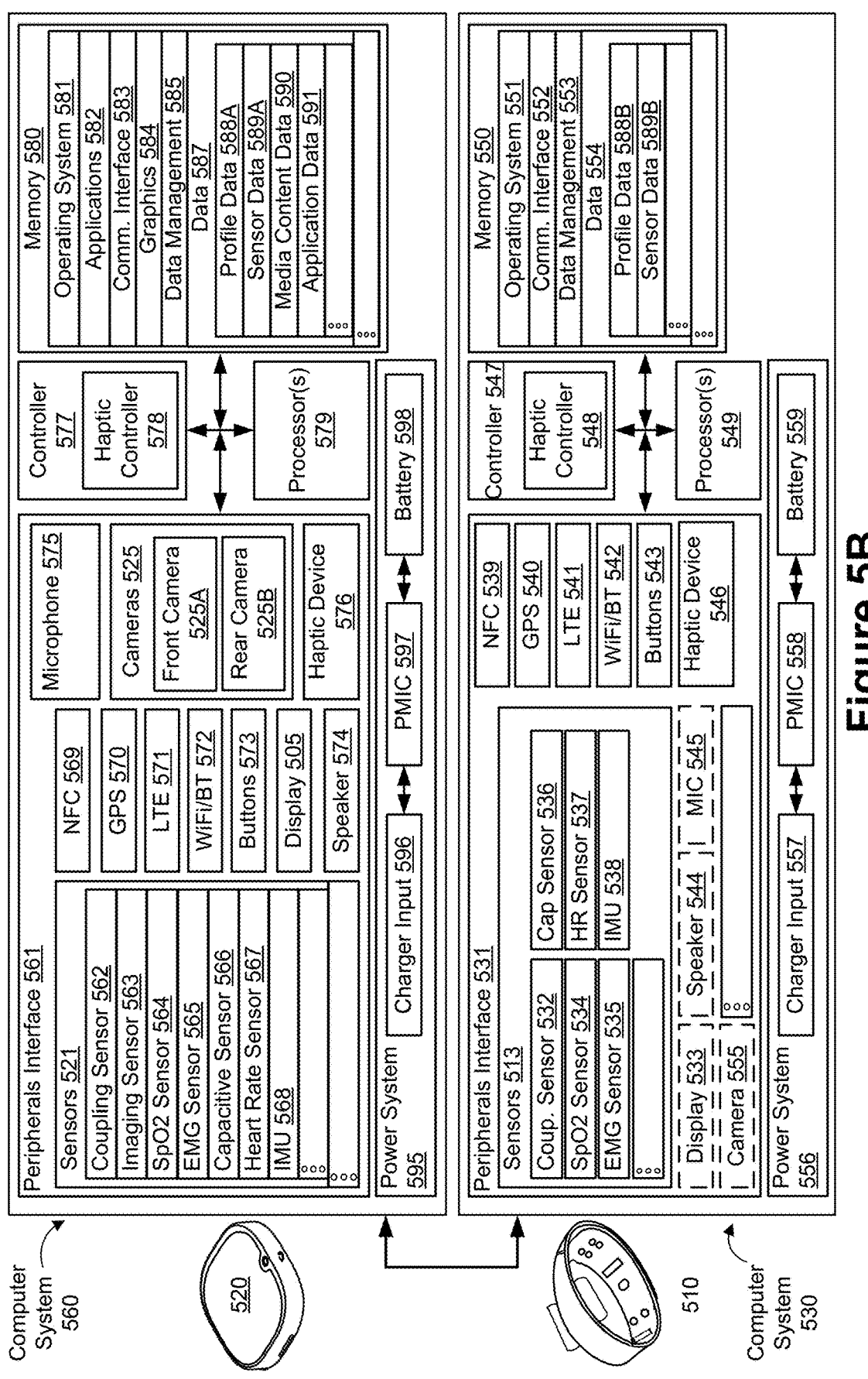

FIGS. 5A and 5B illustrate an example wrist-wearable device 500, in accordance with some embodiments. FIG. 5A illustrates components of the wrist-wearable device 500, which can be used individually or in combination, including combinations that include other electronic devices and/or electronic components.

FIG. 5A shows a wearable band 510 and a watch body 520 (or capsule) being coupled, as discussed below, to form the wrist-wearable device 500. The wrist-wearable device 500 can perform various functions and/or operations associated with navigating through user interfaces and selectively opening applications.

As will be described in more detail below, operations executed by the wrist-wearable device 500 can include: (i) presenting content to a user (e.g., displaying visual content via a display 505); (ii) detecting (e.g., sensing) user input (e.g., sensing a touch on peripheral button 523 and/or at a touch screen of the display 505, a hand gesture detected by sensors (e.g., biopotential sensors)); (iii) sensing biometric data via one or more sensors 513 (e.g., neuromuscular signals, heart rate, temperature, sleep, etc.); messaging (e.g., text, speech, video, etc.); image capture via one or more imaging devices or cameras 525; wireless communications (e.g., cellular, near field, Wi-Fi, personal area network, etc.); location determination; financial transactions; providing haptic feedback; alarms; notifications; biometric authentication; health monitoring; sleep monitoring; etc.

The above-example functions can be executed independently in the watch body 520, independently in the wearable band 510, and/or via an electronic communication between the watch body 520 and the wearable band 510. In some embodiments, functions can be executed on the wrist-wearable device 500 while an AR environment is being presented (e.g., via one of the AR systems 400a to 400d). As the skilled artisan will appreciate upon reading the descriptions provided herein, the novel wearable devices described herein can be used with other types of AR environments.

The wearable band 510 can be configured to be worn by a user such that an inner (or inside) surface of the wearable structure 511 of the wearable band 510 is in contact with the user's skin. When worn by a user, sensors 513 contact the user's skin. The sensors 513 can sense biometric data such as a user's heart rate, saturated oxygen level, temperature, sweat level, neuromuscular signal sensors, or a combination thereof. The sensors 513 can also sense data about a user's environment including a user's motion, altitude, location, orientation, gait, acceleration, position, or a combination thereof. In some embodiment, the sensors 513 are configured to track a position and/or motion of the wearable band 510. The one or more sensors 513 can include any of the sensors defined above and/or discussed below with respect to FIG. 5B.

The one or more sensors 513 can be distributed on an inside and/or an outside surface of the wearable band 510. In some embodiments, the one or more sensors 513 are uniformly spaced along the wearable band 510. Alternatively, in some embodiments, the one or more sensors 513 are positioned at distinct points along the wearable band 510. As shown in FIG. 5A, the one or more sensors 513 can be the same or distinct. For example, in some embodiments, the one or more sensors 513 can be shaped as a pill (e.g., sensor 513*a*), an oval, a circle a square, an oblong (e.g., sensor 513*c*) and/or any other shape that maintains contact with the user's skin (e.g., such that neuromuscular signal and/or other biometric data can be accurately measured at the user's skin). In some embodiments, the one or more sensors 513 are aligned to form pairs of sensors (e.g., for sensing neuromuscular signals based on differential sensing within each respective sensor). For example, sensor 513*b* is aligned with an adjacent sensor to form sensor pair 514*a* and sensor 513*d* aligned with an adjacent sensor to form sensor pair 514*b*. In some embodiments, the wearable band 510 does not have a sensor pair. Alternatively, in some embodiments, the wearable band 510 has a predetermined number of sensor pairs (one pair of sensors, three pairs of sensors, four pairs of sensors, six pairs of sensors, sixteen pairs of sensors, etc.).

The wearable band 510 can include any suitable number of sensors 513. In some embodiments, the number and arrangement of sensors 513 depends on the particular application for which the wearable band 510 is used. For instance, a wearable band 510 configured as an armband, wristband, or chest-band may include a plurality of sensors 513 with different number of sensors 513 and different arrangement for each use case, such as medical use cases as compared to gaming or general day-to-day use cases.

In accordance with some embodiments, the wearable band 510 further includes an electrical ground electrode and a shielding electrode. The electrical ground and shielding electrodes, like the sensors 513, can be distributed on the inside surface of the wearable band 510 such that they contact a portion of the user's skin. For example, the electrical ground and shielding electrodes can be at an inside surface of coupling mechanism 516 or an inside surface of a wearable structure 511. The electrical ground and shielding electrodes can be formed and/or use the same components as the sensors 513. In some embodiments, the wearable band 510 includes more than one electrical ground electrode and more than one shielding electrode.

The sensors 513 can be formed as part of the wearable structure 511 of the wearable band 510. In some embodiments, the sensors 513 are flush or substantially flush with the wearable structure 511 such that they do not extend beyond the surface of the wearable structure 511. While flush with the wearable structure 511, the sensors 513 are still configured to contact the user's skin (e.g., via a skin-contacting surface). Alternatively, in some embodiments, the sensors 513 extend beyond the wearable structure 511 a predetermined distance (e.g., 0.1-2 mm) to make contact and depress into the user's skin. In some embodiment, the sensors 513 are coupled to an actuator (not shown) configured to adjust an extension height (e.g., a distance from the surface of the wearable structure 511) of the sensors 513 such that the sensors 513 make contact and depress into the user's skin. In some embodiments, the actuators adjust the extension height between 0.01 mm-1.2 mm. This allows the user to customize the positioning of the sensors 513 to improve the overall comfort of the wearable band 510 when worn while still allowing the sensors 513 to contact the user's skin. In some embodiments, the sensors 513 are indistinguishable from the wearable structure 511 when worn by the user.

The wearable structure 511 can be formed of an elastic material, elastomers, etc. configured to be stretched and fitted to be worn by the user. In some embodiments, the wearable structure 511 is a textile or woven fabric. As described above, the sensors 513 can be formed as part of a wearable structure 511. For example, the sensors 513 can be molded into the wearable structure 511 or be integrated into a woven fabric (e.g., the sensors 513 can be sewn into the fabric and mimic the pliability of fabric (e.g., the sensors 513 can be constructed from a series woven strands of fabric)).

The wearable structure 511 can include flexible electronic connectors that interconnect the sensors 513, the electronic circuitry, and/or other electronic components (described below in reference to FIG. 5B) that are enclosed in the wearable band 510. In some embodiments, the flexible electronic connectors are configured to interconnect the sensors 513, the electronic circuitry, and/or other electronic components of the wearable band 510 with respective sensors and/or other electronic components of another electronic device (e.g., watch body 520). The flexible electronic connectors are configured to move with the wearable structure 511 such that the user adjustment to the wearable structure 511 (e.g., resizing, pulling, folding, etc.) does not stress or strain the electrical coupling of components of the wearable band 510.

As described above, the wearable band 510 is configured to be worn by a user. In particular, the wearable band 510 can be shaped or otherwise manipulated to be worn by a user. For example, the wearable band 510 can be shaped to have a substantially circular shape such that it can be configured to be worn on the user's lower arm or wrist. Alternatively, the wearable band 510 can be shaped to be worn on another body part of the user, such as the user's upper arm (e.g., around a bicep), forearm, chest, legs, etc. The wearable band 510 can include a retaining mechanism 512 (e.g., a buckle, a hook and loop fastener, etc.) for securing the wearable band 510 to the user's wrist or other body part. While the wearable band 510 is worn by the user, the sensors 513 sense data (referred to as sensor data) from the user's skin. In particular, the sensors 513 of the wearable band 510 obtain (e.g., sense and record) neuromuscular signals.

The sensed data (e.g., sensed neuromuscular signals) can be used to detect and/or determine the user's intention to perform certain motor actions. In particular, the sensors 513 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 505 of the wrist-wearable device 500 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 513 can be used to provide a user with an enhanced interaction with a physical object (e.g., devices communicatively coupled with the wearable band 510) and/or a virtual object in an artificial-reality application generated by an artificial-reality system (e.g., user interface objects presented on the display 505, or another computing device (e.g., a smartphone)).

In some embodiments, the wearable band 510 includes one or more haptic devices 546 (FIG. 5B; e.g., a vibratory haptic actuator) that are configured to provide haptic feedback (e.g., a cutaneous and/or kinesthetic sensation, etc.) to the user's skin. The sensors 513, and/or the haptic devices 546 can be configured to operate in conjunction with multiple applications including, without limitation, health monitoring, social media, games, and artificial reality (e.g., the applications associated with artificial reality).

The wearable band 510 can also include coupling mechanism 516 (e.g., a cradle or a shape of the coupling mechanism can correspond to shape of the watch body 520 of the wrist-wearable device 500) for detachably coupling a capsule (e.g., a computing unit) or watch body 520 (via a coupling surface of the watch body 520) to the wearable band 510. In particular, the coupling mechanism 516 can be configured to receive a coupling surface proximate to the bottom side of the watch body 520 (e.g., a side opposite to a front side of the watch body 520 where the display 505 is located), such that a user can push the watch body 520 downward into the coupling mechanism 516 to attach the watch body 520 to the coupling mechanism 516. In some embodiments, the coupling mechanism 516 can be configured to receive a top side of the watch body 520 (e.g., a side proximate to the front side of the watch body 520 where the display 505 is located) that is pushed upward into the cradle, as opposed to being pushed downward into the coupling mechanism 516. In some embodiments, the coupling mechanism 516 is an integrated component of the wearable band 510 such that the wearable band 510 and the coupling mechanism 516 are a single unitary structure. In some embodiments, the coupling mechanism 516 is a type of frame or shell that allows the watch body 520 coupling surface to be retained within or on the wearable band 510 coupling mechanism 516 (e.g., a cradle, a tracker band, a support base, a clasp, etc.).

The coupling mechanism 516 can allow for the watch body 520 to be detachably coupled to the wearable band 510 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 520 to the wearable band 510 and to decouple the watch body 520 from the wearable band 510. For example, a user can twist, slide, turn, push, pull, or rotate the watch body 520 relative to the wearable band 510, or a combination thereof, to attach the watch body 520 to the wearable band 510 and to detach the watch body 520 from the wearable band 510. Alternatively, as discussed below, in some embodiments, the watch body 520 can be decoupled from the wearable band 510 by actuation of the release mechanism 529.

The wearable band 510 can be coupled with a watch body 520 to increase the functionality of the wearable band 510 (e.g., converting the wearable band 510 into a wrist-wearable device 500, adding an additional computing unit and/or battery to increase computational resources and/or a battery life of the wearable band 510, adding additional sensors to improve sensed data, etc.). As described above, the wearable band 510 (and the coupling mechanism 516) is configured to operate independently (e.g., execute functions independently) from watch body 520. For example, the coupling mechanism 516 can include one or more sensors 513 that contact a user's skin when the wearable band 510 is worn by the user and provide sensor data for determining control commands.

A user can detach the watch body 520 (or capsule) from the wearable band 510 in order to reduce the encumbrance of the wrist-wearable device 500 to the user. For embodiments in which the watch body 520 is removable, the watch body 520 can be referred to as a removable structure, such that in these embodiments the wrist-wearable device 500 includes a wearable portion (e.g., the wearable band 510) and a removable structure (the watch body 520).

Turning to the watch body 520, the watch body 520 can have a substantially rectangular or circular shape. The watch body 520 is configured to be worn by the user on their wrist or on another body part. More specifically, the watch body 520 is sized to be easily carried by the user, attached on a portion of the user's clothing, and/or coupled to the wearable band 510 (forming the wrist-wearable device 500). As described above, the watch body 520 can have a shape corresponding to the coupling mechanism 516 of the wearable band 510. In some embodiments, the watch body 520 includes a single release mechanism 529 or multiple release mechanisms (e.g., two release mechanisms 529 positioned on opposing sides of the watch body 520, such as spring-loaded buttons) for decoupling the watch body 520 and the wearable band 510. The release mechanism 529 can include, without limitation, a button, a knob, a plunger, a handle, a lever, a fastener, a clasp, a dial, a latch, or a combination thereof.

A user can actuate the release mechanism 529 by pushing, turning, lifting, depressing, shifting, or performing other actions on the release mechanism 529. Actuation of the release mechanism 529 can release (e.g., decouple) the watch body 520 from the coupling mechanism 516 of the wearable band 510, allowing the user to use the watch body 520 independently from wearable band 510, and vice versa. For example, decoupling the watch body 520 from the wearable band 510 can allow the user to capture images using rear-facing camera 525B. Although the is shown positioned at a corner of watch body 520, the release mechanism 529 can be positioned anywhere on watch body 520 that is convenient for the user to actuate. In addition, in some embodiments, the wearable band 510 can also include a respective release mechanism for decoupling the watch body 520 from the coupling mechanism 516. In some embodiments, the release mechanism 529 is optional and the watch body 520 can be decoupled from the coupling mechanism 516 as described above (e.g., via twisting, rotating, etc.).

The watch body 520 can include one or more peripheral buttons 523 and 527 for performing various operations at the watch body 520. For example, the peripheral buttons 523 and 527 can be used to turn on or wake (e.g., transition from a sleep state to an active state) the display 505, unlock the watch body 520, increase or decrease a volume, increase or decrease a brightness, interact with one or more applications, interact with one or more user interfaces, etc. Additionally, or alternatively, in some embodiments, the display 505 operates as a touch screen and allows the user to provide one or more inputs for interacting with the watch body 520.

In some embodiments, the watch body 520 includes one or more sensors 521. The sensors 521 of the watch body 520 can be the same or distinct from the sensors 513 of the wearable band 510. The sensors 521 of the watch body 520 can be distributed on an inside and/or an outside surface of the watch body 520. In some embodiments, the sensors 521 are configured to contact a user's skin when the watch body 520 is worn by the user. For example, the sensors 521 can be placed on the bottom side of the watch body 520 and the coupling mechanism 516 can be a cradle with an opening that allows the bottom side of the watch body 520 to directly contact the user's skin. Alternatively, in some embodiments, the watch body 520 does not include sensors that are configured to contact the user's skin (e.g., including sensors internal and/or external to the watch body 520 that configured to sense data of the watch body 520 and the watch body 520's surrounding environment). In some embodiment, the sensors 513 are configured to track a position and/or motion of the watch body 520.

The watch body 520 and the wearable band 510 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 520 and the wearable band 510 can share data sensed by the sensors 513 and 521, as well as application and device specific information (e.g., active and/or available applications, output devices (e.g., display, speakers, etc.), input devices (e.g., touch screen, microphone, imaging sensors, etc.).

In some embodiments, the watch body 520 can include, without limitation, a front-facing camera 525A and/or a rear-facing camera 525B, sensors 521 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 563; FIG. 5B), a touch sensor, a sweat sensor, etc.). In some embodiments, the watch body 520 can include one or more haptic devices 576 (FIG. 5B; a vibratory haptic actuator) that is configured to provide haptic feedback (e.g., a cutaneous and/or kinesthetic sensation, etc.) to the user. The sensors 521 and/or the haptic device 576 can also be configured to operate in conjunction with multiple applications including, without limitation, health monitoring applications, social media applications, game applications, and artificial reality applications (e.g., the applications associated with artificial reality).

As described above, the watch body 520 and the wearable band 510, when coupled, can form the wrist-wearable device

500. When coupled, the watch body 520 and wearable band 510 operate as a single device to execute functions (operations, detections, communications, etc.) described herein. In some embodiments, each device is provided with particular instructions for performing the one or more operations of the wrist-wearable device 500. For example, in accordance with a determination that the watch body 520 does not include neuromuscular signal sensors, the wearable band 510 can include alternative instructions for performing associated instructions (e.g., providing sensed neuromuscular signal data to the watch body 520 via a different electronic device). Operations of the wrist-wearable device 500 can be performed by the watch body 520 alone or in conjunction with the wearable band 510 (e.g., via respective processors and/or hardware components) and vice versa. In some embodiments, operations of the wrist-wearable device 500, the watch body 520, and/or the wearable band 510 can be performed in conjunction with one or more processors and/or hardware components of another communicatively coupled device (e.g., the HIPD 700; FIGS. 7A-7B).

As described below with reference to the block diagram of FIG. 5B, the wearable band 510 and/or the watch body 520 can each include independent resources required to independently execute functions. For example, the wearable band 510 and/or the watch body 520 can each include a power source (e.g., a battery), a memory, data storage, a processor (e.g., a central processing unit (CPU)), communications, a light source, and/or input/output devices.

FIG. 5B shows block diagrams of a computing system 530 corresponding to the wearable band 510, and a computing system 560 corresponding to the watch body 520, according to some embodiments. A computing system of the wrist-wearable device 500 includes a combination of components of the wearable band computing system 530 and the watch body computing system 560, in accordance with some embodiments.

The watch body 520 and/or the wearable band 510 can include one or more components shown in watch body computing system 560. In some embodiments, a single integrated circuit includes all or a substantial portion of the components of the watch body computing system 560 are included in a single integrated circuit. Alternatively, in some embodiments, components of the watch body computing system 560 are included in a plurality of integrated circuits that are communicatively coupled. In some embodiments, the watch body computing system 560 is configured to couple (e.g., via a wired or wireless connection) with the wearable band computing system 530, which allows the computing systems to share components, distribute tasks, and/or perform other operations described herein (individually or as a single device).

The watch body computing system 560 can include one or more processors 579, a controller 577, a peripherals interface 561, a power system 595, and memory (e.g., a memory 580), each of which are defined above and described in more detail below.

The power system 595 can include a charger input 596, a power-management integrated circuit (PMIC) 597, and a battery 598, each are which are defined above. In some embodiments, a watch body 520 and a wearable band 510 can have respective charger inputs (e.g., charger input 596 and 557), respective batteries (e.g., battery 598 and 559), and can share power with each other (e.g., the watch body 520 can power and/or charge the wearable band 510, and vice versa). Although watch body 520 and/or the wearable band 510 can include respective charger inputs, a single charger input can charge both devices when coupled. The watch body 520 and the wearable band 510 can receive a charge using a variety of techniques. In some embodiments, the watch body 520 and the wearable band 510 can use a wired charging assembly (e.g., power cords) to receive the charge. Alternatively, or in addition, the watch body 520 and/or the wearable band 510 can be configured for wireless charging. For example, a portable charging device can be designed to mate with a portion of watch body 520 and/or wearable band 510 and wirelessly deliver usable power to a battery of watch body 520 and/or wearable band 510. The watch body 520 and the wearable band 510 can have independent power systems (e.g., power system 595 and 556) to enable each to operate independently. The watch body 520 and wearable band 510 can also share power (e.g., one can charge the other) via respective PMICs (e.g., PMICs 597 and 558) that can share power over power and ground conductors and/or over wireless charging antennas.

In some embodiments, the peripherals interface 561 can include one or more sensors 521, many of which listed below are defined above. The sensors 521 can include one or more coupling sensor 562 for detecting when the watch body 520 is coupled with another electronic device (e.g., a wearable band 510). The sensors 521 can include imaging sensors 563 (one or more of the cameras 525, and/or separate imaging sensors 563 (e.g., thermal-imaging sensors)). In some embodiments, the sensors 521 include one or more SpO2 sensors 564. In some embodiments, the sensors 521 include one or more biopotential-signal sensors (e.g., EMG sensors 565, which may be disposed on a user-facing portion of the watch body 520 and/or the wearable band 510). In some embodiments, the sensors 521 include one or more capacitive sensors 566. In some embodiments, the sensors 521 include one or more heart rate sensors 567. In some embodiments, the sensors 521 include one or more IMUs 568. In some embodiments, one or more IMUs 568 can be configured to detect movement of a user's hand or other location that the watch body 520 is placed or held).

In some embodiments, the peripherals interface 561 includes a near-field communication (NFC) component 569, a global-position system (GPS) component 570, a long-term evolution (LTE) component 571, and/or a Wi-Fi and/or Bluetooth communication component 572. In some embodiments, the peripherals interface 561 includes one or more buttons 573 (e.g., the peripheral buttons 523 and 527 in FIG. 5A), which, when selected by a user, cause operation to be performed at the watch body 520. In some embodiments, the peripherals interface 561 includes one or more indicators, such as a light emitting diode (LED), to provide a user with visual indicators (e.g., message received, low battery, active microphone and/or camera, etc.).

The watch body 520 can include at least one display 505, for displaying visual representations of information or data to the user, including user-interface elements and/or three-dimensional virtual objects. The display can also include a touch screen for inputting user inputs, such as touch gestures, swipe gestures, and the like. The watch body 520 can include at least one speaker 574 and at least one microphone 575 for providing audio signals to the user and receiving audio input from the user. The user can provide user inputs through the microphone 575 and can also receive audio output from the speaker 574 as part of a haptic event provided by the haptic controller 578. The watch body 520 can include at least one camera 525, including a front-facing camera 525A and a rear-facing camera 525B. The cameras 525 can include ultra-wide-angle cameras, wide angle cameras, fish-eye cameras, spherical cameras, telephoto cameras, a depth-sensing cameras, or other types of cameras.

The watch body computing system 560 can include one or more haptic controllers 578 and associated componentry (e.g., haptic devices 576) for providing haptic events at the watch body 520 (e.g., a vibrating sensation or audio output in response to an event at the watch body 520). The haptic controllers 578 can communicate with one or more haptic devices 576, such as electroacoustic devices, including a speaker of the one or more speakers 574 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 578 can provide haptic events to that are capable of being sensed by a user of the watch body 520. In some embodiments, the one or more haptic controllers 578 can receive input signals from an application of the applications 582.

In some embodiments, the computer system 530 and/or the computer system 560 can include memory 580, which can be controlled by a memory controller of the one or more controllers 577 and/or one or more processors 579. In some embodiments, software components stored in the memory 580 include one or more applications 582 configured to perform operations at the watch body 520. In some embodiments, the one or more applications 582 include games, word processors, messaging applications, calling applications, web browsers, social media applications, media streaming applications, financial applications, calendars, clocks, etc. In some embodiments, software components stored in the memory 580 include one or more communication interface modules 583 as defined above. In some embodiments, software components stored in the memory 580 include one or more graphics modules 584 for rendering, encoding, and/or decoding audio and/or visual data; and one or more data management modules 585 for collecting, organizing, and/or providing access to the data 587 stored in memory 580. In some embodiments, one or more of applications 582 and/or one or more modules can work in conjunction with one another to perform various tasks at the watch body 520.

In some embodiments, software components stored in the memory 580 can include one or more operating systems 581 (e.g., a Linux-based operating system, an Android operating system, etc.). The memory 580 can also include data 587. The data 587 can include profile data 588A, sensor data 589A, media content data 590, and application data 591.

It should be appreciated that the watch body computing system 560 is an example of a computing system within the watch body 520, and that the watch body 520 can have more or fewer components than shown in the watch body computing system 560, combine two or more components, and/or have a different configuration and/or arrangement of the components. The various components shown in watch body computing system 560 are implemented in hardware, software, firmware, or a combination thereof, including one or more signal processing and/or application-specific integrated circuits.

Turning to the wearable band computing system 530, one or more components that can be included in the wearable band 510 are shown. The wearable band computing system 530 can include more or fewer components than shown in the watch body computing system 560, combine two or more components, and/or have a different configuration and/or arrangement of some or all of the components. In some embodiments, all, or a substantial portion of the components of the wearable band computing system 530 are included in a single integrated circuit. Alternatively, in some embodiments, components of the wearable band computing system 530 are included in a plurality of integrated circuits that are communicatively coupled. As described above, in some embodiments, the wearable band computing system 530 is configured to couple (e.g., via a wired or wireless connection) with the watch body computing system 560, which allows the computing systems to share components, distribute tasks, and/or perform other operations described herein (individually or as a single device).

The wearable band computing system 530, similar to the watch body computing system 560, can include one or more processors 549, one or more controllers 547 (including one or more haptics controller 548), a peripherals interface 531 that can includes one or more sensors 513 and other peripheral devices, power source (e.g., a power system 556), and memory (e.g., a memory 550) that includes an operating system (e.g., an operating system 551), data (e.g., data 554 including profile data 588B, sensor data 589B, etc.), and one or more modules (e.g., a communications interface module 552, a data management module 553, etc.).

The one or more sensors 513 can be analogous to sensors 521 of the computer system 560 and in light of the definitions above. For example, sensors 513 can include one or more coupling sensors 532, one or more SpO2 sensor 534, one or more EMG sensors 535, one or more capacitive sensor 536, one or more heart rate sensor 537, and one or more IMU 538.

The peripherals interface 531 can also include other components analogous to those included in the peripheral interface 561 of the computer system 560, including an NFC component 539, a GPS component 540, an LTE component 541, a Wi-Fi and/or Bluetooth communication component 542, and/or one or more haptic devices 576 as described above in reference to peripherals interface 561. In some embodiments, the peripherals interface 531 includes one or more buttons 543, a display 533, a speaker 544, a microphone 545, and a camera 555. In some embodiments, the peripherals interface 531 includes one or more indicators, such as an LED.

It should be appreciated that the wearable band computing system 530 is an example of a computing system within the wearable band 510, and that the wearable band 510 can have more or fewer components than shown in the wearable band computing system 530, combine two or more components, and/or have a different configuration and/or arrangement of the components. The various components shown in wearable band computing system 530 can be implemented in one or a combination of hardware, software, firmware, including one or more signal processing and/or application-specific integrated circuits.

The wrist-wearable device 500 with respect to FIG. 5A is an example of the wearable band 510 and the watch body 520 coupled, so the wrist-wearable device 500 will be understood to include the components shown and described for the wearable band computing system 530 and the watch body computing system 560. In some embodiments, wrist-wearable device 500 has a split architecture (e.g., a split mechanical architecture, a split electrical architecture) between the watch body 520 and the wearable band 510. In other words, all of the components shown in the wearable band computing system 530 and the watch body computing system 560 can be housed or otherwise disposed in a combined watch device 500, or within individual components of the watch body 520, wearable band 510, and/or portions thereof (e.g., a coupling mechanism 516 of the wearable band 510).

The techniques described above can be used with any device for sensing neuromuscular signals, including the arm-wearable devices of FIG. 5A-5B, but could also be used with other types of wearable devices for sensing neuromuscular signals (such as body-wearable or head-wearable devices that might have neuromuscular sensors closer to the brain or spinal column).

In some embodiments, a wrist-wearable device 500 can be used in conjunction with a head-wearable device described below (e.g., AR device 600 and VR device 610) and/or an HIPD 700; and the wrist-wearable device 500 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 500 can also be used in conjunction with a wearable garment, such as smart textile-based garment 800 described below in reference to FIGS. 8A-8C. Having thus described example wrist-wearable device, attention will now be turned to example head-wearable devices, such AR device 600 and VR device 610.

Example Head-Wearable Devices

Figure 6A:
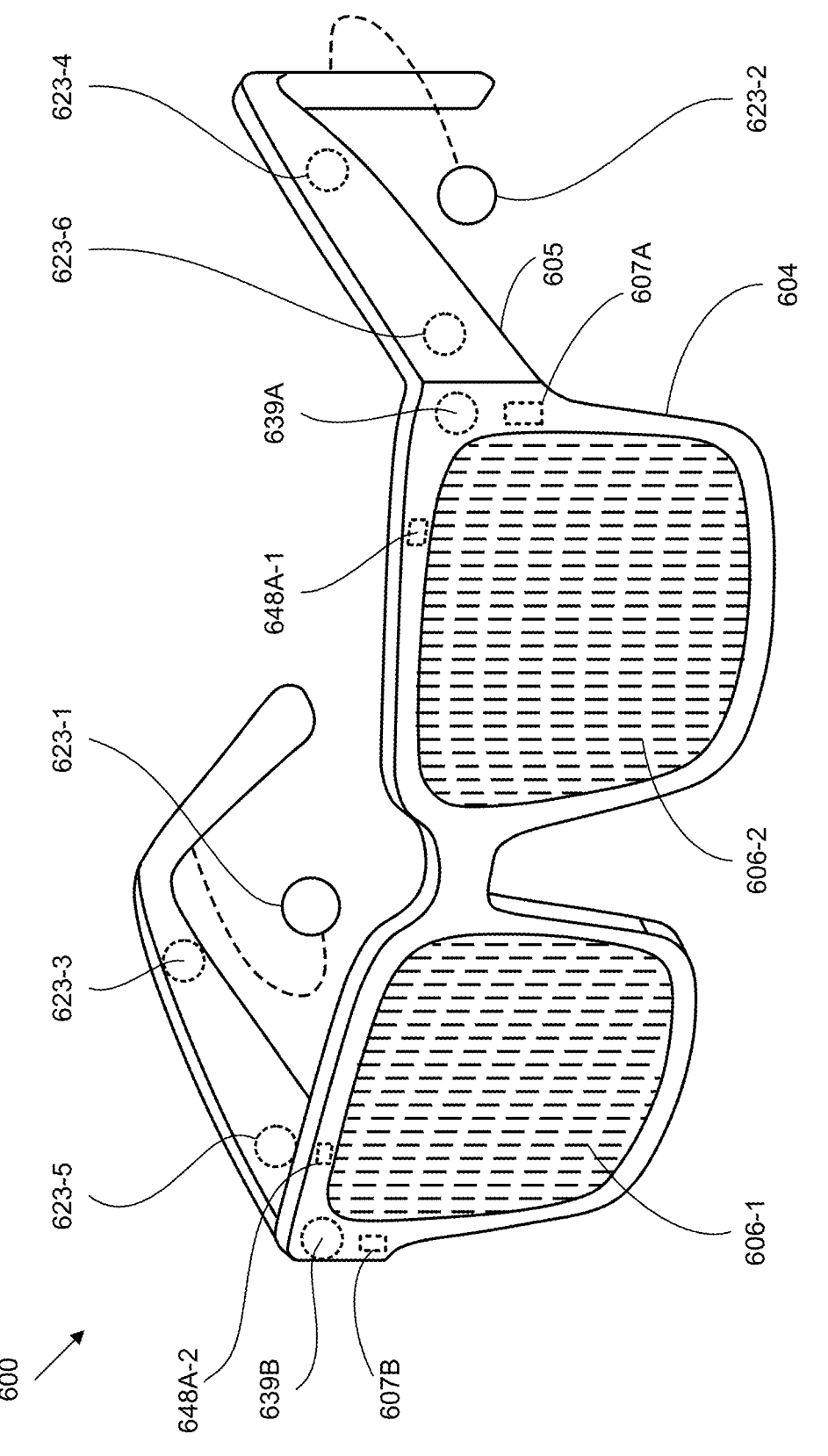
FIGS. 6A-6C illustrate example head-wearable devices, in accordance with some embodiments.
Figures 1, 6B:
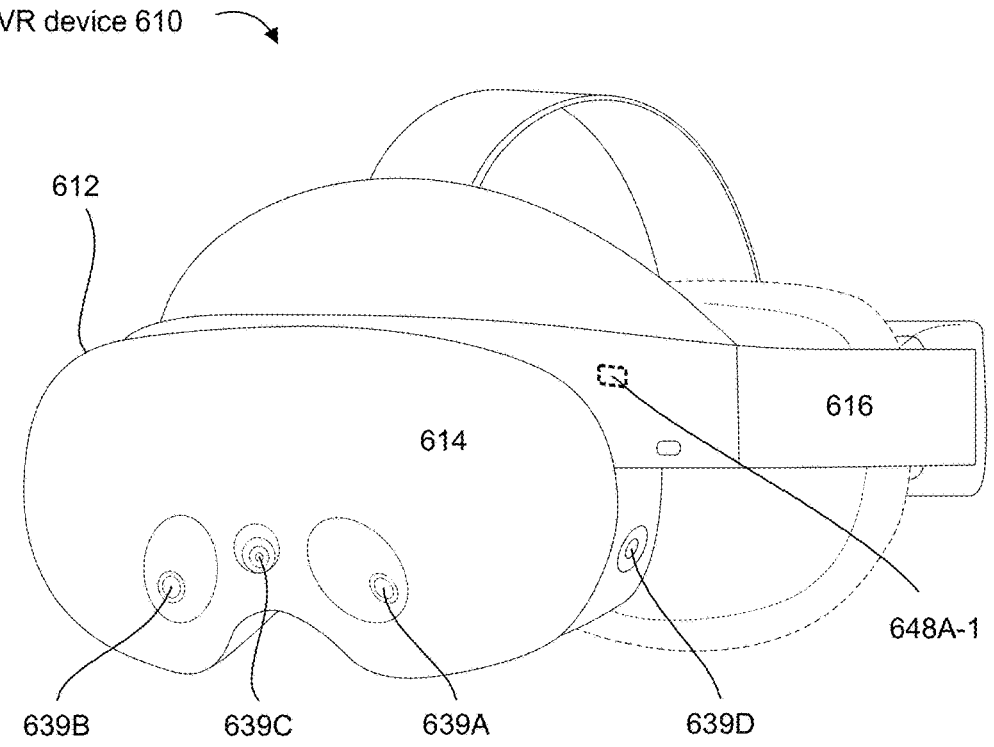
Figures 2, 6B:
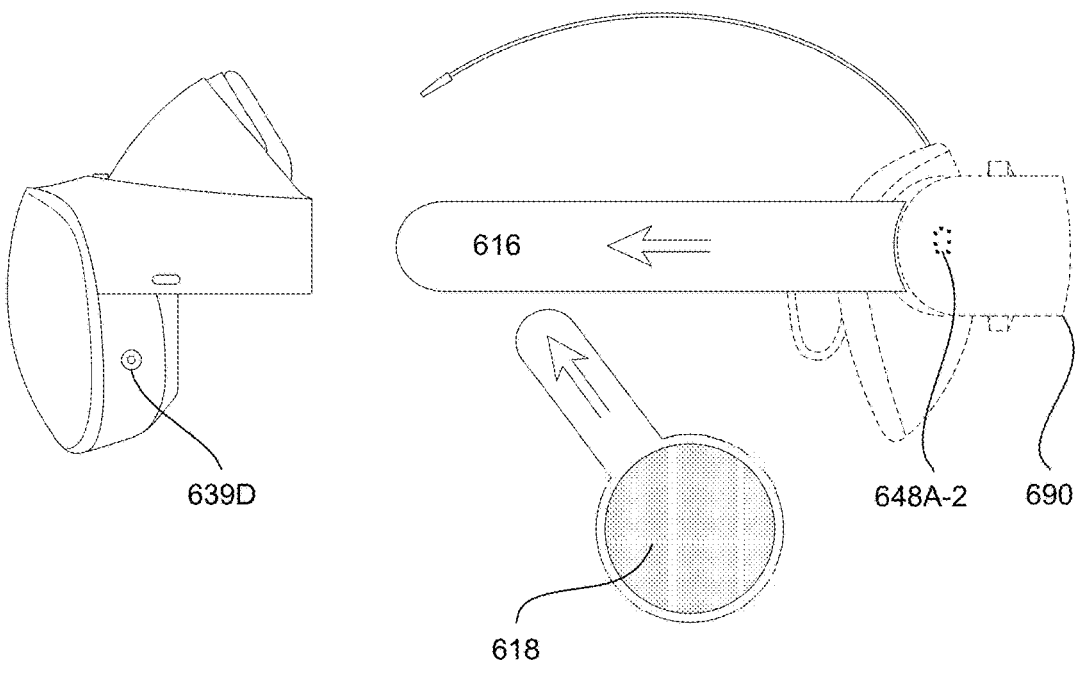
Figure 6C:
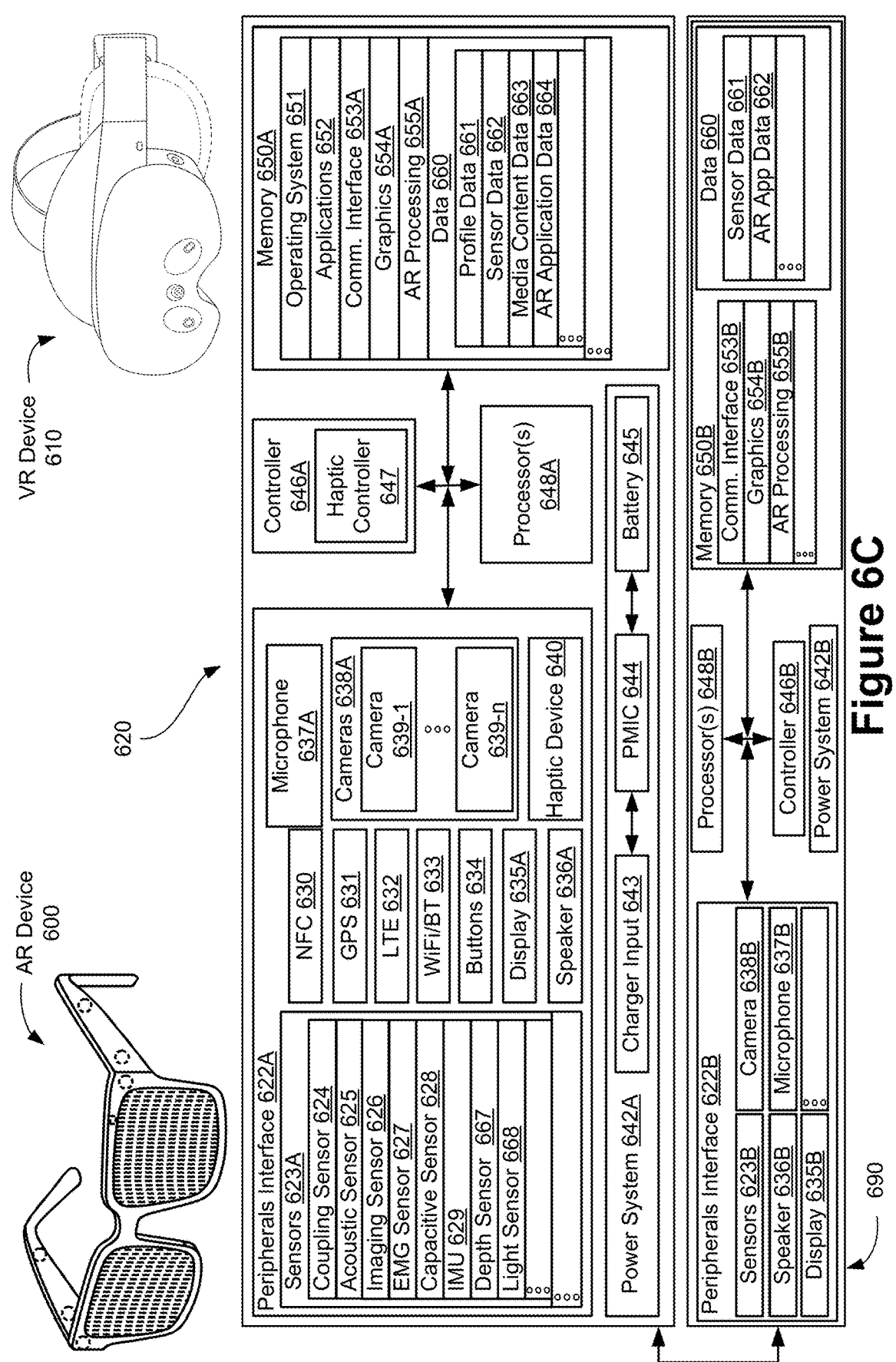

FIGS. 6A-6C show example head-wearable devices, in accordance with some embodiments. Head-wearable devices can include, but are not limited to, AR devices 610 (e.g., AR or smart eyewear devices, such as smart glasses, smart monocles, smart contacts, etc.), VR devices 610 (e.g., VR headsets, head-mounted displays (HMD)s, etc.), or other ocularly coupled devices. The AR devices 600 and the VR devices 610 are instances of the head-wearable devices described in reference to FIG. 1, such that the head-wearable device should be understood to have the features of the AR devices 600 and/or the VR devices 610, and vice versa. The AR devices 600 and the VR devices 610 can perform various functions and/or operations associated with navigating through user interfaces and selectively opening applications, as well as the functions and/or operations.

In some embodiments, an AR system (e.g., AR systems 400a-400d; FIGS. 4A-4D-2) includes an AR device 600 (as shown in FIG. 6A) and/or VR device 610 (as shown in FIGS. 6B-1-B-2). In some embodiments, the AR device 600 and the VR device 610 can include one or more analogous components (e.g., components for presenting interactive artificial-reality environments, such as processors, memory, and/or presentation devices, including one or more displays and/or one or more waveguides), some of which are described in more detail with respect to FIG. 6C. The head-wearable devices can use display projectors (e.g., display projector assemblies 607A and 607B) and/or waveguides for projecting representations of data to a user. Some embodiments of head-wearable devices do not include displays.

FIG. 6A shows an example visual depiction of the AR device 600 (e.g., which may also be described herein as augmented-reality glasses, and/or smart glasses). The AR device 600 can work in conjunction with additional electronic components that are not shown in FIGS. 6A, such as a wearable accessory device and/or an intermediary processing device, in electronic communication or otherwise configured to be used in conjunction with the AR device 600. In some embodiments, the wearable accessory device and/or the intermediary processing device may be configured to couple with the AR device 600 via a coupling mechanism in electronic communication with a coupling sensor 624, where the coupling sensor 624 can detect when an electronic device becomes physically or electronically coupled with the AR device 600. In some embodiments, the AR device 600 can be configured to couple to a housing (e.g., a portion of frame 604 or temple arms 605), which may include one or more additional coupling mechanisms configured to couple with additional accessory devices. The components shown in FIG. 6A can be implemented in hardware, software, firmware, or a combination thereof, including one or more signal-processing components and/or application-specific integrated circuits (ASICs).

The AR device 600 includes mechanical glasses components, including a frame 604 configured to hold one or more lenses (e.g., one or both lenses 606-1 and 606-2). One of ordinary skill in the art will appreciate that the AR device 600 can include additional mechanical components, such as hinges configured to allow portions of the frame 604 of the AR device 600 to be folded and unfolded, a bridge configured to span the gap between the lenses 606-1 and 606-2 and rest on the user's nose, nose pads configured to rest on the bridge of the nose and provide support for the AR device 600, earpieces configured to rest on the user's ears and provide additional support for the AR device 600, temple arms 605 configured to extend from the hinges to the earpieces of the AR device 600, and the like. One of ordinary skill in the art will further appreciate that some examples of the AR device 600 can include none of the mechanical components described herein. For example, smart contact lenses configured to present artificial-reality to users may not include any components of the AR device 600.

The lenses 606-1 and 606-2 can be individual displays or display devices (e.g., a waveguide for projected representations). The lenses 606-1 and 606-2 may act together or independently to present an image or series of images to a user. In some embodiments, the lenses 606-1 and 606-2 can operate in conjunction with one or more display projector assemblies 607A and 607B to present image data to a user. While the AR device 600 includes two displays, embodiments of this disclosure may be implemented in AR devices with a single near-eye display (NED) or more than two NEDs.

The AR device 600 includes electronic components, many of which will be described in more detail below with respect to FIG. 6C. Some example electronic components are illustrated in FIG. 6A, including sensors 623-1, 623-2, 623-3, 623-4, 623-5, and 623-6, which can be distributed along a substantial portion of the frame 604 of the AR device 600. The different types of sensors are described below in reference to FIG. 6C. The AR device 600 also includes a left camera 639A and a right camera 639B, which are located on different sides of the frame 604. And the eyewear device includes one or more processors 648A and 648B (e.g., an integral microprocessor, such as an ASIC) that is embedded into a portion of the frame 604.

FIGS. 6B-1 and 6B-2 show an example visual depiction of the VR device 610 (e.g., a head-mounted display (HMD) 612, also referred to herein as an artificial-reality headset, a head-wearable device, a VR headset, etc.). The HMD 612 includes a front body 614 and a frame 616 (e.g., a strap or band) shaped to fit around a user's head. In some embodiments, the front body 614 and/or the frame 616 includes one or more electronic elements for facilitating presentation of and/or interactions with an AR and/or VR system (e.g., displays, processors (e.g., processor 648A-1), IMUs, tracking emitter or detectors, sensors, etc.). In some embodiments, the HMD 612 includes output audio transducers (e.g., an audio transducer 618-1), as shown in FIG. 6B-2. In some embodiments, one or more components, such as the output audio transducer(s) 618 and the frame 616, can be configured to attach and detach (e.g., are detachably attachable) to the HMD 612 (e.g., a portion or all of the frame 616, and/or the output audio transducer 618), as shown in FIG. 6B-2. In some embodiments, coupling a detachable component to the HMD 612 causes the detachable component to come into electronic communication with the HMD 612. The VR device 610 includes electronic components, many of which will be described in more detail below with respect to FIG. 6C.

FIG. 6B-1 to 6B-2 also show that the VR device 610 one or more cameras, such as the left camera 639A and the right camera 639B, which can be analogous to the left and right cameras on the frame 604 of the AR device 600. In some embodiments, the VR device 610 includes one or more additional cameras (e.g., cameras 639C and 639D), which can be configured to augment image data obtained by the cameras 639A and 639B by providing more information. For example, the camera 639C can be used to supply color information that is not discerned by cameras 639A and 639B. In some embodiments, one or more of the cameras 639A to 639D can include an optional IR cut filter configured to remove IR light from being received at the respective camera sensors.

The VR device 610 can include a housing 690 storing one or more components of the VR device 610 and/or additional components of the VR device 610. The housing 690 can be a modular electronic device configured to couple with the VR device 610 (or an AR device 600) and supplement and/or extend the capabilities of the VR device 610 (or an AR device 600). For example, the housing 690 can include additional sensors, cameras, power sources, processors (e.g., processor 648A-2), etc. to improve and/or increase the functionality of the VR device 610. Examples of the different components included in the housing 690 are described below in reference to FIG. 6C.

Alternatively or in addition, in some embodiments, the head-wearable device, such as the VR device 610 and/or the AR device 600), includes, or is communicatively coupled to, another external device (e.g., a paired device), such as an HIPD 7 (discussed below in reference to FIGS. 7A-7B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD device 700, an optional neckband, and/or wearable accessory device) with the head-wearable devices (e.g., an AR device 600 and/or VR device 610) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 700) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 700, can process information generated by one or more sensors of its sensors and/or information provided by other communicatively coupled devices. For example, a head-wearable device can include an IMU, and the intermediary processing device (neckband and/or an HIPD 700) can compute all inertial and spatial calculations from the IMUs located on the head-wearable device. Additional examples of processing performed by a communicatively coupled device, such as the HIPD 700, are provided below in reference to FIGS. 7A and 7B.

Artificial-reality systems may include a variety of types of visual feedback mechanisms. For example, display devices in the AR devices 600 and/or the VR devices 610 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 600 and/or the VR device 610 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 600 and the VR device 610, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 600 and/or the VR device 610 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 500, an HIPD 700, smart textile-based garment 800, etc.), and/or other devices described herein.

FIG. 6C illustrates a computing system 620 and an optional housing 690, each of which show components that can be included in a head-wearable device (e.g., the AR device 600 and/or the VR device 610). In some embodiments, more or less components can be included in the optional housing 690 depending on practical restraints of the respective head-wearable device being described. Additionally or alternatively, the optional housing 690 can include additional components to expand and/or augment the functionality of a head-wearable device.

In some embodiments, the computing system 620 and/or the optional housing 690 can include one or more peripheral interfaces 622A and 622B, one or more power systems 642A and 642B (including charger input 643, PMIC 644, and battery 645), one or more controllers 646A and 646B (including one or more haptic controllers 647), one or more processors 648A and 648B (as defined above, including any of the examples provided), and memory 650A and 650B, which can all be in electronic communication with each other. For example, the one or more processors 648A and/or 648B can be configured to execute instructions stored in the memory 650A and/or 650B, which can cause a controller of the one or more controllers 646A and/or 646B to cause operations to be performed at one or more peripheral devices of the peripherals interfaces 622A and/or 622B. In some embodiments, each operation described can occur based on electrical power provided by the power system 642A and/or 642B.

In some embodiments, the peripherals interface 622A can include one or more devices configured to be part of the computing system 620, many of which have been defined above and/or described with respect to wrist-wearable devices shown in FIGS. 5A and 5B. For example, the peripherals interface can include one or more sensors 623A. Some example sensors include: one or more coupling sensors 624, one or more acoustic sensors 625, one or more imaging sensors 626, one or more EMG sensors 627, one or more capacitive sensors 628, and/or one or more IMUs 629. In some embodiments, the sensors 623A further include depth sensors 667, light sensors 668 and/or any other types of sensors defined above or described with respect to any other embodiments discussed herein.

In some embodiments, the peripherals interface can include one or more additional peripheral devices, including one or more NFC devices 630, one or more GPS devices 631, one or more LTE devices 632, one or more WiFi and/or Bluetooth devices 633, one or more buttons 634 (e.g., including buttons that are slidable or otherwise adjustable), one or more displays 635A, one or more speakers 636A, one or more microphones 637A, one or more cameras 638A (e.g., including the a first camera 639-1 through nth camera **639-*n*, which are analogous to the left camera 639A and/or the right camera 639B), one or more haptic devices 640**; and/or any other types of peripheral devices defined above or described with respect to any other embodiments discussed herein.

The head-wearable devices can include a variety of types of visual feedback mechanisms (e.g., presentation devices). For example, display devices in the AR device 600 and/or the VR device 610 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 635A can be coupled to each of the lenses 606-1 and 606-2 of the AR device 600. The displays 635A coupled to each of the lenses 606-1 and 606-2 can act together or independently to present an image or series of images to a user. In some embodiments, the AR device 600 and/or the VR device 610 includes a single display 635A (e.g., a near-eye display) or more than two displays 635A.

In some embodiments, a first set of one or more displays 635A can be used to present an augmented-reality environment, and a second set of one or more display devices 635A can be used to present a virtual-reality environment. In some embodiments, one or more waveguides are used in conjunction with presenting artificial-reality content to the user of the AR device 600 and/or the VR device 610 (e.g., as a means of delivering light from a display projector assembly and/or one or more displays 635A to the user's eyes). In some embodiments, one or more waveguides are fully or partially integrated into the AR device 600 and/or the VR device 610. Additionally, or alternatively to display screens, some artificial-reality systems include one or more projection systems. For example, display devices in the AR device 600 and/or the VR device 610 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 635A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 635A for presenting information to users. For example, an external display 635A can be used to show a current battery level, network activity (e.g., connected, disconnected, etc.), current activity (e.g., playing a game, in a call, in a meeting, watching a movie, etc.), and/or other relevant information. In some embodiments, the external displays 635A can be used to communicate with others. For example, a user of the head-wearable device can cause the external displays 635A to present a do not disturb notification. The external displays 635A can also be used by the user to share any information captured by the one or more components of the peripherals interface 622A and/or generated by head-wearable device (e.g., during operation and/or performance of one or more applications).

The memory 650A can include instructions and/or data executable by one or more processors 648A (and/or processors 648B of the housing 690) and/or a memory controller of the one or more controllers 646A (and/or controller 646B of the housing 690). The memory 650A can include one or more operating systems 651; one or more applications 652; one or more communication interface modules 653A; one or more graphics modules 654A; one or more AR processing modules 655A; and/or any other types of modules or components defined above or described with respect to any other embodiments discussed herein.

The data 660 stored in memory 650A can be used in conjunction with one or more of the applications and/or programs discussed above. The data 660 can include profile data 661; sensor data 662; media content data 663; AR application data 664; and/or any other types of data defined above or described with respect to any other embodiments discussed herein.

In some embodiments, the controller 646A of the head-wearable devices processes information generated by the sensors 623A on the head-wearable devices and/or another component of the head-wearable devices and/or communicatively coupled with the head-wearable devices (e.g., components of the housing 690, such as components of peripherals interface 622B). For example, the controller 646A can process information from the acoustic sensors 625 and/or image sensors 626. For each detected sound, the controller 646A can perform a direction of arrival (DOA) estimation to estimate a direction from which the detected sound arrived at a head-wearable device. As one or more of the acoustic sensors 625 detects sounds, the controller 646A can populate an audio data set with the information (e.g., represented by sensor data 662).

In some embodiments, a physical electronic connector can convey information between the head-wearable devices and another electronic device, and/or between one or more processors 648A of the head-wearable devices and the controller 646A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 700) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 600 and/or the VR device 610 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 6B-1 and 6B-2 show the VR device 610 having cameras 639A-639D, which can be used to provide depth information for creating a voxel field and a two-dimensional mesh to provide object information to the user to avoid collisions.

The optional housing 690 can include analogous components to those describe above with respect to the computing system 620. For example, the optional housing 690 can include a respective peripherals interface 622B including more or less components to those described above with respect to the peripherals interface 622A. As described above, the components of the optional housing 690 can be used augment and/or expand on the functionality of the head-wearable devices. For example, the optional housing 690 can include respective sensors 623B, speakers 636B, displays 635B, microphones 637B, cameras 638B, and/or other components to capture and/or present data. Similarly, the optional housing 690 can include one or more processors 648B, controllers 646B, and/or memory 650B (including respective communication interface modules 653B; one or more graphics modules 654B; one or more AR processing modules 655B, etc.) that can be used individually and/or in conjunction with the components of the computing system 620.

The techniques described above in FIGS. 6A-6C can be used with different head-wearable devices. In some embodiments, the head-wearable devices (e.g., the AR device 600 and/or the VR device 610) can be used in conjunction with one or more wearable device such as a wrist-wearable device 500 (or components thereof) and/or a smart textile-based garment 800 (FIGS. 8A-8C), as well as an HIPD 700. Having thus described example the head-wearable devices, attention will now be turned to example handheld intermediary processing devices, such as HIPD 700.

Example Handheld Intermediary Processing Devices

Figure 7B:
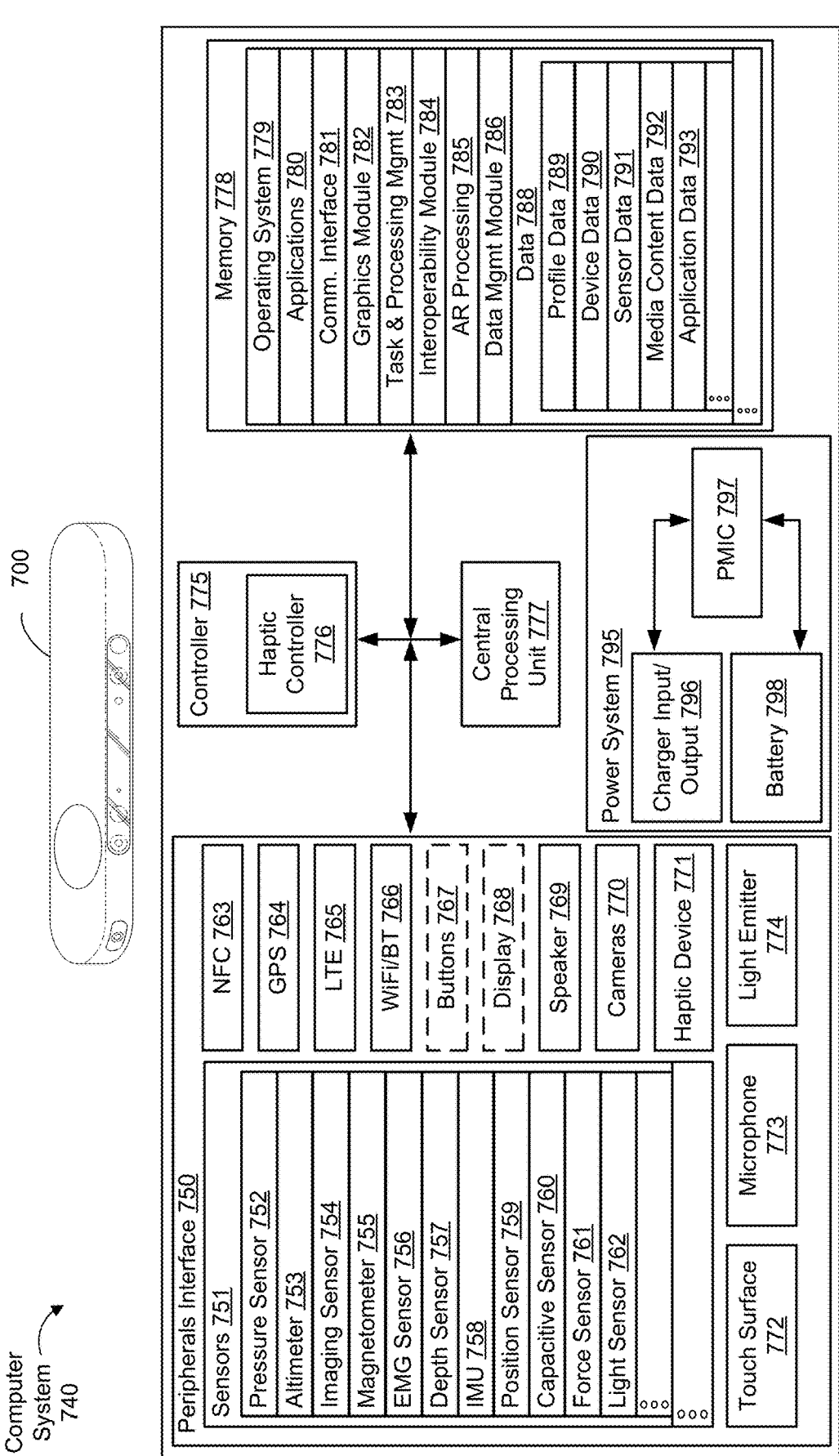

FIGS. 7A and 7B illustrate an example handheld intermediary processing device (HIPD) 700, in accordance with some embodiments. The HIPD 700 can perform various functions and/or operations associated with navigating through user interfaces and selectively opening applications, as well as the functions and/or operations.

FIG. 7A shows a top view 705 and a side view 725 of the HIPD 700. The HIPD 700 is configured to communicatively couple with one or more wearable devices (or other electronic devices) associated with a user. For example, the HIPD 700 is configured to communicatively couple with a user's wrist-wearable device 500 (or components thereof, such as the watch body 520 and the wearable band 510), AR device 600, and/or VR device 610. The HIPD 700 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 700 can successfully be communicatively coupled with an electronic device, such as a wearable device).

The HIPD 700 can perform various functions independently and/or in conjunction with one or more wearable devices (e.g., wrist-wearable device 500, AR device 600, VR device 610, etc.). The HIPD 700 is configured to increase and/or improve the functionality of communicatively coupled devices, such as the wearable devices. The HIPD 700 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 700 can include, without limitation, task offloading and/or handoffs; thermals offloading and/or handoffs; 6 degrees of freedom (6DoF) raycasting and/or gaming (e.g., using imaging devices or cameras 714A and 714B, which can be used for simultaneous localization and mapping (SLAM) and/or with other image processing techniques); portable charging; messaging; image capturing via one or more imaging devices or cameras (e.g., cameras 722A and 722B); sensing user input (e.g., sensing a touch on a multi-touch input surface 702); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 700 and/or in communication between the HIPD 700 and another wearable device described herein. In some embodiments, functions can be executed on the HIPD 700 in conjunction with an AR environment. As the skilled artisan will appreciate upon reading the descriptions provided herein, the novel the HIPD 700 described herein can be used with any type of suitable AR environment.

While the HIPD 700 is communicatively coupled with a wearable device and/or other electronic device, the HIPD 700 is configured to perform one or more operations initiated at the wearable device and/or the other electronic device. In particular, one or more operations of the wearable device and/or the other electronic device can be offloaded to the HIPD 700 to be performed. The HIPD 700 performs the one or more operations of the wearable device and/or the other electronic device and provides to data corresponded to the completed operations to the wearable device and/or the other electronic device. For example, a user can initiate a video stream using AR device 600 and back-end tasks associated with performing the video stream (e.g., video rendering) can be offloaded to the HIPD 700, which the HIPD 700 performs and provides corresponding data to the AR device 600 to perform remaining front-end tasks associated with the video stream (e.g., presenting the rendered video data via a display of the AR device 600). In this way, the HIPD 700, which has more computational resources and greater thermal headroom than a wearable device, can perform computationally intensive tasks for the wearable device improving performance of an operation performed by the wearable device.

The HIPD 700 includes a multi-touch input surface 702 on a first side (e.g., a front surface) that is configured to detect one or more user inputs. In particular, the multi-touch input surface 702 can detect single tap inputs, multi-tap inputs, swipe gestures and/or inputs, force-based and/or pressure-based touch inputs, held taps, and the like. The multi-touch input surface 702 is configured to detect capacitive touch inputs and/or force (and/or pressure) touch inputs. The multi-touch input surface 702 includes a first touch-input surface 704 defined by a surface depression, and a second touch-input surface 706 defined by a substantially planar portion. The first touch-input surface 704 can be disposed adjacent to the second touch-input surface 706. In some embodiments, the first touch-input surface 704 and the second touch-input surface 706 can be different dimensions, shapes, and/or cover different portions of the multi-touch input surface 702. For example, the first touch-input surface 704 can be substantially circular and the second touch-input surface 706 is substantially rectangular. In some embodiments, the surface depression of the multi-touch input surface 702 is configured to guide user handling of the HIPD 700. In particular, the surface depression is configured such that the user holds the HIPD 700 upright when held in a single hand (e.g., such that the using imaging devices or cameras 714A and 714B are pointed toward a ceiling or the sky). Additionally, the surface depression is configured such that the user's thumb rests within the first touch-input surface 704.

In some embodiments, the different touch-input surfaces include a plurality of touch-input zones. For example, the second touch-input surface 706 includes at least a first touch-input zone 708 within a second touch-input zone 706 and a third touch-input zone 710 within the first touch-input zone 708. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 708 causes the HIPD 700 to perform a first command and a user input detected within the second touch-input zone 706 causes the HIPD 700 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 708 can be configured to detect force touch inputs (e.g., a magnitude at which the user presses down) and capacitive touch inputs, and the second touch-input zone 706 can be configured to detect capacitive touch inputs.

The HIPD 700 includes one or more sensors 751 for sensing data used in the performance of one or more operations and/or functions. For example, the HIPD 700 can include an IMU that is used in conjunction with cameras 714 for 3-dimensional object manipulation (e.g., enlarging, moving, destroying, etc. an object) in an AR or VR environment. Non-limiting examples of the sensors 751 included in the HIPD 700 include a light sensor, a magnetometer, a depth sensor, a pressure sensor, and a force sensor. Additional examples of the sensors 751 are provided below in reference to FIG. 7B.

The HIPD 700 can include one or more light indicators 712 to provide one or more notifications to the user. In some embodiments, the light indicators are LEDs or other types of illumination devices. The light indicators 712 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 704. The light indicators can be illuminated in different colors and/or patterns to provide the user with one or more notifications and/or information about the device. For example, a light indicator positioned around the first touch-input surface 704 can flash when the user receives a notification (e.g., a message), change red when the HIPD 700 is out of power, operate as a progress bar (e.g., a light ring that is closed when a task is completed (e.g., 0% to 100%)), operates as a volume indicator, etc.).

In some embodiments, the HIPD 700 includes one or more additional sensors on another surface. For example, as shown FIG. 7A, HIPD 700 includes a set of one or more sensors (e.g., sensor set 720) on an edge of the HIPD 700. The sensor set 720, when positioned on an edge of the of the HIPD 700, can be pe positioned at a predetermined tilt angle (e.g., 26 degrees), which allows the sensor set 720 to be angled toward the user when placed on a desk or other flat surface. Alternatively, in some embodiments, the sensor set 720 is positioned on a surface opposite the multi-touch input surface 702 (e.g., a back surface). The one or more sensors of the sensor set 720 are discussed in detail below.

The side view 725 of the of the HIPD 700 shows the sensor set 720 and camera 714B. The sensor set 720 includes one or more cameras 722A and 722B, a depth projector 724, an ambient light sensor 728, and a depth receiver 730. In some embodiments, the sensor set 720 includes a light indicator 726. The light indicator 726 can operate as a privacy indicator to let the user and/or those around them know that a camera and/or microphone is active. The sensor set 720 is configured to capture a user's facial expression such that the user can puppet a custom avatar (e.g., showing emotions, such as smiles, laughter, etc., on the avatar or a digital representation of the user). The sensor set 720 can be configured as a side stereo RGB system, a rear indirect Time-of-Flight (iToF) system, or a rear stereo RGB system. As the skilled artisan will appreciate upon reading the descriptions provided herein, the novel HIPD 700 described herein can use different sensor set 720 configurations and/or sensor set 720 placement.

In some embodiments, the HIPD 700 includes one or more haptic devices 771 (FIG. 7B; e.g., a vibratory haptic actuator) that are configured to provide haptic feedback (e.g., kinesthetic sensation). The sensors 751, and/or the haptic devices 771 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 700 is configured to operate without a display. However, in optional embodiments, the HIPD 700 can include a display 768 (FIG. 7B). The HIPD 700 can also income one or more optional peripheral buttons 767 (FIG. 7B). For example, the peripheral buttons 767 can be used to turn on or turn off the HIPD 700. Further, the HIPD 700 housing can be formed of polymers and/or elastomer elastomers. The HIPD 700 can be configured to have a non-slip surface to allow the HIPD 700 to be placed on a surface without requiring a user to watch over the HIPD 700. In other words, the HIPD 700 is designed such that it would not easily slide off a surfaces. In some embodiments, the HIPD 700 include one or magnets to couple the HIPD 700 to another surface. This allows the user to mount the HIPD 700 to different surfaces and provide the user with greater flexibility in use of the HIPD 700.

As described above, the HIPD 700 can distribute and/or provide instructions for performing the one or more tasks at the HIPD 700 and/or a communicatively coupled device. For example, the HIPD 700 can identify one or more back-end tasks to be performed by the HIPD 700 and one or more front-end tasks to be performed by a communicatively coupled device. While the HIPD 700 is configured to offload and/or handoff tasks of a communicatively coupled device, the HIPD 700 can perform both back-end and front-end tasks (e.g., via one or more processors, such as CPU 777; FIG. 7B). The HIPD 700 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 700 can perform the above operations alone or in conjunction with a wearable device (or other communicatively coupled electronic device).

FIG. 7B shows block diagrams of a computing system 740 of the HIPD 700, in accordance with some embodiments. The HIPD 700, described in detail above, can include one or more components shown in HIPD computing system 740. The HIPD 700 will be understood to include the components shown and described below for the HIPD computing system 740. In some embodiments, all, or a substantial portion of the components of the HIPD computing system 740 are included in a single integrated circuit. Alternatively, in some embodiments, components of the HIPD computing system 740 are included in a plurality of integrated circuits that are communicatively coupled.

The HIPD computing system 740 can include a processor (e.g., a CPU 777, a GPU, and/or a CPU with integrated graphics), a controller 775, a peripherals interface 750 that includes one or more sensors 751 and other peripheral devices, a power source (e.g., a power system 795), and memory (e.g., a memory 778) that includes an operating system (e.g., an operating system 779), data (e.g., data 788), one or more applications (e.g., applications 780), and one or more modules (e.g., a communications interface module 781, a graphics module 782, a task and processing management module 783, an interoperability module 784, an AR processing module 785, a data management module 786, etc.). The HIPD computing system 740 further includes a power system 795 that includes a charger input and output 796, a PMIC 797, and a battery 798, all of which are defined above.

In some embodiments, the peripherals interface 750 can include one or more sensors 751. The sensors 751 can include analogous sensors to those described above in reference to FIG. 5B. For example, the sensors 751 can include imaging sensors 754, (optional) EMG sensors 756, IMUs 758, and capacitive sensors 760. In some embodiments, the sensors 751 can include one or more pressure sensor 752 for sensing pressure data, an altimeter 753 for sensing an altitude of the HIPD 700, a magnetometer 755 for sensing a magnetic field, a depth sensor 757 (or a time-of flight sensor) for determining a difference between the camera and the subject of an image, a position sensor 759 (e.g., a flexible position sensor) for sensing a relative displacement or position change of a portion of the HIPD 700, a force sensor 761 for sensing a force applied to a portion of the HIPD 700, and a light sensor 762 (e.g., an ambient light sensor) for detecting an amount of lighting. The sensors 751 can include one or more sensors not shown in FIG. 7B.

Analogous to the peripherals described above in reference to FIGS. 5B, the peripherals interface 750 can also include an NFC component 763, a GPS component 764, an LTE component 765, a Wi-Fi and/or Bluetooth communication component 766, a speaker 769, a haptic device 771, and a microphone 773. As described above in reference to FIG. 7A, the HIPD 700 can optionally include a display 768 and/or one or more buttons 767. The peripherals interface 750 can further include one or more cameras 770, touch surfaces 772, and/or one or more light emitters 774. The multi-touch input surface 702 described above in reference to FIG. 7A is an example of touch surface 772. The light emitters 774 can be one or more LEDs, lasers, etc. and can be used to project or present information to a user. For example, the light emitters 774 can include light indicators 712 and 726 described above in reference to FIG. 7A. The cameras 770 (e.g., cameras 714A, 714B, and 722 described above in FIG. 7A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 770 can be used for SLAM; 6 DoF ray casting, gaming, object manipulation, and/or other rendering; facial recognition and facial expression recognition, etc.

Similar to the watch body computing system 560 and the watch band computing system 530 described above in reference to FIG. 5B, the HIPD computing system 740 can include one or more haptic controllers 776 and associated componentry (e.g., haptic devices 771) for providing haptic events at the HIPD 700.

Memory 778 can include high-speed random-access memory and/or non-volatile memory, such as one or more magnetic disk storage devices, flash memory devices, or other non-volatile solid-state memory devices. Access to the memory 778 by other components of the HIPD 700, such as the one or more processors and the peripherals interface 750, can be controlled by a memory controller of the controllers 775.

In some embodiments, software components stored in the memory 778 include one or more operating systems 779, one or more applications 780, one or more communication interface modules 781, one or more graphics modules 782, one or more data management modules 785, which are analogous to the software components described above in reference to FIG. 5B.

In some embodiments, software components stored in the memory 778 include a task and processing management module 783 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 783 uses data 788 (e.g., device data 790) to distribute the one or more front-end and/or back-end tasks based on communicatively coupled devices' computing resources, available power, thermal headroom, ongoing operations, and/or other factors. For example, the task and processing management module 783 can cause the performance of one or more back-end tasks (of an operation performed at communicatively coupled AR device 600) at the HIPD 700 in accordance with a determination that the operation is utilizing a predetermined amount (e.g., at least 70%) of computing resources available at the AR device 600.

In some embodiments, software components stored in the memory 778 include an interoperability module 784 for exchanging and utilizing information received and/or provided to distinct communicatively coupled devices. The interoperability module 784 allows for different systems, devices, and/or applications to connect and communicate in a coordinated way without user input. In some embodiments, software components stored in the memory 778 include an AR module 785 that is configured to process signals based at least on sensor data for use in an AR and/or VR environment. For example, the AR processing module 785 can be used for 3D object manipulation, gesture recognition, facial and facial expression, recognition, etc.

The memory 778 can also include data 787, including structured data. In some embodiments, the data 787 can include profile data 789, device data 789 (including device data of one or more devices communicatively coupled with the HIPD 700, such as device type, hardware, software, configurations, etc.), sensor data 791, media content data 792, and application data 793.

It should be appreciated that the HIPD computing system 740 is an example of a computing system within the HIPD 700, and that the HIPD 700 can have more or fewer components than shown in the HIPD computing system 740, combine two or more components, and/or have a different configuration and/or arrangement of the components. The various components shown in HIPD computing system 740 are implemented in hardware, software, firmware, or a combination thereof, including one or more signal processing and/or application-specific integrated circuits.

Figure 8C:
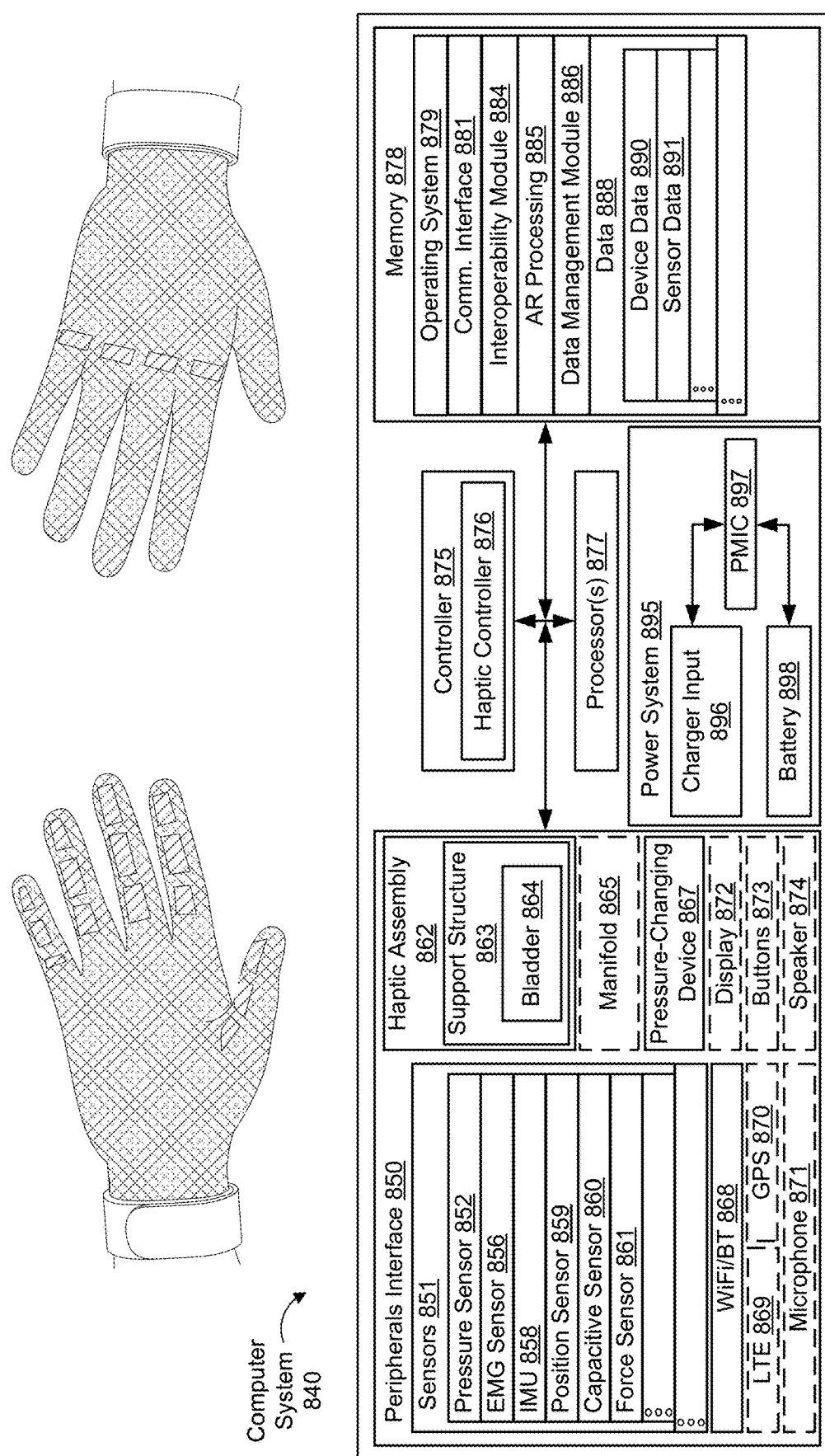

The techniques described above in FIG. 7A-7B can be used with any device used as a human-machine interface controller. In some embodiments, an HIPD 700 can be used in conjunction with one or more wearable device such as a head-wearable device (e.g., AR device 600 and VR device 610) and/or a wrist-wearable device 500 (or components thereof). In some embodiments, an HIPD 700 can also be used in conjunction with a wearable garment, such as smart textile-based garment 800 (FIGS. 8A-8C). Having thus described example HIPD 700, attention will now be turned to example feedback devices, such as smart textile-based garment 800.

Example Smart Textile-Based Garments

FIGS. 8A and 8B illustrate an example smart textile-based garment, in accordance with some embodiments. The smart textile-based garment 800 (e.g., wearable gloves, a shirt, a headband, a wristbands, socks, etc.) is configured to communicatively couple with one or more electronic devices, such as a wrist-wearable device 500, a head-wearable device, an HIPD 700, a laptop, tablet, and/or other computing devices. The smart textile-based garment 800 can perform various functions and/or operations associated with navigating through user interfaces and selectively opening applications, as well as the functions and/or operations.

The smart textile-based garment 800 can be part of an AR system, such as AR system 400d described above in reference to FIGS. 4D-1 and 4D-2. The smart textile-based garment 800 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 800 receives instructions from a communicatively coupled device (e.g., the wrist-wearable device 500, a head-wearable device, and HIPD 700, etc.) for causing the performance of a feedback response. Alternatively, or in addition, in some embodiments, the smart textile-based garment 800 determines one or more feedback responses to provide a user. The smart textile-based garment 800 can determine the one or more feedback responses based on sensor data captured by one or more of its sensors (e.g., sensors 851; FIG. 8C) or communicatively coupled sensors (e.g., sensors of a wrist-wearable device 500, a head-wearable device, an HIPD 700, and/or other computing device).

Non-limiting examples of the feedback determined by the smart textile-based garment 800 and/or a communicatively coupled device include visual feedback, audio feedback, haptic (e.g., tactile, kinesthetic, etc.) feedback, thermal or temperature feedback, and/or other sensory perceptible feedback. The smart textile-based garment 800 can include respective feedback devices (e.g., a haptic device or assembly 862 or other feedback devices or assemblies) to provide the feedback responses to the user. Similarly, the smart textile-based garment 800 can communicatively couple with another device (and/or the other device's feedback devices) to coordinate the feedback provided to the user. For example, a VR device 610 can present an AR environment to a user and as the user interacts with objects within the AR environment, such as a virtual cup, the smart textile-based garment 800 provides respective response to the user. In particular, the smart textile-based garment 800 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 800 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations.

FIG. 8A shows one or more haptic assemblies 862 (e.g., first through fourth haptic assemblies 862-1 through 862-4) on a portion of the smart textile-based garment 800 adjacent to a palmar side of the user's hand and FIG. 8B shows additional haptic assemblies (e.g., a fifth haptic assembly 862-5) on a portion of the smart textile-based garment 800 adjacent to a dorsal side of the user's hand. In some embodiments, the haptic assemblies 862 include a mechanism that, at a minimum, provide resistance when a respective haptic assembly 862 is transitioned from a first state (e.g., a first pressurized state (e.g., at atmospheric pressure or deflated)) to a second state (e.g., a second pressurized state (e.g., inflated to a threshold pressure)). In other words, the haptic assemblies 862 described can transition between a first pressurized state and a second pressurized state to provide haptic feedback to the user. Structures of haptic assemblies 862 can be integrated into various devices configured to be in contact or proximity to a user's skin, including, but not limited to devices such as glove worn devices, body worn clothing device, headset devices. Each of the haptic assemblies 862 can be included in or physically coupled to a garment component 804 of the smart textile-based garment 800. For example, each of the haptic assemblies 862-1, 862-2, 862-3, . . . 862-N are physically coupled to the garment 804 are configured to contact respective phalanges of a user's thumb and fingers.

Due to the ever-changing nature of artificial-reality, the haptic assemblies 862 may be required to transition between the multiple states hundreds, or perhaps thousands of times, during a single use. Thus, the haptic assemblies 862 described herein are durable and designed to quickly transition from state to state. To provide some context, in a first pressurized state, the haptic assemblies 862 do not impede free movement of a portion of the wearer's body. For example, one or more haptic assemblies 862 incorporated into a glove are made from flexible materials that do not impede free movement of the wearer's hand and fingers (e.g., an electrostatic-zipping actuator). The haptic assemblies 862 are configured to conform to a shape of the portion of the wearer's body when in the first pressurized state. However, once in a second pressurized state, the haptic assemblies 862 can be configured to restrict and/or impede free movement of the portion of the wearer's body (e.g., appendages of the user's hand). For example, the respective haptic assembly 862 (or multiple respective haptic assemblies) can restrict movement of a wearer's finger (e.g., prevent the finger from curling or extending) when the haptic assembly 862 is in the second pressurized state. Moreover, once in the second pressurized state, the haptic assemblies 862 may take different shapes, with some haptic assemblies 862 configured to take a planar, rigid shape (e.g., flat and rigid), while some other haptic assemblies 862 are configured to curve or bend, at least partially.

The smart textile-based garment 800 can be one of a plurality of devices in an AR system (e.g., AR systems of FIGS. 4A-4D-2). For example, a user can wear a pair of gloves (e.g., a first type of smart textile-based garment 800), wear a haptics component of a wrist-wearable device 500 (FIGS. 5A-5B), wear a headband (e.g., a second type of smart textile-based garment 800), hold an HIPD 700, etc. As explained above, the haptic assemblies 862 are configured to provide haptic simulations to a wearer of the smart textile-based garments 800. The garment 804 of each smart textile-based garment 800 can be one of various articles of clothing (e.g., gloves, socks, shirts, pants, etc.). Thus, a user may wear multiple smart textile-based garments 800 that are each configured to provide haptic stimulations to respective parts of the body where the smart textile-based garments 800 are being worn. Although the smart textile-based garment 800 are described as an individual device, in some embodiments, the smart textile-based garment 800 can be combined with other wearable devices described herein. For example, the smart textile-based garment 800 can form part of a VR device 610 (e.g., a headband portion).

FIG. 8C shows block diagrams of a computing system 840 of the haptic assemblies 862, in accordance with some embodiments. The computing system 840 can include one or more peripheral interfaces 850, one or more power systems 895 (including charger input 896, PMIC 897, and battery 898), one or more controllers 875 (including one or more haptic controllers 876), one or more processors 877 (as defined above, including any of the examples provided), and memory 878, which can all be in electronic communication with each other. For example, the one or more processors 877 can be configured to execute instructions stored in the memory 878, which can cause a controller of the one or more controllers 875 to cause operations to be performed at one or more peripheral devices of the peripherals interface 850. In some embodiments, each operation described can occur based on electrical power provided by the power system 895.

In some embodiments, the peripherals interface 850 can include one or more devices configured to be part of the computing system 840, many of which have been defined above and/or described with respect to wrist-wearable devices shown in FIGS. 5A-7B. For example, the peripherals interface 850 can include one or more sensors 851, such as one or more pressure sensors 852, one or more EMG sensors 856, one or more IMUs 858, one or more position sensors 859, one or more capacitive sensors 860, one or more force sensors 861; and/or any other types of sensors defined above or described with respect to any other embodiments discussed herein. In some embodiments, the peripherals interface can include one or more additional peripheral devices including one or more WiFi and/or Bluetooth devices 868; an LTE component 869; a GPS component 870; a microphone 871; one or more haptic assemblies 862; one or more support structures 863 (which can include one or more bladders 864; one or more manifolds 865; one or more pressure-changing devices 867; one or more displays 872; one or more buttons 873; one or more speakers 874; and/or any other types of peripheral devices defined above or described with respect to any other embodiments discussed herein. In some embodiments, computing system 840 includes more or less components that those shown in FIG. 8C.

In some embodiments, each haptic assembly 862 includes a support structure 863, and at least one bladder 864. The bladder 864 (e.g., a membrane) is a sealed, inflatable pocket made from a durable and puncture resistance material, such as thermoplastic polyurethane (TPU), a flexible polymer, or the like. The bladder 864 contains a medium (e.g., a fluid such as air, inert gas, or even a liquid) that can be added to or removed from the bladder 864 to change a pressure (e.g., fluid pressure) inside the bladder 864. The support structure 863 is made from a material that is stronger and stiffer than the material of the bladder 864. A respective support structure 863 coupled to a respective bladder 864 is configured to reinforce the respective bladder 864 as the respective bladder changes shape and size due to changes in pressure (e.g., fluid pressure) inside the bladder. The above example haptic assembly 862 is non-limiting. The haptic assembly 862 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 800 also includes a haptic controller 876 and a pressure-changing device 867. Alternatively, in some embodiments, the computing system 840 is communicatively coupled with a haptic controller 876 and/or pressure-changing device 867 (e.g., in electronic communication with one or more processors 877 of the computing system 840). The haptic controller 876 is configured to control operation of the pressure-changing device 867, and in turn operation of the smart textile-based garments 800. For example, the haptic controller 876 sends one or more signals to the pressure-changing device 867 to activate the pressure-changing device 867 (e.g., turn it on and off). The one or more signals can specify a desired pressure (e.g., pounds-per-square inch) to be output by the pressure-changing device 867. Generation of the one or more signals, and in turn the pressure output by the pressure-changing device 867, can be based on information collected by sensors 851 of the smart textile-based garment 800 and/or other communicatively coupled device. For example, the haptic controller 876 can provide one or more signals, based on collected sensor data, to cause the pressure-changing device 867 to increase the pressure (e.g., fluid pressure) inside a first haptic assembly 862 at a first time, and provide one or more additional signals, based on additional sensor data, to the pressure-changing device 867 to cause the pressure-changing device 867 to further increase the pressure inside a second haptic assembly 862 at a second time after the first time. Further, the haptic controller 876 can provide one or more signals to cause the pressure-changing device 867 to inflate one or more bladders 864 in a first portion of a smart textile-based garment 800 (e.g., a first finger), while one or more bladders 864 in a second portion of the smart textile-based garment 800 (e.g., a second finger) remain unchanged. Additionally, the haptic controller 876 can provide one or more signals to cause the pressure-changing device 867 to inflate one or more bladders 864 in a first smart textile-based garment 800 to a first pressure and inflate one or more other bladders 864 in the first smart textile-based garment 800 to a second pressure different from the first pressure. Depending on the number of smart textile-based garments 800 serviced by the pressure-changing device 867, and the number of bladders therein, many different inflation configurations can be achieved through the one or more signals and the examples above are not meant to be limiting.

The smart textile-based garment 800 may include an optional manifold 865 between the pressure-changing device 867, the haptic assemblies 862, and/or other portions of the smart textile-based garment 800. The manifold 865 may include one or more valves (not shown) that pneumatically couple each of the haptic assemblies 862 with the pressure-changing device 867 via tubing. In some embodiments, the manifold 865 is in communication with the controller 875, and the controller 875 controls the one or more valves of the manifold 865 (e.g., the controller generates one or more control signals). The manifold 865 is configured to switchably couple the pressure-changing device 867 with one or more haptic assemblies 862 of the smart textile-based garment 800. In some embodiments, one or more smart textile-based garment 800 or other haptic devices can be coupled in a network of haptic device and the manifold 865 can distribute the fluid between the coupled smart textile-based garments 800.

In some embodiments, instead of using the manifold 865 to pneumatically couple the pressure-changing device 867 with the haptic assemblies 862, the smart textile-based garment 800 may include multiple pressure-changing devices 867, where each pressure-changing device 867 is pneumatically coupled directly with a single (or multiple) haptic assembly 862. In some embodiments, the pressure-changing device 867 and the optional manifold 865 can be configured as part of one or more of the smart textile-based garments 800 (not illustrated) while, in other embodiments, the pressure-changing device 867 and the optional manifold 865 can be configured as external to the smart textile-based garments 800. In some embodiments, a single pressure-changing device 867 can be shared by multiple smart textile-based garment 800 or other haptic devices. In some embodiments, the pressure-changing device 867 is a pneumatic device, hydraulic device, a pneudraulic device, or some other device capable of adding and removing a medium (e.g., fluid, liquid, gas) from the one or more haptic assemblies 862.

The memory 878 includes instructions and data, some or all of which may be stored as non-transitory computer-readable storage media within the memory 878. For example, the memory 878 can include one or more operating systems 879; one or more communication interface applications 881; one or more interoperability modules 884; one or more AR processing applications 885; one or more data management modules 886; and/or any other types of data defined above or described with respect to FIGS. 5A-7B.

The memory 878 also includes data 888 which can be used in conjunction with one or more of the applications discussed above. The data 888 can include: device data 890; sensor data 891; and/or any other types of data defined above or described with respect to FIGS. 5A-7B.

The different components of the computing system 840 (and the smart textile-based garment 800) shown in FIGS. 8A-8C can be coupled via a wired connection (e.g., via busing). Alternatively, one or more of the devices shown in FIGS. 8A-8C may be wirelessly connected (e.g., via short-range communication signals).

FIG. 9 illustrates a battery cell 900 that is configured to be doubly curved (e.g., along at least two axes (i.e., a non-rectangular battery cell)), in accordance with some embodiments. FIG. 9 illustrates a battery cell that has curvature along an x-axis, which is indicated by curved profile 902, and also shows another curvature along a z-axis, which is indicated by curved profile 904. FIG. 9 also shows cutaway view 906, which illustrates how the battery cell is curved internally at the curved profile 902, as shown by curved cathode 908, curved aluminum foil separator 910, curved separator 912, copper foil separator 914, and curved anode 916. The internal components are also curved along curved profile 904 along the z-axis, as shown by cutaway view 207.

These types of battery cells that are configured to be curved along multiple axes are beneficial for maximizing space in non-standard form factors, such as temple arms in glasses frames of augmented-reality headsets, and in virtual reality headsets that include a rear module located at the back of the wearer's head (e.g., a module configured to store batteries and counterbalance the headset). For example, temple arms naturally have multiple curvatures to follow a shape of a user's head (i.e., a dome and/or hemispherical shape), so having a battery that con conform to this double curved surface maximizes internal space, while allowing the temple arm to retain a traditional glasses shape.

In some embodiments, FIG. 9 also illustrates that battery cell 900 can have the same curvature profile across both x-axis and the z-axis (e.g., indicated by Radius 'x' and 'z' being equal to radius 'R'). In some embodiments, the curved profile 902 is different from the curved profile 904, allowing for different radius curvatures depending on the axis. In some embodiments, the curvature along one axis follows multiple radii. For example, a larger radius may be required for most of the temple arm, and a smaller radius can be required around the end of the temple arm, such that the temple arm curves around an ear of a wearer.

FIG. 9 further illustrates that in addition to having curved profiles along multiple axes, the battery cell 900 can have shapes other than rectangular. A non-comprehensive list of example battery cell shapes are provided in box 918, which include a rectangular shape 920, a rounded rectangle 922, an elliptical or circle shape 924, and a hexagonal shape 926. In addition to these shapes, every edge of the battery cell can also be chamfered to conform to a shape of the component the battery is being inserted into (e.g., a temple arm). In some embodiments, some of the edges can be chamfered and some of the edges are not chamfered.

FIG. 10 illustrates three different views of a temple arm that includes a doubly-curved battery cells that have irregular shapes, in accordance with some embodiments. FIG. 10 shows a first transparent view 1000 that shows a temple arm 1002 including a battery cell 1004 that is curved along both the x and y axes to fill a first void 1006 of the temple arm. First transparent view 1000 also shows that temple arm 1002 also includes another battery cell 1008 that is curved along both x and y axes to fill a second void 1010, and the first void 1006 and the second void 1010 have different irregular shapes (e.g., shapes partially dictated by an average head profile of a wearer).

FIG. 10 also shows that in some embodiments that battery cell 1004 and other battery cell 1008 are electrical coupled (e.g., as indicated by connector 1009) to each other (e.g., either in series or parallel) to produce a desired power output. In some embodiments, the battery cell and the other battery cell can be electrically coupled to all other battery cells located within the augmented-reality headset.

FIG. 10 also shows a second transparent view 1012 that shows temple arm 1002 including a battery cell 1004 that is curved along both the x and y axes and has an irregular shape to fill first void 1006 of the temple arm. Second transparent view 1012 also shows that temple arm 1002 also includes another battery cell 1008 that is curved along both x and y axes and has an irregular shape to fill second void 1010, and the first void 1006 and the second void 1010 have different shapes. Thus, the battery cell in this example is curved along the x, y axes and has an irregular shape. In some embodiments, the battery is curved along the x, y, and z axes.

FIG. 10 illustrates a third transparent perspective view 1014 that further shows that battery cell 1004 and other battery cell 1008 are curved along x and y, and has an irregular shape. While FIG. 10 shows that battery cells can be curved along two axes and the battery having an irregular shape, battery cells do not need to be curved along only the x and y axes and can be curved along either just one or three axes depending on the application (i.e., shape of a void). In some embodiments, the irregular shape of the battery along with the battery cell being curved along two-axes is sufficient for fitting the battery in any shaped void.

FIG. 10 also illustrates that one or more artificial-reality processing or presentation devices 1016 are placed within the temple arm, and can partially define the first void 1006 and/or second void 1010.

FIG. 11 shows three different views of a glasses frame that includes a battery cell that is doubly curved (e.g., along two axes) (and has an irregular shape to fit within a nose bridge of a glasses frame, in accordance with some embodiments. FIG. 11 shows a first transparent view 1102 that illustrates that glasses frame 1104 includes a battery cell 1106 that is curved along both the x and y axes to fit within nose bridge 1106 of glasses frame 1104.

FIG. 11 shows a second a second transparent cut-away view 1108 that illustrates that battery cell 1106 is curved along both y and z axes to further fit in nose bridge 1107 of glasses frame 1104. FIG. 11 illustrates a third transparent perspective view 1110 that further shows that battery cell 1106 is curved along x, y, and z axes. While FIG. 11 shows that battery cell 1106 can be curved along three axes, other battery cells do not need to be curved along all three axes and can be curved along either just one or two axes depending on the application. In some embodiments, the battery cell 1106 is electrically coupled to batteries shown in FIGS. 10, either in series or parallel to produce a desired power output.

The batteries described in reference to FIGS. 9-11 are considered variations of the batteries described in reference to FIGS. 1-3B, as such, any features described in reference to FIGS. 1-3B can be applied to the batteries of FIGS. 9-11, and vice-versa.

FIG. 12 shows a battery configuration that is configured to reduce the overall weight of a battery in comparison to traditional lithium-ion batteries that rely on aluminum and copper foils in their construction, in accordance with some embodiments.

FIG. 12 illustrates in section 1200 a cutaway view 1202 of a conventional solid metal current collector-based lithium-ion battery that normally uses copper foil as an anode and aluminum foil as the anode. While effective, these materials can make up between 10-15% of the total weight of the battery cell. High weight is not ideal in wearable devices that have to be lightweight in order to improve comfort for the user. As shown the solid-metal current collector 1203 is surrounded by electrolyte/electrode material 1205.

Section 1204 illustrates a cutaway view 1206 of a first lightweight alternative to the conventional solid metal current collector-based lithium-ion batteries. As shown the cutaway view 1206 shows that current collector 1207 (surrounded in dashed lines) that uses a non-metal core, which is lighter than a solid metal current collector. In some embodiments, the non-metal core is a polymeric/composite film core 1208. In some embodiments, the non-metal core can be a continuous film material, a porous material (e.g., a woven material), etc. In some embodiments, the non-metal composite core 1208 can be constructed of Polypropylene (PP), Polyethylene (PE), Polyethylene terephthalate (PET), Polyether ether ketone (PEEK), polyaryl ether ketone (PEAK), Polyimide (PI), etc. in either sheet or roll goods form. In some embodiments, the non-metal core has a metal layer 1209A and 1209B placed on the top and bottom, respectively, to act as the anode and cathode for the battery cell. In some embodiments, the metal layers can be selected from one or more of aluminum, copper, nickel, and/or titanium. In some embodiments, the metal layer can be adhered to the non-metal core either by one or more of lamination, coating, chemical vapor deposition (CVD), physical vapor deposition (PVD), and/or sputtering deposition. The non-metal core and layered laminated/coated metal composite current collector has comparable thickness as conventional solid metal current collectors. In addition, however, since polymers have lower densities the overall weight is less compared to a solid metal current collector. In some embodiments, the non-metal core and layered laminated/coated metal composite current collector has good mechanical properties and better corrosion resistance as compared with a solid metal current collector. In addition, section 1204 shows the current collector 1207 is surrounded by an electrode material 1211.

Section 1210 of FIG. 12 shows a first cross-section of a 3D porous metal current collector 1214 (e.g., a mesh, a perforated foil, an expanded foil/film, a foam, a woven, etc.) with electrolyte/electrode materials 1215 on one or both sides of the porous metal current collector 1214. Section 1210 illustrates a second lightweight alternative to the conventional solid metal current collector-based lithium-ion batteries. Section 1216 shows a second cross section of the continuous 3D porous metal current collector shown in section 1210 with controlled cell size and metal wall width and thickness. This current collector can reduce weight of the current collectors and increase electrode mass loading with engineered void space in the current collector, as compared to the solid metal current collectors.

Figure 13:
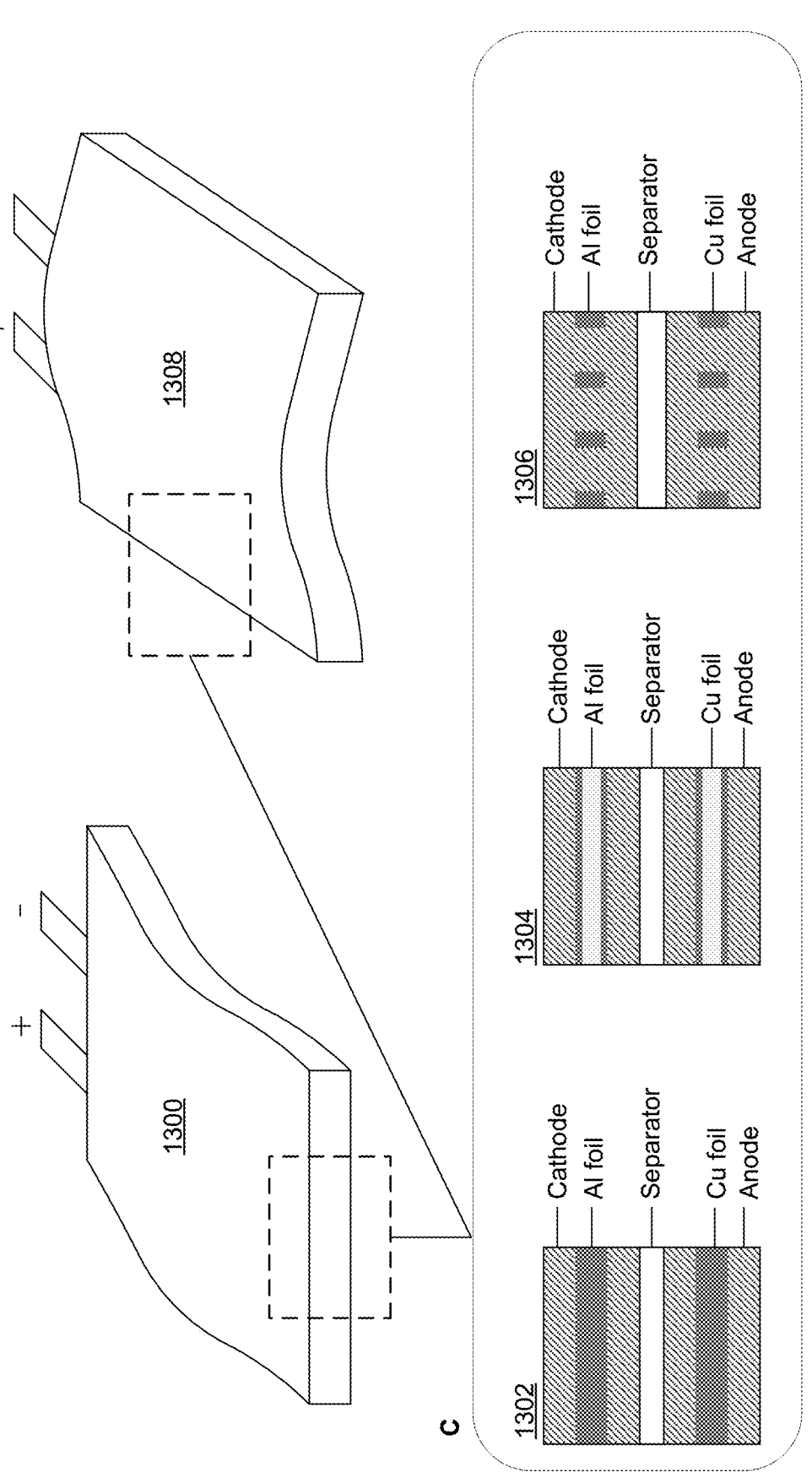
FIG. 13 illustrates example curved battery cells that utilize the lightweight current collectors described in reference to FIG. 12, in accordance with some embodiments.

FIG. 13 illustrates example curved battery cells that utilize the lightweight current collectors described in reference to FIG. 12, in accordance with some embodiments. In some embodiments, these lightweight alternative current collectors are roll goods, and curved cell batteries can be made with such current collectors with zigzag stacking, lamination, or winding. FIG. 13 shows that first curved battery cell 1300 that is curved along a first axis and is constructed using a either a conventional current collector 1302, a current collector that uses a lightweight non-metal core current collector 1304, or a lightweight 3D porous metal current collector 1306. FIG. 13 also shows that second curved battery cell 1308 that is curved along a second axis, different from the first axis, and is constructed using a either a conventional current collector 1302, a current collector that uses a lightweight non-metal core current collector 1304, or a lightweight 3D porous metal current collector 1306. In some embodiments, the curved battery cell is configured to be curved along at least two axes, and still employ the lightweight current collectors described herein. In some embodiments, a cathode can use a first type of current collector that is different than an anode that uses a second type of current collector (e.g., the first current collector is a lightweight non-metal core current collector, and the second current collector is a 3D porous metal current collector). In some embodiments, the battery cells are constructed using a stacking or winding method. As a result, these lightweight current collectors can reduce inactive mass and can enhance packing efficiency for higher cell energy density. The lightweight current collector-based batteries described can have comparable thickness as conventional solid metal current collectors but at a lower weight, since polymers have lower densities that metals. In addition, lightweight current collectors provide improved mechanical properties and corrosion resistance as compared with the solid-metal current collectors. In some embodiments, the porosity in 3D porous metal current collector can achieve high electrode mass loading which improves absolute battery cell capacity/energy while maintaining low electrical resistance and good ion diffusion rate.

FIG. 14 illustrates lightweight hard cased batteries that do not have cell terraces and/or side folds to reduce weight and volumetric efficiency while providing balanced gravimetric energy density, in accordance with some embodiments. FIG. 14 shows an example non-curved battery cell 1400 that does not include a cell terrace and/or side folds, which save on inactive volume normally taken by side folds together with gluing or taping and terrace/top space. FIG. 14 shows a curved battery cell 1402 that is curved along a first axis that does not include a cell terrace and/or side folds. Having a curved battery without a cell terrace and/or side folds further improve volumetric efficiency by allowing the battery cell to better conform the electronic device it is contained in. FIG. 14 further shows another curved battery cell 1404 that is curved along a second axis, and the other battery does not include a cell terrace and/or side folds. In some embodiments, a battery cell without a terrace and/or side folds can be curved along multiple axes (e.g., curves along both the first and second axes). In some embodiments, the steel cased batteries can act as a structural component of the electronic device (i.e., providing structural rigidity to a temple arm of a pair of glasses, thereby reducing the amount of material required to achieve the desired structural rigidity of the temple arm).

FIG. 15 illustrates a few options for assembling a battery cell without a cell terrace and/or side folds, in accordance with some embodiments. FIG. 15 shows a construction of a first hard casing 1500 for a battery cell. The first example construction is produced using a tube-like (e.g., a hollow extruded member) hard casing 1502 that is sealed with two side pieces 1504A and 1504B (e.g., end caps). To produce the battery cell without a cell terrace and/or side folds, the two side pieces 1504A and 1504B are coupled to the tub-like hard casing 1502 via laser welding. Laser welding mitigates the need for cell terraces and/or side folds. In some embodiments, the two side pieces can include terminals and/or fill holes. Second hard casing 1506 and third hard casing 1508 are produced using only two pieces as opposed to the three pieces described in reference to the first hard casing 1500.

The second hard casing is produced by having a first piece 1510 that resembles a shallow can structure (e.g., a cuboidal structure with a missing surface, or a cylindrical structure missing an end piece, etc.) laser welded to a second piece 1512 (e.g., a sealing cap is a cap that is substantially the same size as the largest surface of the first piece). The third hard casing is produced by having a first piece 1514 that resembles a deep-narrow can structure (e.g., a cuboidal structure with a missing surface, or a cylindrical structure missing an end piece, etc.) laser welded to a second piece 1516 (e.g., a sealing cap is a cap that is substantially the same size as the smallest surface of the first piece). In some embodiments, the first piece can be sealed by a sealing cap that is substantially the same size as the second smallest surface of a first piece. In some embodiments, the sealing caps can also have terminals and/or fill holes.

FIG. 16 illustrates alternative shapes that the battery cell can be and the placement of terminals on these alternative shaped battery cells, in accordance with some embodiments. FIG. 16 shows a traditionally shaped cuboidal shaped battery cell 1602, a narrow battery cell 1604 and a thin battery cell 1606. These alternative designs are ideal in applications that have non-traditional shapes, e.g., temple arms of smart or extended reality glasses, other wearable devices, etc. In some embodiments, for miniature cell batteries, which are used for augmented reality glasses, smart glasses, wearable or on wrist devices, the dimensions of the battery can range between: a width of 5-40 mm, a length of 10-70 mm, and a thickness of 1-10 mm. In some embodiments, for virtual-reality headsets, the dimensions of the battery cell can range between: a width of 30-110 mm, a length of 50-150 mm, a thickness of 1-10 mm. The above example ranges are not limiting and other ranges are possible to make thinner, longer, and/or wider battery cells.

Figure 17:
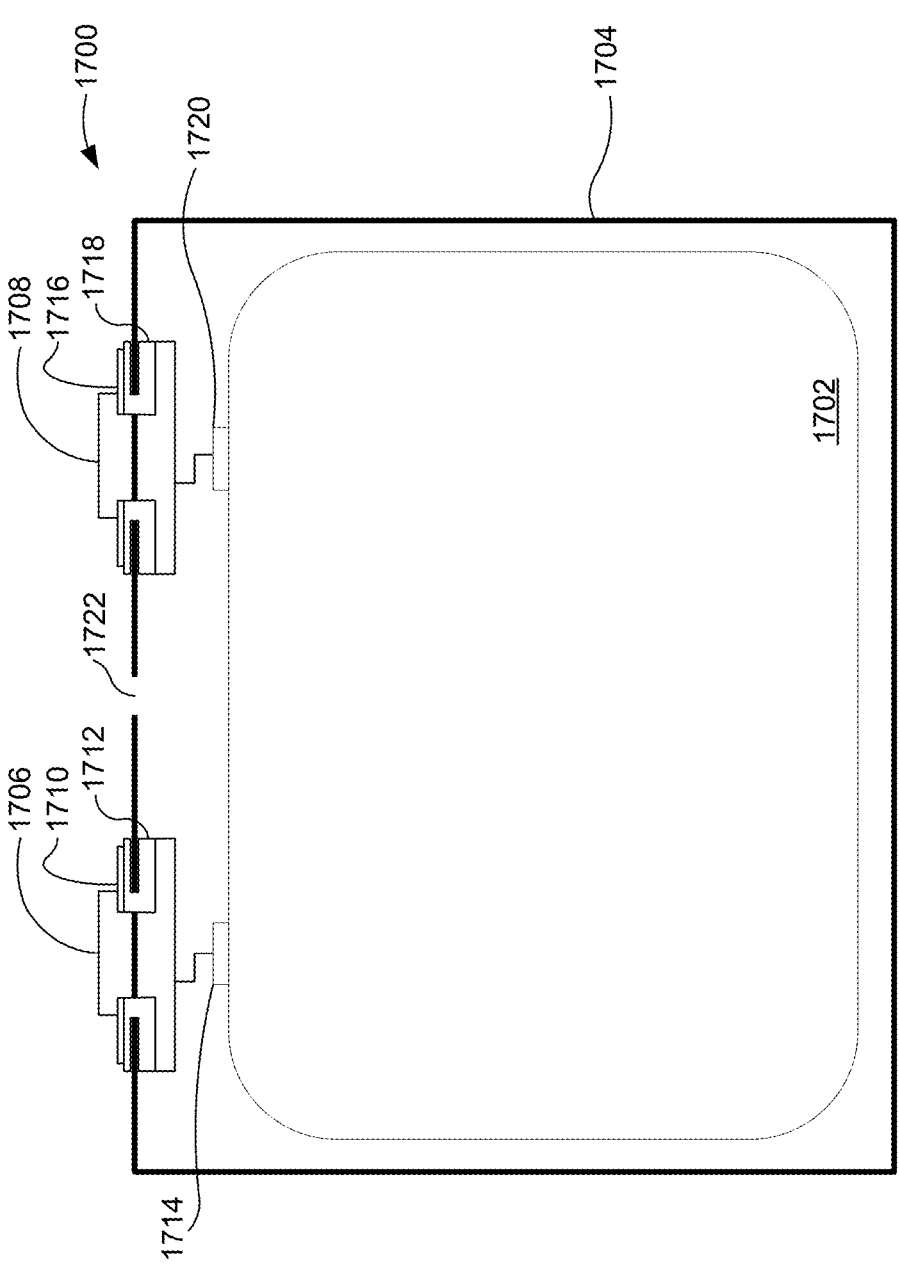
FIG. 17 shows an example cutaway of a battery with a hard case, in accordance with some embodiments.

FIG. 17 shows an example cutaway of a battery 1700 with a hard case, in accordance with some embodiments. FIG. 17 illustrates a battery cell 1702 that is produced having either a stacking construction or a jelly roll construction. The battery cell 1702 is encased in a hard casing (e.g., a metal can) 1704, and in some embodiments, that battery cell 1702 fills between 70-95% of the internal volume of hard casing 1704. In some embodiments, the battery cell can fill up to 99% of the internal volume of the hard casing when the hard casing is larger in size, i.e., for larger batteries the volumetric efficiency as a percentage can be achieved. In some embodiments, the battery cell can fill between 70-95% of the internal volume of the hard casing. The battery cell 1702 is coupled with a positive terminal 1706 and a negative terminal 1708.

The positive terminal 1706 is attached to the hard casing 1704 via a spacer 1710 and a resistor 1712. In some embodiments, the positive terminal 1706 also includes and/ or replaces the resistor 1712 with a sealing gasket. The positive terminal 1706 is coupled to the battery cell 1702 via a cathode tab 1714.

The negative terminal 1708 is also attached to the hard casing 1704 via a spacer 1716 and a sealing gasket 1718. In some embodiments, the negative terminal 1708 also includes and/or replaces the sealing gasket 1718 with a resistor. The negative terminal 1708 is coupled to the battery cell 1702 via an anode tab 1720. FIG. 17 also shows that the hard casing 1704 also includes a fill hole 1722 for filling the battery with electrolyte.

In some embodiments, positive terminal 1706 is attached to the hard casing via a resistor 1712 and the negative terminal 1708 is coupled to the hard casing via a sealing gasket. This difference in attaching components is important for the lightweight batteries having an aluminum, as corrosion can form on the aluminum can. Thus, this avoids aluminum corrosion forming Li—Al alloy (LixAly) due to low potential versus lithium (~0.3V vs Li+/Li). Thus, the hard case is connected to positive terminal via a resistive gasket, which has dual functions of both sealing and corrosion protection. In some embodiments, having a resistor in series prevents accidental contacts between the aluminum can and the anode components (i.e., anode, Cu foil, etc.).

Figures 18A, 18B:
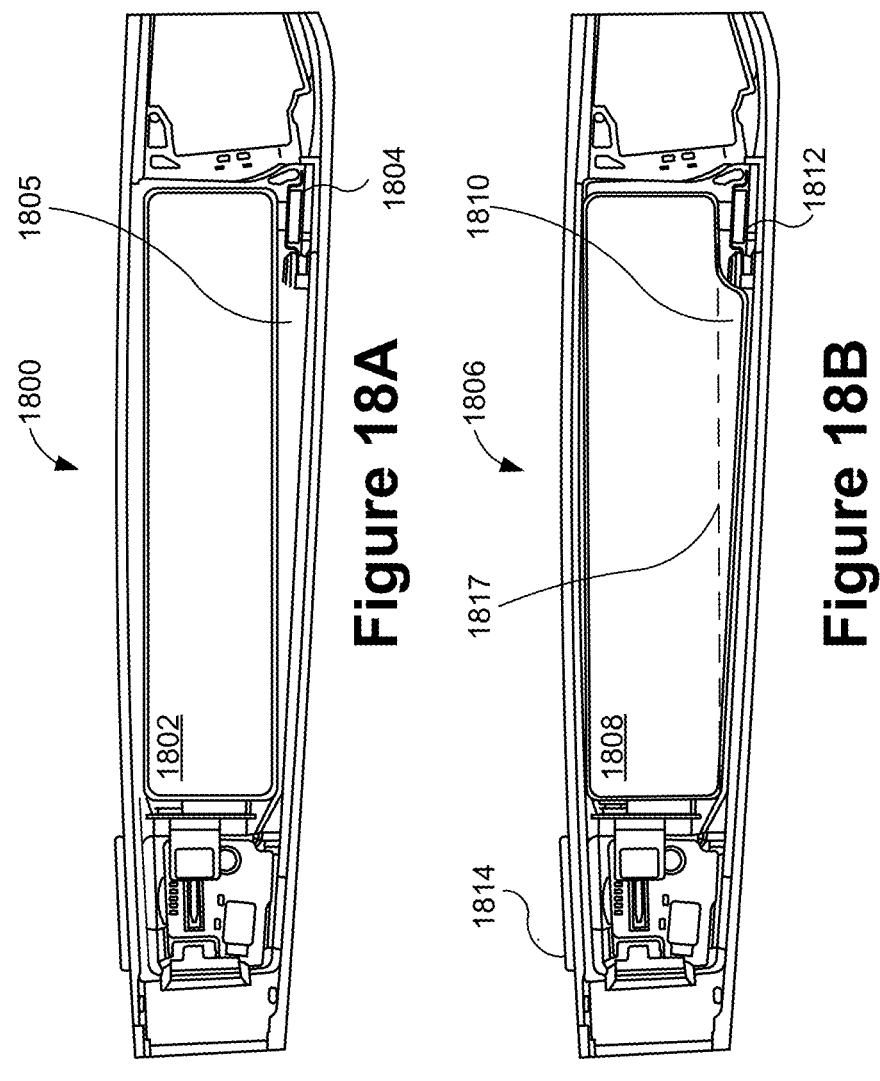
FIGS. 18A and 18B illustrate a comparison between a battery that has a curved shaped to accommodate one or more electronic components in a temple arm, as opposed to a non-curved battery that doesn't accommodate the one or more electronic components in the temple arm, in accordance with some embodiments.

FIGS. 18A and 18B illustrate a comparison between a battery that has a curved shaped to accommodate one or more electronic components in a temple arm (e.g., FIG. 18B), as opposed to a non-curved battery that doesn't accommodate the one or more electronic components in the temple arm as well (e.g., FIG. 18A), in accordance with some embodiments.

FIG. 18A shows a temple arm 1800 that includes a traditional non-curved battery 1802 (e.g., a cuboidal battery cell) which sacrifices overall storage capacity to fit among one or more electrical components (e.g., a microphone 1804) located within the temple arm. When using a non-curved battery in a temple arm 1800 that has a curved shape a void 1805 can be formed. Having a void 1805 is not an efficient use of packaging and results in less run time for the head-wearable device, as the maximum storage capacity of the battery is less than a battery that can conform to fill the void 1805.

FIG. 18B, in comparison to FIG. 18A, shows a temple arm 1806 that includes a curved battery 1808 that is designed to maximize the available space (e.g., by filling the void 1805 discussed in reference to FIG. 18A) within the temple arm 1806. In some embodiments, the curved battery

1808 is configured to fill a void 1810 (indicated by the dashed line 1817) and to accommodate the placement of a microphone 1812. While a microphone 1812 is shown, the curved battery 1808 can be configured to accommodate other electronic components or surface of the temple arm that are not pictures. FIG. 18B also shows that the temple arm can be configured with a button 1814 for controlling at least one aspect of the pair of smart glasses.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An augmented-reality headset, comprising:
   a frame portion;
   a temple arm portion coupled with the frame portion;
   a metal-encased battery cell having an exterior surface
      that defines a non-rectangular shape, wherein:

the metal-encased battery cell is configured to be housed within the temple arm portion;

the metal-encased battery cell tapers in thickness across two axes; and the non-rectangular shape of the exterior surface follows an interior shape of an internal surface of the temple arm portion; and one or more artificial-reality processing or presentation devices, wherein at least one of the one or more artificial-reality processing or presentation devices is configured to receive power from the metal-encased battery cell.

2. The augmented-reality headset of claim 1, wherein the interior shape is a first interior shape of the internal surface of the temple arm portion, and the augmented-reality headset further comprises:

another metal-encased battery cell having another exterior surface that defines another non-rectangular shape, wherein:

the other metal-encased battery cell is configured to be housed within the temple arm portion, and the other non-rectangular shape of the exterior surface follows a second interior shape of the internal surface of the temple arm portion; and at least one of the one or more artificial-reality processing or presentation devices is configured to receive power from the other metal-encased battery cell.

3. The augmented-reality headset of claim 1, further comprising:

another temple arm portion, distinct from the temple arm portion, coupled with the frame portion;

another metal-encased battery cell having another exterior surface that defines another non-rectangular shape, wherein:

the other metal-encased battery cell is configured to be housed within the other temple arm portion; and the other non-rectangular shape of the other exterior surface follows another interior shape of another internal surface of the other temple arm portion; and at least one of the one or more artificial-reality processing or presentation devices is configured to receive power from the other metal-encased battery cell.

4. The augmented-reality headset of claim 1, wherein at least one edge of the metal-encased battery cell has a chamfered edge, wherein the chamfered edge is configured to further conform to the interior shape of the internal surface of the temple arm portion.

5. The augmented-reality headset of claim 1, wherein at least one edge of the metal-encased battery cell has a chamfered edge, wherein the chamfered edge is shaped to accommodate at least one of the one or more artificial-reality processing or presentation devices within the temple arm portion.

6. The augmented-reality headset of claim 5, wherein the at least one of the one or more artificial-reality processing or presentation devices is a speaker, and the chamfered edge of the metal-encased battery cell is shaped and sized to allow for the speaker to at least partially overlap the chamfered edge within the temple arm portion.

7. The augmented-reality headset of claim 1, wherein the frame portion includes at least two semi-transparent lenses configured to allow for environmental light to pass through.

8. The augmented-reality headset of claim 1, further comprising:

another metal-encased battery cell having another exterior surface that defines another non-rectangular shape, wherein:

the other metal-encased battery cell is configured to be housed within the frame portion; and the other non-rectangular shape of the other exterior surface follows another interior shape of another internal surface of the frame portion; and at least one of the one or more artificial-reality processing or presentation devices is configured to receive power from the other metal-encased battery cell.

9. The augmented-reality headset of claim 1, wherein the metal-encased battery cell includes at least one mounting component configured to secure the metal-encased battery cell to the temple arm portion, wherein the mounting component is one or more of: hooks, tabs, springs, and screws.

10. The augmented-reality headset of claim 1, wherein the metal-encased battery cell includes a surface that is hemispherical.

11. The augmented-reality headset of claim 1, wherein the metal-encased battery cell is made of steel.

12. The augmented-reality headset of claim 1, wherein the metal-encased battery cell has a flangeless sealing construction, thereby increasing a battery cell area of the metal-encased battery cell that can be housed within the temple arm portion as compared to a battery cell that did use a flange-based construction.

13. The augmented-reality headset of claim 12, wherein the metal-encased battery cell comprises at least two metal casings that are laser welded together.

14. The augmented-reality headset of claim 1, wherein the metal-encased battery cell has a metal-based wall thickness of between 100-300 micrometers ($\mu$m).

15. The augmented-reality headset of claim 1, wherein the metal-encased battery has a largest cross-sectional dimension of at least 6 millimeters (mm) and a smallest cross-sectional dimension of at least 2.5 mm.

16. The augmented-reality headset of claim 1, wherein the metal-encased battery cell has a stacked electrode design, wherein electrodes in the stacked electrode design are die-cut with varying size as they are layered.

17. A metal-encased battery cell, comprising:

an exterior surface that defines a non-rectangular shape, wherein:

the metal-encased battery cell is configured to be housed within a temple arm portion, wherein the metal-encased battery cell tapers in thickness across two axes; and the non-rectangular shape of the exterior surface follows an interior shape of an internal surface of a temple arm portion; and the metal-encased battery is configured to be coupled with one or more artificial-reality processing or presentation devices, wherein at least one of the one or more artificial-reality processing or presentation devices is configured to receive power from the metal-encased battery cell.

18. A temple arm of an augmented-reality headset, comprising:

a metal-encased battery cell having an exterior surface that defines a non-rectangular shape, wherein:

the metal-encased battery cell is configured to be housed within the temple arm portion, wherein the metal-encased battery cell tapers in thickness across two axes; and the non-rectangular shape of the exterior surface follows an interior shape of an internal surface of the temple arm portion; and one or more artificial-reality processing or presentation devices, wherein at least one of the one or more artificial-reality processing or presentation devices is configured to receive power from the metal-encased battery cell.

\* \* \* \* \*